(12) United States Patent
Tsuruda et al.

(10) Patent No.: US 11,761,551 B2
(45) Date of Patent: Sep. 19, 2023

(54) FAUCET DEVICE AND MANUFACTURING METHOD THEREFOR

(71) Applicant: TOTO LTD., Kitakyushu (JP)

(72) Inventors: Yukito Tsuruda, Kitakyushu (JP); Kenji Kido, Kitakyushu (JP); Takafumi Inoue, Kitakyushu (JP); Masanobu Kanashiro, Kitakyushu (JP); Makoto Hatakeyama, Kitakyushu (JP); Daisuke Kazaoka, Kitakyushu (JP); Yoshihiro Kiyofuji, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 319 days.

(21) Appl. No.: 16/435,868

(22) Filed: Jun. 10, 2019

(65) Prior Publication Data
US 2019/0376608 A1 Dec. 12, 2019

(30) Foreign Application Priority Data

Jun. 12, 2018 (JP) .................. 2018-112120
Jun. 22, 2018 (JP) .................. 2018-118510
(Continued)

(51) Int. Cl.
*F16K 27/04* (2006.01)
*E03C 1/04* (2006.01)
*F16K 11/00* (2006.01)

(52) U.S. Cl.
CPC .......... *F16K 19/006* (2013.01); *F16K 27/044* (2013.01); *E03C 1/04* (2013.01);
(Continued)

(58) Field of Classification Search
CPC ........ E03C 1/04; E03C 1/0401; E03C 1/0403; E03C 2001/0416; E03C 2001/0417; Y10T 137/9464
See application file for complete search history.

(56) References Cited

U.S. PATENT DOCUMENTS

| 4,685,487 A * | 8/1987 | Derdack | ............... F16K 19/006 |
| | | | 137/315.13 |
| 6,868,564 B2 * | 3/2005 | Ginter | ................... F16K 27/045 |
| | | | 4/677 |

(Continued)

FOREIGN PATENT DOCUMENTS

| CN | 104372828 A | 2/2015 |
| CN | 105980639 A | 9/2016 |

(Continued)

OTHER PUBLICATIONS

Office Action issued in Japanese Application No. 2018-112120, dated Sep. 23, 2020 [with machine-generated translation].
(Continued)

*Primary Examiner* — Robert K Arundale
*Assistant Examiner* — Richard K. Durden
(74) *Attorney, Agent, or Firm* — BakerHostetler

(57) ABSTRACT

A faucet device includes: a base member; an outer shell member; a metallic casing member that is inserted in a columnar section of the outer shell member and whose one end is fixed to the base member; a hot-water supply pipe and a cold-water supply pipe that supply hot water and cold water, respectively; a single lever cartridge provided at the other end of the casing member; connecting members provided inside the casing member, connecting the hot-water supply pipe and the cold-water supply pipe to the single lever cartridge; a fixing member fixing the single lever cartridge to the connecting members; and mechanical engagement pins. The casing member is formed of a metallic
(Continued)

plate or pipe with a size that allows the casing member to be insertable into the columnar section of the outer shell member, and capable of retaining the connecting member in accordance with the mechanical engagement means.

26 Claims, 28 Drawing Sheets

(30) Foreign Application Priority Data

Jul. 11, 2018 (JP) ................................. 2018-131598
Sep. 13, 2018 (JP) ................................. 2018-171705

(52) U.S. Cl.
CPC .......... *E03C 1/0401* (2013.01); *E03C 1/0403* (2013.01); *Y10T 137/9464* (2015.04)

(56) References Cited

U.S. PATENT DOCUMENTS

| | | | | |
|---|---|---|---|---|
| 7,871,057 | B2* | 1/2011 | Shimizu | E03C 1/0404 251/129.04 |
| 8,240,326 | B2* | 8/2012 | Kacik | F16K 11/0787 137/315.12 |
| 8,567,429 | B2* | 10/2013 | Lin | F16K 27/045 137/315.11 |
| 10,233,617 | B1* | 3/2019 | He | E03C 1/0403 |
| 2007/0261167 | A1* | 11/2007 | Hecker | E03C 1/0401 4/675 |
| 2013/0112287 | A1 | 5/2013 | Kronenbitter et al. | |
| 2014/0251452 | A1* | 9/2014 | Schurle | F16K 11/14 137/315.12 |
| 2016/0376775 | A1* | 12/2016 | Tasserit | F16K 27/00 137/801 |
| 2017/0059050 | A1 | 3/2017 | Chiu et al. | |
| 2017/0247865 | A1 | 8/2017 | Nikles et al. | |

FOREIGN PATENT DOCUMENTS

| | | | | |
|---|---|---|---|---|
| DE | 102014001605 | A1 | 8/2015 | |
| EP | 0866180 | A2 | 9/1998 | |
| EP | 1479834 | A2 * | 11/2004 | ............... E03C 1/04 |
| EP | 2497866 | A2 | 9/2012 | |
| EP | 2 586 919 | A2 | 5/2013 | |
| JP | 8-239875 | A | 9/1996 | |
| JP | 2002-81108 | A | 3/2002 | |
| JP | 2004225525 | A | 8/2004 | |
| JP | 2005282250 | A | 10/2005 | |
| JP | 2008-516118 | A | 5/2008 | |
| JP | 2016148138 | A | 8/2016 | |
| JP | 2017194149 | A | 10/2017 | |
| TW | 365840 | U | 8/1999 | |
| WO | WO-2009069157 | A1 * | 6/2009 | ........... F16K 27/045 |

OTHER PUBLICATIONS

Office Action issued in Japanese Application No. 2018-131598, dated Sep. 23, 2020 [with machine-generated translation].
First Office Action issued in Chinese Application No. 201910485557.1, dated Nov. 2, 2020.
Office Action issued in Taiwanese Patent Application No. 108120089, dated May 7, 2020.
Office Action issued in Japanese Application No. 2018-171705, dated Aug. 31, 2020 [with machine translation].
Written Opinion/Search Report issued in Singaporean Application No. 10202108125U dated Oct. 5, 2021.
Notice of Reasons for Refusal issued in Japanese Patent Application No. 2018-118510 dated Mar. 28, 2022, with English translation.

* cited by examiner

FAUCET DEVICE AND MANUFACTURING METHOD THEREFOR

TECHNICAL FIELD

The present invention relates to faucet devices and manufacturing methods therefor, and particularly, to a faucet device and a manufacturing method therefor that allow a hot-and-cold water mixture containing hot water supplied from a hot-water supply source and cold water supplied from a cold-water supply source to be released and shut off.

BACKGROUND ART

A known faucet device in the related art that can release and shut off a hot-and-cold water mixture containing hot water supplied from a hot-water supply source and cold water supplied from a cold-water supply source includes an outer shell member formed to have a shape according to the type of the faucet device, as described in, for example, Patent Literature 1.

Furthermore, a separate casing member is inserted in the outer shell member of this faucet device in the related art. This casing member contains a faucet functioning unit. The faucet functioning unit has a function of mixing the hot water and the cold water supplied respectively from the hot-water supply source and the cold-water supply source via primary channels, and releasing and shutting off this hot-and-cold water mixture.

CITATION LIST

Patent Literature

[PTL 1] European Unexamined Patent Application Publication No. 2586919

SUMMARY OF INVENTION

Technical Problem

However, in the faucet device in the related art described above, since the casing member inserted in the outer shell member is composed of a resin material, a mold for injection molding needs to be prepared in accordance with the size and shape of the outer shell member according to the type of the faucet device, which is problematic in terms of a high manufacturing cost.

Moreover, the resinous casing member of the faucet device in the related art has lower strength than a metallic one, which is also problematic in terms of low durability due to, for example, deterioration over time. Therefore, in order to ensure long-term safety, there is a problem in terms of high costs for maintenance, such as inspection and component replacement.

Supposing that the casing member of the faucet device in the related art is formed by casting using metal, such as a copper alloy, different from a resin material, there is a problem, such as the necessity to take measures for controlling the elution of a lead component from the copper alloy, an increase in size of the casing member, or the susceptibility to market fluctuation of the price of copper.

Furthermore, if stainless steel with high corrosion resistance is used as the casing member in view of the circumstances in which the faucet device is constantly exposed to hot and cold water, there is a problem in that it is difficult to process the stainless steel with high processing accuracy.

Therefore, there have been demanded challenges in the recent years to use materials other than copper alloys by achieving a copper-alloy-free and casting-free configuration, and to reduce the manufacturing cost while increasing the degree of design freedom with respect to various specifications according to the types of faucet devices.

The present invention has been made to solve the aforementioned problems and demanded challenges in the related art, and an object thereof is to provide a faucet device and a manufacturing method therefor that can improve the degree of design freedom and can also reduce the manufacturing cost.

Solution to Problem

In order to solve the aforementioned problems, the present invention provides a faucet device that allows a hot-and-cold water mixture containing hot water supplied from a hot-water supply source and cold water supplied from a cold-water supply source to be released and shut off. The faucet device includes: a base member fixed to an installation surface on which the faucet device is installed; an outer shell member formed to have a shape according to a type of the faucet device and including a substantially-tubular columnar section attached to the base member; a metallic casing member inserted into the columnar section of the outer shell member and having one end fixed to the base member; a hot-water supply channel and a cold-water supply channel provided inside the casing member and extending downstream from the base member to form primary channels that supply the hot water and the cold water; a single lever cartridge provided inside another end of the casing member and including an on-off valve and a single lever, the on-off valve adjusting a mixture ratio and flow of the hot-and-cold water mixture supplied from the hot-water supply channel and the cold-water supply channel, the single lever allowing the on-off valve to open and close; a connecting member provided inside the casing member and connecting downstream ends of the hot-water supply channel and the cold-water supply channel to the single lever cartridge; and a fixing member that fixes the single lever cartridge to the connecting member. The casing member is formed of a metallic plate or pipe with a size that allows the casing member to be insertable into the columnar section of the outer shell member, and is fixed to the base member. The connecting member is retained by the casing member.

In the present invention having the above configuration, when the faucet device is to be assembled, the metallic casing member is inserted into the substantially-tubular columnar section of the outer shell member formed to have a shape according to the type of the faucet device. In that case, the casing member is fixed to the base member in a state where the connecting member is preliminarily retained by the casing member. Accordingly, the base member and the connecting member can be connected in the axial direction via the casing member.

Furthermore, with the metallic casing member, the space and the dimensional distance in the axial direction between the base member and the connecting member within the columnar section can be set in accordance with the outer shell member having a shape according to the type of the faucet device, and moreover, the strength of the internal structure inserted in the columnar section can be increased.

Moreover, the metallic casing member can be formed by using a metallic plate or pipe so as to be insertable into the columnar section of the outer shell member having a shape according to the type of the faucet device. Consequently, as compared with a case where the casing member is injection molded using a resin material or is cast molded using a metallic material, a mold for forming the casing member does not have to be prepared for each shape of the outer shell member according to the type of the faucet device, so that the size and shape of the casing member can be readily adjusted using a relatively inexpensive processing method.

Moreover, because the casing member is formed by using a metallic plate or pipe, the casing member can be formed to have a small thickness while required strength is maintained. Thus, the internal size of the faucet device can be reduced.

Furthermore, by preparing a casing member that is standardized to some extent for outer shell members having various shapes according to the types of faucet devices, the casing member can be adjusted to a desired size in the axial direction based on a relatively inexpensive processing method, such as a cutting process, on the casing member. Consequently, the dimensional distance in the axial direction of the casing member between the base member and the connecting member can also be freely set in accordance with the size of the casing member in the axial direction. Moreover, by simply inserting the casing member, whose size in the axial direction is adjusted, into the columnar section of the outer shell member, the assembly process can be readily performed.

As a result, the degree of design freedom of the faucet device can be improved, and the manufacturing cost can be reduced.

In the present invention, the casing member preferably has mechanical engagement means capable of retaining the connecting member in accordance with mechanical engagement. The casing member is preferably formed of a metallic plate or pipe with a size that allows the casing member to be insertable into the columnar section of the outer shell member, and is preferably fixed to the base member. The connecting member is preferably retained by the casing member in accordance with the mechanical engagement means.

In the invention having the above configuration, the degree of design freedom of the faucet device can be improved, and the manufacturing cost can be reduced.

In the present invention, the casing member is preferably formed to at least have a substantially semi-cylindrical shape. The mechanical engagement means is preferably first mechanical engagement means including a first engagement section that is formed by performing a bending or hole-forming process on a side portion of the casing member and that is engageable with the connecting member. The first engagement section is preferably capable of forming a first projection plane by being projected onto a plane orthogonal to an axial direction of the casing member, and preferably forms a surface mechanically engageable with the connecting member when the connecting member moves in the axial direction relative to the casing member, so that the casing member becomes capable of retaining the connecting member.

Supposing a case where the mechanical engagement means according to the present invention is not provided, for example, if the casing member is formed to at least have a substantially semi-tubular shape by using a metallic plate or pipe, the side portion of the casing member would be smooth with no projections or recesses. This is problematic in that it is difficult for the casing member to retain the connecting member and the base member.

Therefore, it is necessary that the side portion of the casing member be provided by some type of means with an engagement section or surface that can retain the connecting member by mechanically engaging therewith.

In the present invention, even with the casing member formed to at least have a substantially semi-tubular shape by using a metallic plate or pipe, the first engagement section can still be formed as mechanical engagement means by performing a bending or hole-forming process on the side portion of the casing member.

Moreover, the first engagement section is capable of forming the first projection plane by being projected onto a plane orthogonal to the axial direction of the casing member, and can form a surface mechanically engageable with the connecting member when the connecting member moves in the axial direction relative to the casing member.

Specifically, the fact that the first projection plane can be formed by projecting the first engagement section onto the plane orthogonal to the axial direction of the casing member implies that a plane that allows the first engagement section of the casing member to mechanically engage with the connecting member can be formed when the connecting member moves in the axial direction relative to the casing member.

Therefore, with such a first engagement section that can form the first projection plane, the casing member can retain the connecting member.

In the present invention, it is more preferable that the casing member further has second mechanical engagement means capable of retaining the base member in accordance with mechanical engagement, the second mechanical engagement means including a second engagement section that is formed by performing a bending or hole-forming process on the side portion of the casing member and that is engageable with the base member. The second engagement section is preferably capable of forming a second projection plane by being projected onto the plane orthogonal to the axial direction of the casing member, and preferably forms a surface mechanically engageable with the base member when the base member moves in the axial direction relative to the casing member, so that the casing member becomes capable of retaining the base member.

In the present invention having the above configuration, even with the casing member formed to at least have a substantially semi-tubular shape by using a metallic plate or pipe, the second engagement section can still be formed as second mechanical engagement means by performing a bending or hole-forming process on the side portion of the casing member. With the second engagement section, the casing member can retain the base member.

Moreover, the second engagement section is capable of forming the second projection plane by being projected onto the plane orthogonal to the axial direction of the casing member, and can form a surface mechanically engageable with the base member when the base member moves in the axial direction relative to the casing member.

Specifically, the fact that the first projection plane can be formed by projecting the first engagement section onto the plane orthogonal to the axial direction of the casing member implies that a plane that allows the first engagement section of the casing member to mechanically engage with the connecting member can be formed when the connecting member moves in the axial direction relative to the casing member.

Therefore, with such a first engagement section that can form the first projection plane, the casing member can retain the connecting member.

Specifically, the fact that the second projection plane can be formed by projecting the second engagement section onto the plane orthogonal to the axial direction of the casing member implies that a plane that allows the second engagement section of the casing member to mechanically engage with the base member can be formed when the base member moves in the axial direction relative to the casing member.

Therefore, with such a second engagement section that can form the second projection plane, the casing member can retain the base member.

In the present invention, the hot-water supply channel and the cold-water supply channel are preferably formed of supply pipes separate from the base member. The supply pipes preferably include connection sections connected in a watertight manner by being fitted into connection receivers of the base member and the connecting member. The connection receivers of the base member and the connecting member preferably have clearances that allow the connection sections of the supply pipes to move while watertightness relative to the connection receivers of the base member and the connecting member is maintained in a state where the connection sections of the supply pipes are connected to the connection receivers of the base member and the connecting member.

In the present invention having the above configuration, thermal expansion occurs in the supply pipe of the hot-water supply channel and the supply pipe of the neighboring cold-water supply channel or in the connection sections of the supply pipes particularly in accordance with the amount of heat of hot water flowing through the supply pipe of the hot-water supply channel, sometimes causing movement to occur in the axial direction. In this case, the connection sections of the supply pipes can move while maintaining the watertight state within the ranges of the clearances in the connection receivers of the base member and the connecting member. Consequently, the movement of the connection sections of the supply pipes caused by thermal expansion can be compensated.

In the present invention, it is preferable that the casing member includes an upper casing member having a bottom surface on which the single lever cartridge is disposed, and also includes a lower casing member provided below the upper casing member and at least having a semi-tubular shape.

In the present invention having the above configuration, the single lever cartridge can be disposed on the bottom surface of the upper casing member, so that the single lever cartridge can be reliably retained by the upper casing member having a closed bottom.

In the present invention, it is preferable that the lower casing member is substantially C-shaped in cross section.

In the present invention having the above configuration, the lower casing member is formed to be substantially C-shaped in cross section, so that when the lower casing member is to be formed into a substantially C-shape, the metallic plate can be formed readily using a relatively inexpensive bending process.

Moreover, by simply changing the lower casing member to be formed using the relatively inexpensive bending process, casing members of various shapes according to the types of faucet devices can be prepared, and further cost reduction can be achieved.

Consequently, the degree of design freedom of the faucet device can be improved, and the manufacturing cost can be reduced.

In the present invention, the connecting member preferably includes a primary adapter section to which downstream connecting sections of a hot-water supply pipe that forms the hot-water supply channel and a cold-water supply pipe that forms the cold-water supply channel are connected in a watertight manner in an axial direction, and also includes a valve seat section whose upstream side is connected to the primary adapter section and whose downstream side is connected in a watertight manner to the single lever cartridge. An outer diameter of the primary adapter section is preferably set to be larger than an outer diameter of the valve seat section.

In the present invention having the above configuration, for example, in a case where the single lever cartridge used has a relatively small outer diameter, even if the outer diameter of the valve seat section to which the single lever cartridge is connected is set to be relatively small, the outer diameter of the primary adapter section can still be set to be larger than the outer diameter of the valve seat section.

Therefore, the space in which the hot-water supply pipe and the cold-water supply pipe are each connected in the axial direction can be sufficiently ensured in the primary adapter section.

In the present invention, it is preferable that the connecting member is composed of a resin material.

In the present invention having the above configuration, because the connecting member is composed of a resin material, an inexpensive and lightweight connecting member can be provided, and the leaching performance can also be ensured.

The present invention also provides a method for manufacturing a faucet device that allows a hot-and-cold water mixture containing hot water supplied from a hot-water supply source and cold water supplied from a cold-water supply source to be released and shut off. The method includes: a step for preparing a base member to be fixed to an installation surface of the faucet device; a step for preparing an outer shell member in accordance with a type of the faucet device, the outer shell member including a substantially-tubular columnar section to be attached to the base member; a step for preparing a metallic casing member to be inserted into the columnar section of the outer shell member; a step for preparing a hot-water supply pipe for supplying the hot water from the hot-water supply source and a cold-water supply pipe for supplying the cold water from the cold-water supply source; a step for preparing a single lever cartridge including an on-off valve for opening and closing a secondary channel downstream of the hot-water supply pipe and the cold-water supply pipe and a single lever that allows the on-off valve to open and close, the single lever cartridge being provided in the casing member; a step for preparing a connecting member that connects downstream ends of the hot-water supply pipe and the cold-water supply pipe to the single lever cartridge inside the casing member; a step for preparing a fixing member that fixes the single lever cartridge to the connecting member; and a step for preparing mechanical engagement means that mechanically engages the casing member and the connecting member with each other. The step for preparing the metallic casing member includes performing a bending process using a metallic plate or pipe so that the casing member is at least formed to be substantially semi-tubular with a size that allows the casing member to be insertable into the columnar section of the outer shell member. After the step for preparing the mechanical engagement means, the connecting member is retained by the casing member in accordance with the mechanical engagement means, and the casing member is fixed to the base member.

In the present invention having the above configuration, when the faucet device is to be manufactured, the metallic casing member at least having a substantially semi-tubular shape is inserted into the columnar section of the outer shell member formed to have a shape according to the type of the faucet device. In that case, the casing member is fixed to the base member in a state where the connecting member is preliminarily retained by the casing member in accordance with the mechanical engagement means. Accordingly, the base member and the connecting member can be connected in the axial direction of the casing member.

Furthermore, with the metallic casing member, the space and the dimensional distance in the axial direction between the base member and the connecting member within the columnar section can be ensured in accordance with the outer shell member having a shape according to the type of the faucet device, and moreover, the strength of the internal structure within the columnar section can be increased.

Moreover, the metallic casing member can be formed to at least have a substantially semi-tubular shape by using a metallic plate or pipe so as to be insertable into the columnar section of the outer shell member having a shape according to the type of the faucet device. Consequently, as compared with a case where the casing member is injection molded using a resin material or is cast molded using a metallic material, a mold for forming the casing member does not have to be prepared for each shape of the outer shell member according to the type of the faucet device, so that the size and shape of the casing member can be readily adjusted using a relatively inexpensive processing method.

Moreover, because the casing member is formed to at least have a substantially semi-tubular shape by using a metallic plate or pipe, the casing member can be formed to have a small thickness while required strength is maintained. Thus, the internal size of the faucet device can be reduced.

Furthermore, by preparing a casing member that is standardized to some extent for outer shell members having various shapes according to the types of faucet devices, the casing member can be adjusted to a desired size in the axial direction based on a relatively inexpensive processing method, such as a cutting process, on the casing member. Consequently, the dimensional distance in the axial direction of the casing member between the base member and the connecting member can also be freely set in accordance with the size of the casing member in the axial direction. Moreover, by simply inserting the casing member, whose size in the axial direction is adjusted, into the columnar section of the outer shell member, the assembly process can be readily performed.

As a result, the degree of design freedom of the faucet device can be improved, and the manufacturing cost can be reduced.

In the present invention, it is preferable that the step for preparing the mechanical engagement means includes performing a plastic working process on the casing member so as to form an engagement section mechanically engageable with the connecting member. The engagement section serves as a part of the mechanical engagement means.

In the present invention having the above configuration, even with the casing member formed to at least have a substantially semi-tubular shape by using a metallic plate or pipe, an engagement section can still be formed as a part of the mechanical engagement means by performing a plastic working process on a part of the casing member. With this engagement section, the casing member can reliably retain the connecting member.

In the present invention, it is preferable that the step for preparing the mechanical engagement means includes forming an opening by performing a hole-forming process on the casing member. A cross section of the opening serves as a part of the mechanical engagement means.

In the present invention having the above configuration, even with the casing member formed to at least have a substantially semi-tubular shape by using a metallic plate or pipe, the cross section of the opening can still be formed as a part of the mechanical engagement means by performing a hole-forming process on the casing member.

Accordingly, mechanical engagement between the casing member and the connecting member or the base member can be reliably performed.

In the present invention, it is preferable that the step for preparing the metallic casing member includes forming an upper casing member having a bottom surface on which the single lever cartridge is to be disposed as a part of the casing member, and forming a lower casing member to be provided below the upper casing member and at least having a semi-tubular shape as a part of the casing member. The upper casing member is preferably formed to have a closed-bottom shape by performing raising on the metallic plate.

In the present invention having the above configuration, the single lever cartridge can be disposed on the bottom surface of the upper casing member, so that the single lever cartridge can be reliably retained.

Furthermore, the metallic plate undergoes raising so that a closed-bottom upper casing member can be integrally formed in a state where there are no joint lines caused by, for example, welding. Consequently, there is no risk that joint lines caused by, for example, welding in the upper casing member may come into contact with water in the vicinity of the single lever cartridge retained by the upper casing member, whereby the risk of corrosion of the metallic upper casing member can be reduced.

In the present invention, it is preferable that the step for preparing the metallic casing member includes forming the lower casing member into a curved shape by performing bending on the metallic plate.

In the present invention having the above configuration, the lower casing member can be formed into a curved shape by performing bending on a thin metallic plate, so that, for example, the lower casing member can be formed into a substantially C-shape in cross section.

Accordingly, the lower casing member can be formed readily by performing a relatively inexpensive bending process on a metallic plate, whereby the degree of design freedom of the faucet device can be improved, and the manufacturing cost can be reduced.

Furthermore, according to the present invention, the faucet device further includes a spout-channel forming member provided in the spout section and forming a spout channel extending to an outlet. The casing member is formed of a metallic plate or pipe with a size that allows the casing member to be insertable into the columnar section of the outer shell member. The secondary adapter member is provided between the casing member and the outer shell member. The secondary adapter member is supported by the casing member. The spout-channel forming member is fixed by the secondary adapter member.

In the present invention having the above configuration, when the faucet device is to be assembled, the metallic casing member at least having a substantially semi-tubular shape is inserted into the substantially-tubular columnar section of the outer shell member formed to have a shape according to the type of the faucet device. In that case, with the metallic casing member, the space and the dimensional distance in the axial direction within the columnar section can be preliminarily set in accordance with the outer shell member having a shape according to the type of the faucet device, and moreover, the strength of the internal structure inserted in the columnar section can be increased.

Moreover, the metallic casing member can be formed to at least have a substantially semi-tubular shape by using a metallic plate or pipe so as to be insertable into the columnar section of the outer shell member having a shape according to the type of the faucet device. Consequently, as compared with a case where the casing member is injection molded using a resin material or is cast molded using a metallic material, a mold for forming the casing member does not have to be prepared for each shape of the outer shell member according to the type of the faucet device, so that the size and shape of the casing member can be readily adjusted using a relatively inexpensive processing method.

Moreover, because the casing member is formed to at least have a substantially semi-tubular shape by using a metallic plate or pipe, the casing member can be formed to have a small thickness while required strength is maintained. Thus, the internal size of the faucet device can be reduced.

Furthermore, by preparing a casing member that is standardized to some extent for outer shell members having various shapes according to the types of faucet devices, the casing member can be adjusted to a desired size in the axial direction based on a relatively inexpensive processing method by simply performing, for example, a cutting process on a part of the casing member. Consequently, the dimensional distance in the axial direction of the casing member between the base member and the connecting member can also be freely set in accordance with the size of the casing member in the axial direction. Moreover, by simply inserting the casing member, whose size in the axial direction is adjusted, into the columnar section of the outer shell member, the assembly process can be readily performed.

As a result, the degree of design freedom of the faucet device can be improved, and the manufacturing cost can be reduced.

Furthermore, according to the present invention, the secondary adapter member is provided between the casing member and the outer shell member. The secondary adapter member is supported by the casing member, and the spout-channel forming member is fixed by the secondary adapter member. Accordingly, the spout-channel forming member is supported by the casing member via the secondary adapter member. Therefore, the outer shell member becomes free from (at least a part of) the support for the spout-channel forming member, so that the strength required in the outer shell member can be reduced.

In the present invention, it is preferable that the secondary adapter member has a tubular section that surrounds the casing member in a circumferential direction.

Accordingly, the secondary adapter member can be effectively supported by the casing member. Moreover, the secondary adapter member can be readily designed to be small (thin), so that the compactness of the faucet device is not inhibited.

Furthermore, in the present invention, it is preferable that a secondary-adapter-member-side end of the spout-channel forming member is fixed by being inserted into an opening provided in the secondary adapter member via a seal member, such as an O-ring.

Accordingly, the spout-channel forming member can be effectively supported by the secondary adapter member.

Moreover, in this case, it is more preferable that an outer peripheral surface of the spout-channel forming member is provided with a protrusion near the secondary-adapter-member-side end of the spout-channel forming member, and that a securing member that prevents the spout-channel forming member from falling out from the secondary adapter member by securing an outlet-side surface of the protrusion is supported by the secondary adapter member.

Accordingly, the spout-channel forming member can be effectively prevented from falling out from the secondary adapter member. Moreover, the securing member is supported by (e.g. fixed to) the secondary adapter member so that the securing force is also supported by the casing member via the secondary adapter member, whereby an undesired load does not occur in the outer shell member.

The protrusion may be provided in, for example, a flanged shape.

The securing member may be formed of, for example, a tubular member or cross-sectionally circular-arc-shaped (e.g. cross-sectionally C-shaped) wall member provided with a fit recess. The fit recess may have a shape and size that allow the protrusion of the spout-channel forming member to fit to a part adjacent thereto at an outlet side but do not allow the protrusion to pass through.

Moreover, the securing member is composed of, for example, metal so that sufficient strength is ensured.

On the other hand, the secondary adapter member and the spout-channel forming member are normally composed of resin.

Furthermore, in the present invention, it is preferable that an outer peripheral surface at a lower side of the spout-channel forming member is provided with a rib near a secondary-adapter-member-side end of the spout-channel forming member, and that the rib extends toward the secondary-adapter-member-side end of the spout-channel forming member and is in contact with the secondary adapter member.

Accordingly, the rib in contact with the secondary adapter member functions similarly to a "tension rod", so that the occurrence of a phenomenon in which the outlet side of the spout-channel forming member bends downward ("bows") can be effectively suppressed.

In the present invention, it is preferable that the faucet device further includes: a functional unit that is inserted in the columnar section of the outer shell member and that performs water release and shut-off control and/or temperature control; a hot-water supply channel and a cold-water supply channel extending to the functional unit and forming the primary channels for supplying the hot water and the cold water; and a spout-channel forming member provided in the spout section and forming a spout channel extending to an outlet. A substantially-tubular secondary adapter member is preferably provided between the functional unit and the columnar section. The spout-channel forming member preferably communicates with the secondary adapter member.

According to the present invention, the substantially-tubular secondary adapter member is provided between the functional unit and the columnar section, and the spout-channel forming member is fixed by the secondary adapter member.

Accordingly, the spout-channel forming member may be supported by, for example, the functional unit (more specifically, the base member to be described below) via the secondary adapter member. Therefore, the outer shell member becomes free from (at least a part of) the support for the spout-channel forming member, so that the strength required in the outer shell member can be reduced.

Furthermore, the columnar section of the outer shell member and the secondary adapter member are separate components, so that the material of the outer shell member can be widely selected from materials that satisfy the external appearance quality, and the material of the secondary adapter member can be widely selected from materials that satisfy required flow-related specifications. Consequently, the degree of design freedom can be improved, and the manufacturing cost can be reduced.

Furthermore, there is also an advantage in that the process for attaching the spout-channel forming member to the secondary adapter member can be readily performed (i.e. the process can be performed from the outlet side).

In the present invention, a secondary channel sealed in a watertight manner is preferably formed between an outer peripheral surface of the functional unit and an inner peripheral surface of the secondary adapter member. The outer peripheral surface of the functional unit is preferably provided with an outflow hole that allows the hot-and-cold water mixture mixed in the secondary channel to flow out. The spout-channel forming member preferably communicates with the secondary channel.

Accordingly, the secondary channel can be designed to have a desired shape, so that a problem occurring from the device material being exposed to water (e.g. elution of a lead component from a copper alloy) can be effectively avoided.

Furthermore, it is preferable that the outer shell member and the secondary adapter member are rotatable together relative to the functional unit.

Accordingly, by rotating the outer shell member and the secondary adapter member relative to the functional unit, the direction in which water is released can be appropriately adjusted, so that the user-friendliness of the faucet device can be further enhanced.

Even in the case where the secondary channel is formed between the outer peripheral surface of the functional unit and the inner peripheral surface of the secondary adapter member, the rotation of the outer shell member and the secondary adapter member relative to the functional unit is not inhibited so long as, for example, the watertight state is maintained by a shaft seal.

Furthermore, in this case, it is more preferable that the outer shell member and the secondary adapter member are directly engaged with each other in a rotational direction with respect to the functional unit.

Accordingly, the occurrence of rattling can be significantly suppressed, as compared with a case where the rotational force is transmitted between the outer shell member and the secondary adapter member via the spout-channel forming member.

Furthermore, in a case where the faucet device according to the present invention further includes a base member fixed to an installation surface on which the faucet device is installed, the functional unit is preferably fixed to the base member, a lower end of the secondary adapter member is preferably provided with a flange, the flange of the secondary adapter member is preferably placed on the base member, and a lower end of the columnar section is preferably placed on the flange of the secondary adapter member.

Accordingly, since the columnar section of the outer shell member and the base member are prevented from directly rubbing against each other, even if these components are plated with a coating, there is no possibility of delamination of the coating.

Furthermore, the secondary adapter member may be split into two or more pieces in the vertical direction. For example, the secondary adapter member may have an upper secondary adapter member and a lower secondary adapter member.

In this case, it is preferable that a secondary channel sealed in a watertight manner is formed between an outer peripheral surface of the functional unit and an inner peripheral surface of the upper secondary adapter member. The outer peripheral surface of the functional unit is preferably provided with an outflow hole that allows the hot-and-cold water mixture mixed in the secondary channel to flow out. The spout-channel forming member preferably communicates with the secondary channel.

Accordingly, the secondary channel can be designed to have a desired shape, so that a problem occurring from the device material being exposed to water (e.g. elution of a lead component from a copper alloy) can be effectively avoided.

Furthermore, the lower secondary adapter member is not involved with the secondary channel, meaning that a particular adjustment process is not necessary even when the lower secondary adapter member is replaced. Therefore, by preparing lower secondary adapter members having different heights and replacing them where appropriate, the height of the secondary adapter member can be readily changed.

Advantageous Effects of Invention

According to the faucet device and the manufacturing method therefor according to the present invention, the degree of design freedom can be improved, and the manufacturing cost can be reduced.

DESCRIPTION OF EMBODIMENTS

A faucet device according to a first embodiment of the present invention will be described below with reference to the appended drawings.

Figure 1:
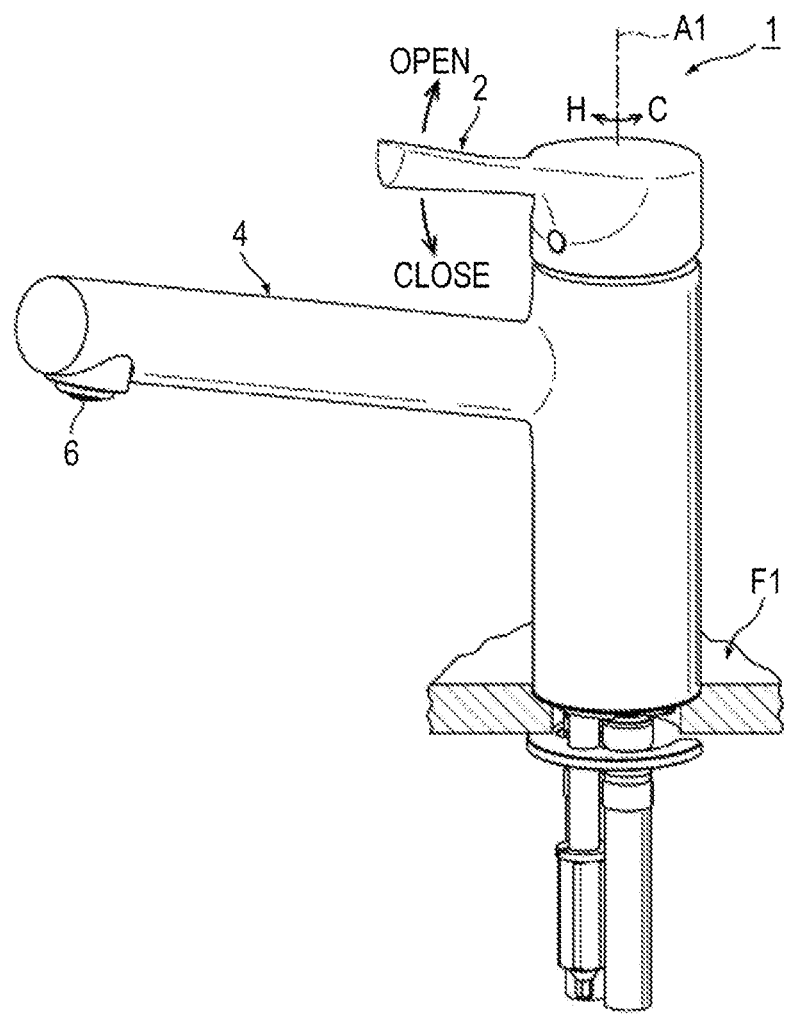
FIG. 1 is a schematic perspective view of a faucet device according to a first embodiment of the present invention, as viewed at an angle from the front.

First, FIG. 1 is a schematic perspective view of the faucet device according to the first embodiment of the present invention, as viewed at an angle from the front.

As illustrated in FIG. 1, a faucet device 1 according to the first embodiment of the present invention is a so-called "single-lever" faucet device that releases and shuts off a mixture of hot water supplied from a hot-water supply source (not illustrated) and cold water supplied from a cold-water supply source (not illustrated), and is installed on an installation surface F1 of, for example, a kitchen sink or a washbasin counter.

Specifically, with regard to this single-lever faucet device 1, when a single operation handle 2 called a "single lever" is manually rotated, a flow-controlled and temperature-controlled hot-and-cold water mixture is released or shut off from an outlet 6 of a spout 4.

For example, as illustrated in FIG. 1, in the faucet device 1 according to this embodiment, when the operation handle 2 is first set at the lowest shut-off operational position, the hot-and-cold water mixture to be released from the outlet 6 of the spout 4 is shut off.

Furthermore, as illustrated in FIG. 1, when the operation handle 2 is rotated to an upper operational position from the shut-off operational position, the hot-and-cold water mixture to be released from the outlet 6 of the spout 4 is set to be in a release state.

Specifically, in the release state, the operation handle 2 is set such that the flow of hot-and-cold water mixture increases as the operation handle 2 is rotated further upward (i.e. in the direction indicated by the arrow "open" illustrated in FIG. 1) and that the flow of hot-and-cold water mixture decreases as the operation handle 2 is rotated further downward (i.e. in the direction indicated by the arrow "close" illustrated in FIG. 1).

Furthermore, as illustrated in FIG. 1, in a case where the operation handle 2 is rotated toward the cold-water side (i.e. toward the arrow "C" illustrated in FIG. 1) about a central axis (i.e. a rotational central axis A1) extending in the vertical direction of the faucet device 1, the temperature of hot-and-cold water mixture to be released from the outlet 6 of the spout 4 is set to a lower temperature.

In contrast, as illustrated in FIG. 1, in a case where the operation handle 2 is rotated toward the hot-water side (i.e. toward the arrow "H" illustrated in FIG. 1) about the rotational central axis A1, hot water is set to be larger in the mixture ratio of hot-and-cold water mixture to be released from the outlet 6 of the spout 4.

Next, the internal structure of the faucet device according to the first embodiment of the present invention will be described in detail with reference to FIGS. 2 to 11.

Figure 2:
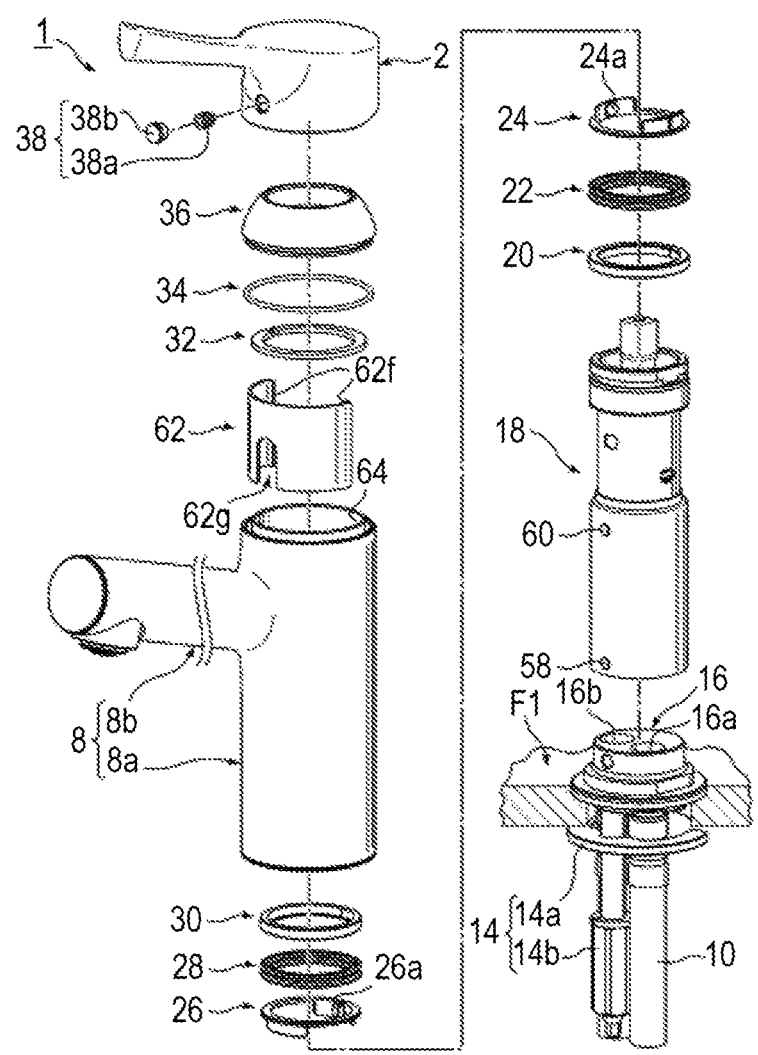
FIG. 2 is an exploded perspective view of the entire faucet device according to the first embodiment of the present invention.
Figure 3:
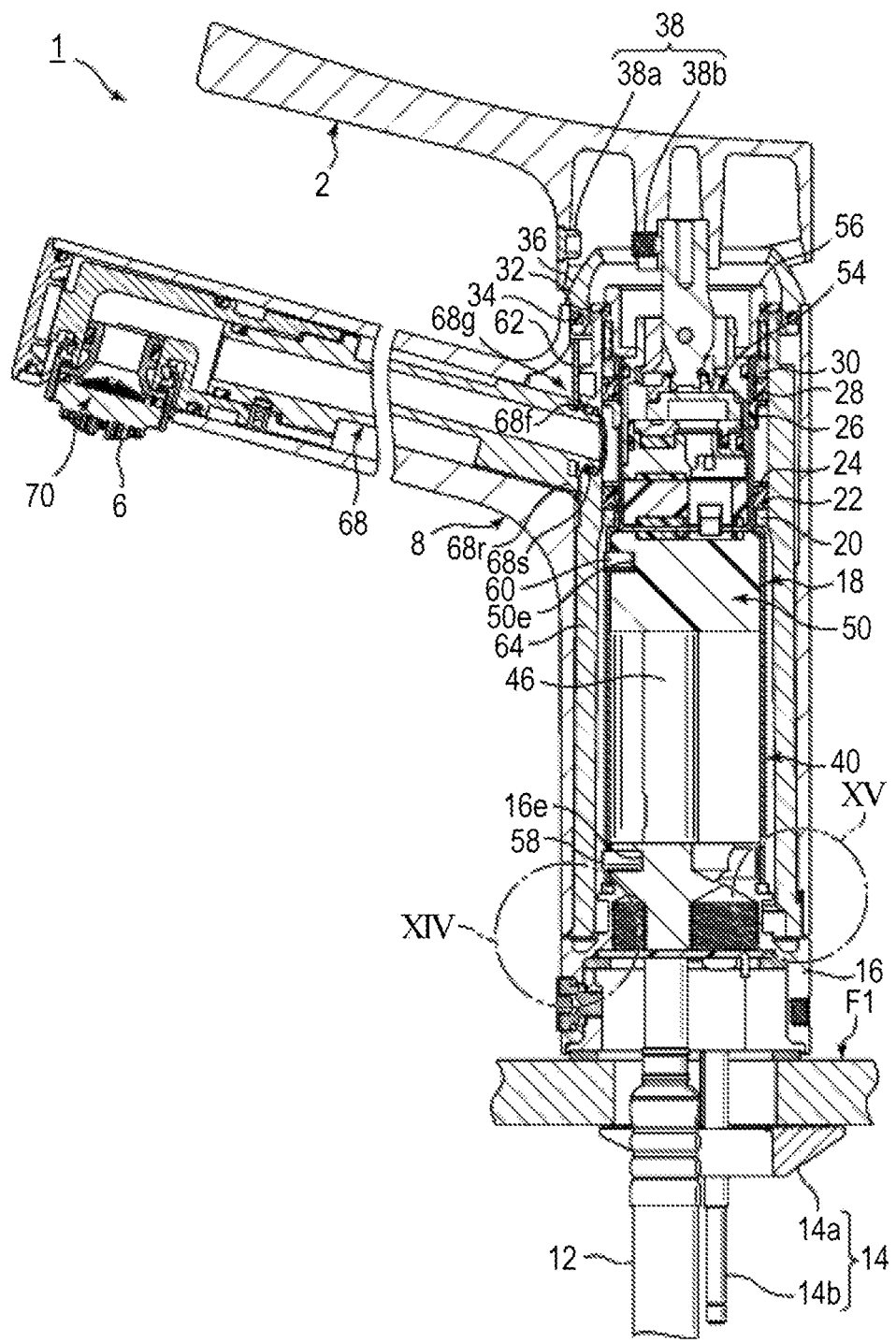
FIG. 3 is a central cross-sectional view of the faucet device according to the first embodiment of the present invention.

FIG. 2 is an exploded perspective view of the entire faucet device according to the first embodiment of the present invention. FIG. 3 is a central cross-sectional view of the faucet device according to the first embodiment of the present invention.

First, as illustrated in FIGS. 2 and 3, the faucet device 1 according to this embodiment includes a hollow outer shell member 8 (i.e. a component of an outer shell unit) formed to a shape according to the type or specifications of the faucet device 1. The outer shell member 8 includes a columnar section 8a extending substantially tubular in the vertical direction and a spout section 8b extending outward from the side surface of the columnar section 8a.

The outer shell member 8 may be composed of a metallic material or may be composed of a resin material.

Next, as illustrated in FIGS. 2 and 3, the faucet device 1 according to this embodiment includes a hot-water supply pipe 10, a cold-water supply pipe 12, fixation fittings 14 (i.e. a gripper 14a and a fastener 14b), and a base member 16 that are provided below (i.e. the upstream side of) the outer shell member 8.

As illustrated in FIGS. 2 and 3, in a state where the base member 16 is disposed on the installation surface F1 of the faucet device 1, the base member 16 is fixed thereto by the gripper 14a, which is horseshoe-shaped, and the fastener 14b of the fixation fittings 14.

Furthermore, as illustrated in FIG. 2, the base member 16 is provided with a hot-water hole 16a and a cold-water hole 16b that extend vertically therethrough. The hot-water supply pipe 10 that supplies hot water from the hot-water supply source (not illustrated), such as a water heater, is connected to the hot-water hole 16a from below. Likewise, the cold-water supply pipe 12 that supplies cold water from the cold-water supply source (not illustrated), such as a waterworks, is connected to the cold-water hole 16b from below.

Moreover, as illustrated in FIGS. 2 and 3, the faucet device 1 according to this embodiment includes a faucet functioning unit 18, to be described below in detail, inside the columnar section 8a of the outer shell member 8.

Figure 4:
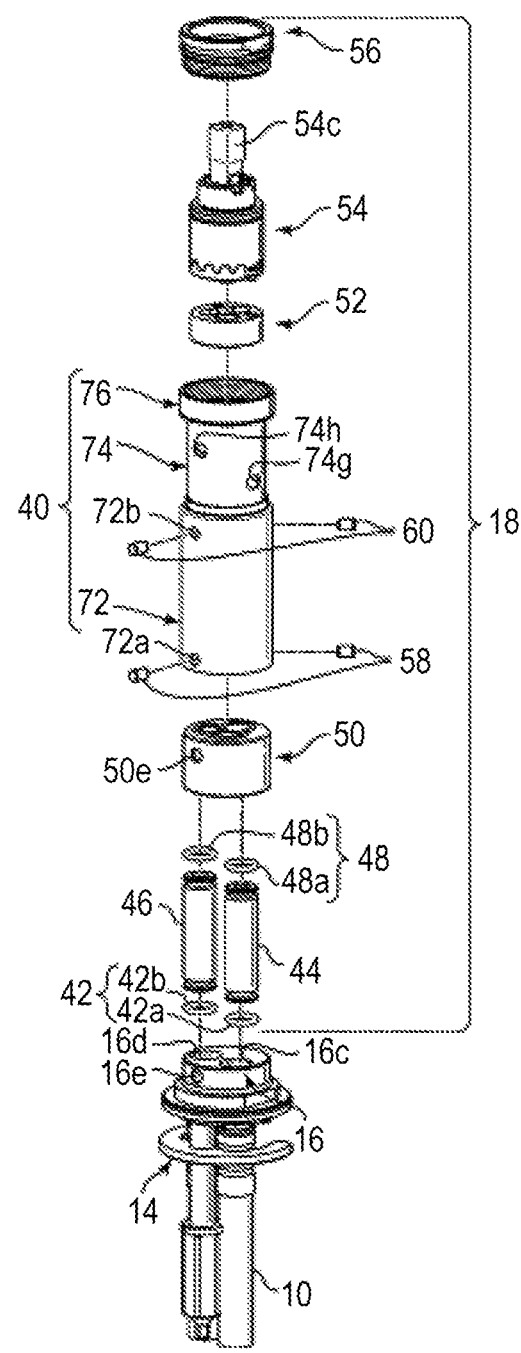
FIG. 4 is a perspective view of a faucet functioning unit of the faucet device according to the first embodiment of the present invention in a disassembled state.
Figure 5:
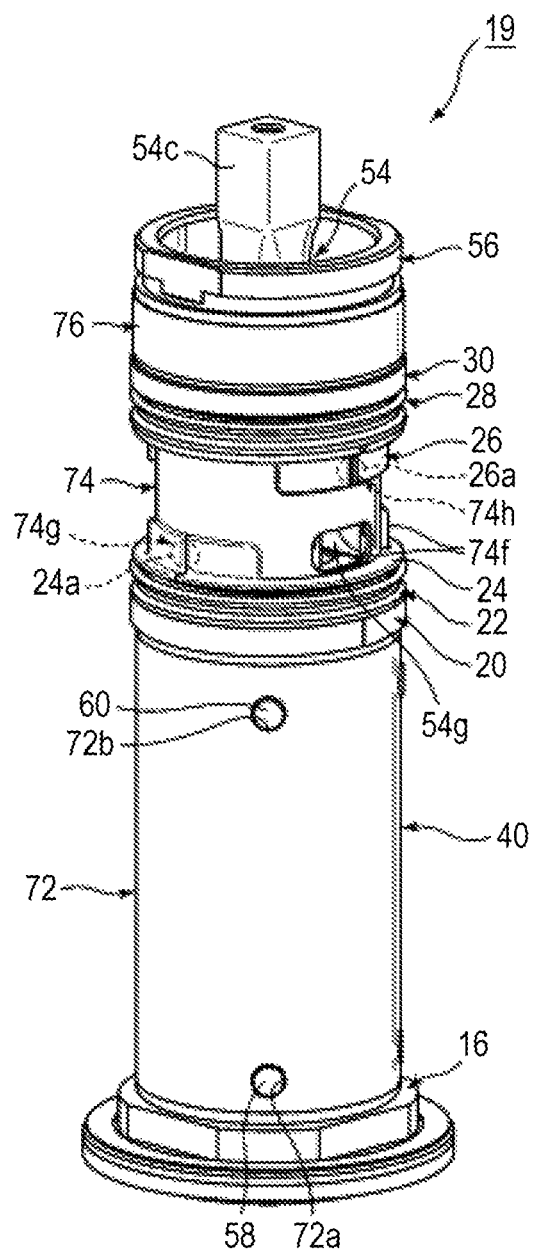
FIG. 5 is a perspective view of the faucet functioning unit of the faucet device according to the first embodiment of the present invention, as viewed at an angle from the rear.

Next, FIG. 4 is a perspective view of the faucet functioning unit 18 of the faucet device 1 according to the first embodiment of the present invention in a disassembled state. FIG. 5 is a perspective view of a functional unit 19 of the faucet device 1 according to the first embodiment of the present invention, as viewed at an angle from the rear.

As illustrated in FIGS. 4 and 5, at the outer side of the faucet functioning unit 18, the faucet device 1 according to this embodiment includes a lower-side lower-seal retaining member 20, a lower seal member 22, an upper-side lower-seal retaining member 24, a lower-side upper-seal retaining member 26, an upper seal member 28, and an upper-side upper-seal retaining member 30, from the lower side toward the upper side. A configuration obtained by attaching the lower-side lower-seal retaining member 20, the lower seal member 22, the upper-side lower-seal retaining member 24, the lower-side upper-seal retaining member 26, the upper seal member 28, and the upper-side upper-seal retaining member 30 to the faucet functioning unit 18 is the functional unit 19.

Furthermore, as illustrated in FIGS. 4 and 5, the lower seal member 22 and the upper seal member 28 form a watertight seal between the outer side surface of the faucet functioning unit 18 and the inner side surface of the columnar section 8a of the outer shell member 8.

Moreover, as illustrated in FIGS. 4 and 5, the lower-side lower-seal retaining member 20 and the upper-side lower-seal retaining member 24 are for retaining the lower seal member 22, and the lower-side upper-seal retaining member 26 and the upper-side upper-seal retaining member 30 are for retaining the upper seal member 28.

Figure 6:
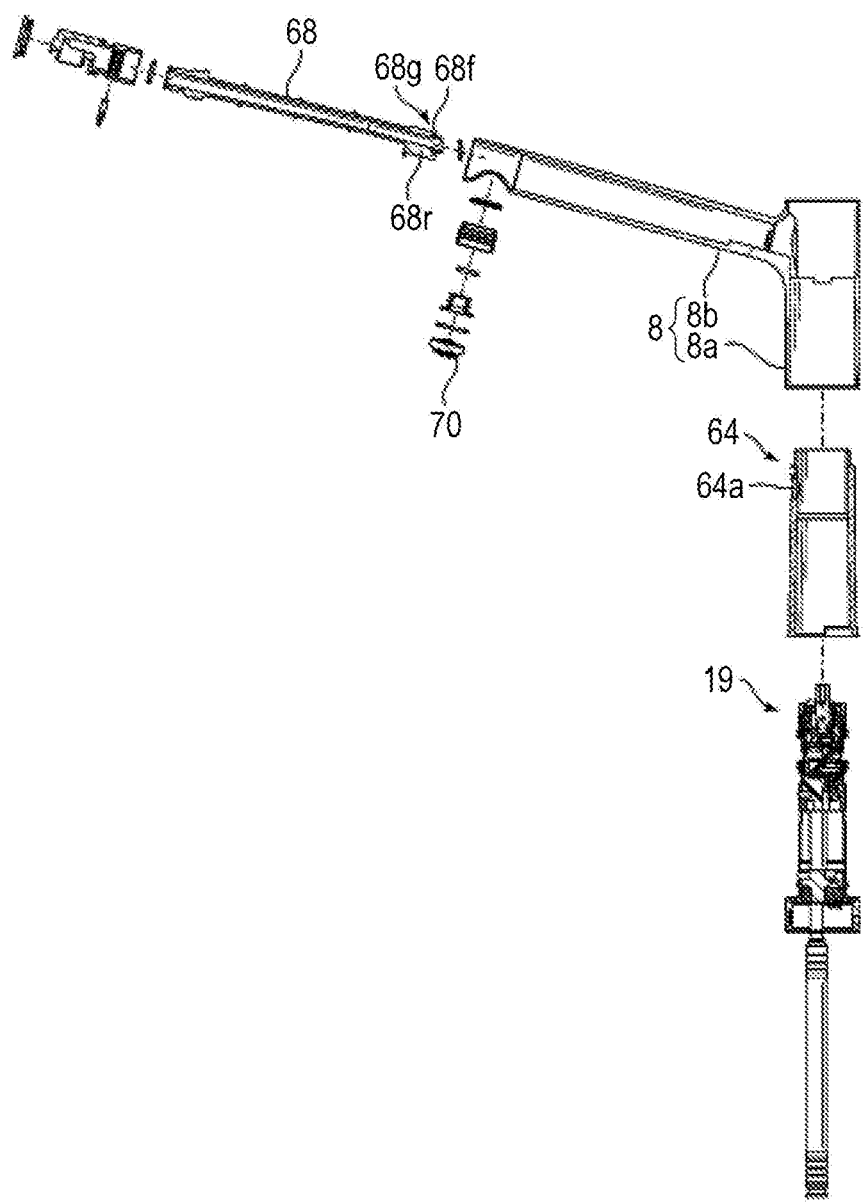
FIG. 6 is an exploded vertical-sectional view of a functional unit, a secondary adapter member, and an outer shell member of the faucet device according to the first embodiment of the present invention.
Figure 7:
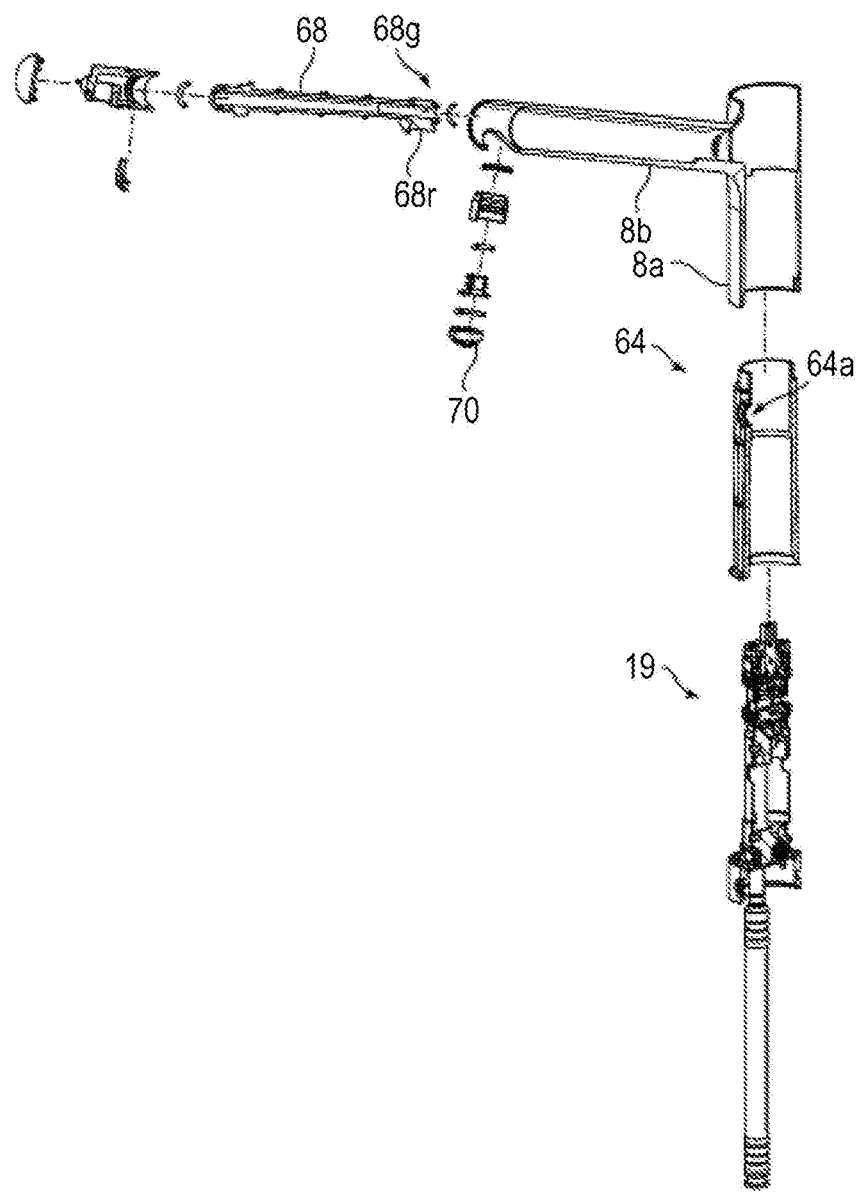
FIG. 7 is an exploded vertical-sectional perspective view of the functional unit, the secondary adapter member, and the outer shell member in FIG. 6.

FIG. 6 is an exploded vertical-sectional view of the functional unit 19, a secondary adapter member 64, and the outer shell member 8 of the faucet device according to the first embodiment of the present invention. FIG. 7 is an exploded vertical-sectional perspective view of the functional unit 19, the secondary adapter member 64, and the outer shell member 8 in FIG. 6.

As illustrated in FIGS. 6 and 7, the columnar section 8a of the outer shell member 8 forms a substantially-cylindrical functional-unit accommodating space, and the functional unit 19 is accommodated within this functional-unit accommodating space. It is clear from FIGS. 6 and 7 that the outer shell member 8 can be detachably attached to the functional unit 19 to cover the functional unit 19 from above.

Furthermore, as illustrated in FIGS. 3, 6, and 7, in the spout section 8b of the outer shell member 8, the faucet device 1 according to this embodiment includes a spout-channel forming member 68 that forms a spout channel 68a, and also includes an outlet forming member 70 that forms the outlet 6.

A configuration obtained by attaching the secondary adapter member 64, the spout-channel forming member 68, and the outlet forming member 70 to the outer shell member 8 is the outer shell unit.

Although the components of the outer shell unit are normally assembled together before being attached to the functional unit 19, some of sub units may be assembled together while being sequentially attached to the functional unit 19.

Furthermore, as illustrated in FIGS. 2 and 3, the faucet device 1 according to this embodiment includes a C-ring 32, a seal member 34, a fixing member 36, and fasteners 38 (i.e. a screw 38a and a cap 38b), from the lower side toward the upper side, between the outer shell member 8 and the operation handle 2 thereabove in the vertical direction.

These members 32, 34, 36, and 38 retain the functional unit 19, inserted in the columnar section 8a of the outer shell member 8, in a watertight manner from above.

Furthermore, as illustrated in FIGS. 2 and 3, the secondary adapter member 64 having a substantially tubular shape is provided between the outer shell member 8 and the faucet functioning unit 18 (i.e. a casing member 40, see FIG. 4). The secondary adapter member 64 is formed as a tubular member that surrounds the faucet functioning unit 18 (i.e. the casing member 40) in the circumferential direction, and is supported by the casing member 40.

Moreover, as illustrated in FIG. 2, a substantially semi-tubular securing member 62 is provided between the outer shell member 8 and the secondary adapter member 64. The securing member 62 is provided with a fit recess 62g that fits to the spout-channel forming member 68 to be described later. Furthermore, opposing edges of the securing member 62 are provided with inwardly-folded fit protrusions 62f. The fit protrusions 62f are accommodated within corresponding accommodation recesses (not illustrated) formed in the outer peripheral surface of the secondary adapter member 64, so that the securing member 62 is fixed to the secondary adapter member 64. The securing member 62 is composed of, for example, metal so that sufficient strength is ensured.

Figure 8:
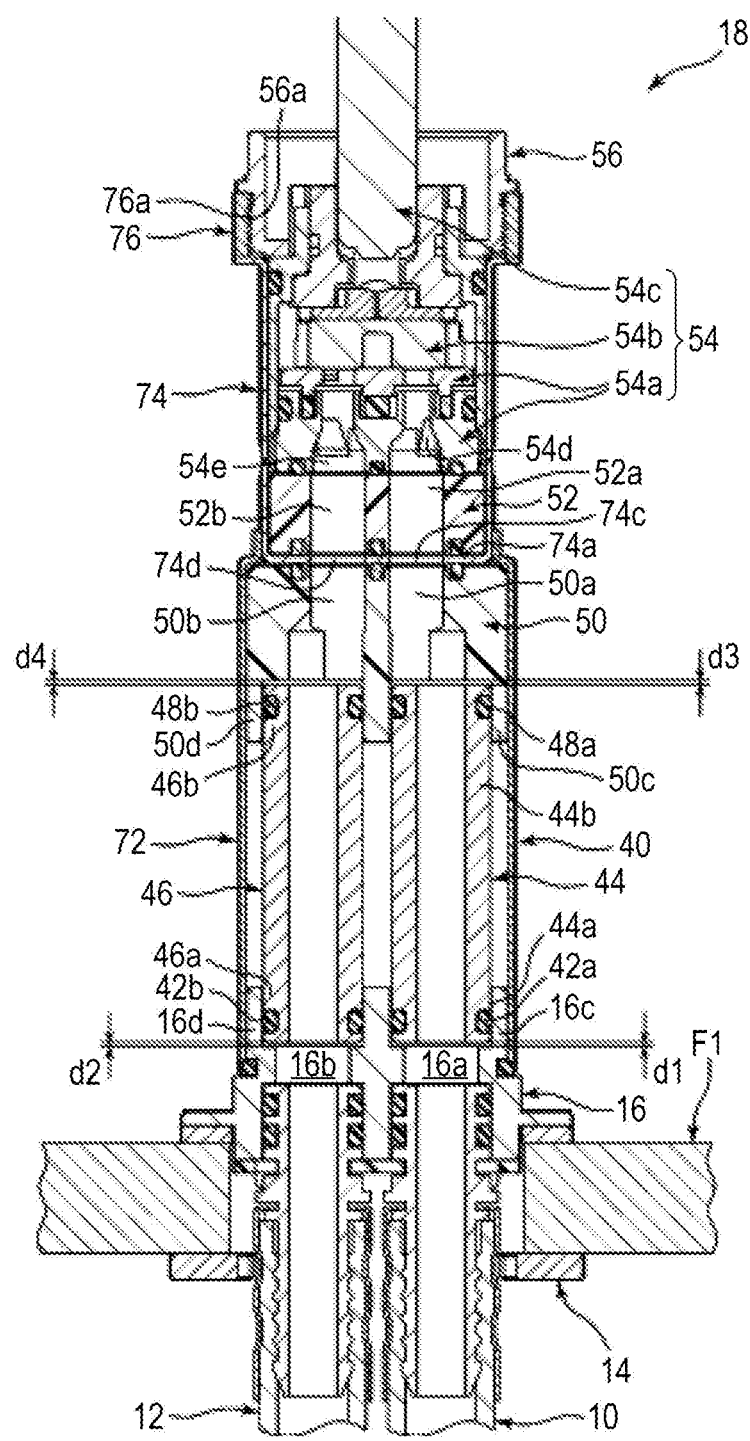
FIG. 8 is a front cross-sectional view of the faucet functioning unit of the faucet device according to the first embodiment of the present invention and illustrates a vertical section of primary channels for hot water and cold water.
Figure 9:
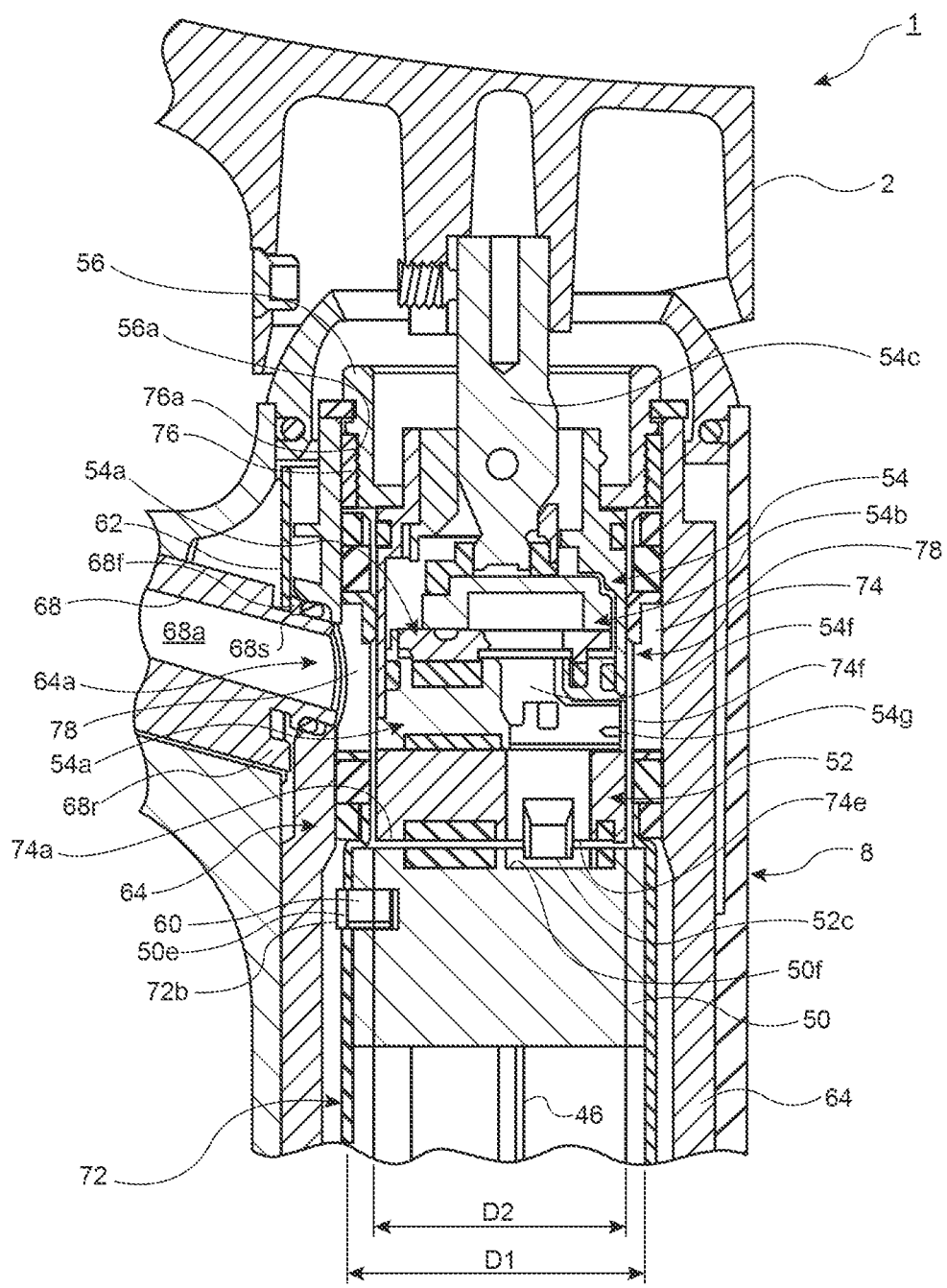
FIG. 9 is a partially-expanded cross-sectional view in which an upper part of the faucet functioning unit is expanded in the central cross-sectional view of the faucet device according to the first embodiment of the present invention illustrated in FIG. 3.

Next, FIG. 8 is a front cross-sectional view of the faucet functioning unit 18 of the faucet device 1 according to the first embodiment of the present invention and illustrates a vertical section of primary channels for hot water and cold water. FIG. 9 is a partially-expanded cross-sectional view in which an upper part of the faucet functioning unit 18 is expanded in the central cross-sectional view of the faucet device 1 according to the first embodiment of the present invention illustrated in FIG. 3.

First, as illustrated in FIGS. 3 to 9, the faucet functioning unit 18 of the faucet device 1 according to this embodiment includes the casing member 40, which is composed of metal, to be described in detail below. This metallic casing member 40 has its one end (i.e. lower end) fixed to the base member 16 in a state where the casing member 40 is inserted in the columnar section 8a of the outer shell member 8.

Next, as illustrated in FIGS. 4 and 8, inside the casing member 40, the faucet functioning unit 18 includes shaft seal members 42 (i.e. a hot-water-shaft seal member 42a and a cold-water-shaft seal member 42b), a hot-water supply pipe 44, a cold-water supply pipe 46, shaft seal members 48 (i.e. a hot-water-shaft seal member 48a and a cold-water-shaft seal member 48b), a primary adapter member 50, a valve seat member 52, a single lever cartridge 54 (i.e. a stationary valve body 54a, a movable valve body 54b, and a single lever 54c), and a cartridge holding member 56, from the lower side toward the upper side as well as from the inner side toward the outer side (or from the upstream side toward the downstream side).

Furthermore, as illustrated in FIGS. 4 and 5, at the outer side surface of the casing member 40, the faucet functioning unit 18 includes mechanical engagement pins 58 for retaining the base member and mechanical engagement pins 60 for retaining the primary adapter member.

Moreover, as illustrated in FIGS. 4 and 8, the hot-water supply pipe 44 and the cold-water supply pipe 46 respectively form a primary hot-water channel (i.e. a hot-water supply channel) and a primary cold-water channel (i.e. a cold-water supply channel) that allow the hot-water hole 16*a* and the cold-water hole 16*b* in the base member 16, located at the lower side, to communicate with a hot-water hole 50*a* and a cold-water hole 50*b* in the primary adapter member 50, located at the upper side.

Furthermore, as illustrated in FIG. 8, the hot-water supply pipe 44 includes a lower connection section 44*a* and an upper connection section 44*b*. The lower connection section 44*a* of the hot-water supply pipe 44 is connected in a watertight manner, that is, shaft-sealed, by being fitted into a hot-water connection receiver 16*c* at the upper end (i.e. the downstream end) of the hot-water hole 16*a* in the base member 16 via the hot-water-shaft seal member 42*a*. On the other hand, the upper connection section 44*b* of the hot-water supply pipe 44 is connected in a watertight manner, that is, shaft-sealed, by being fitted into a hot-water connection receiver 50*c* at the lower end (i.e. the upstream end) of the hot-water hole 50*a* in the primary adapter member 50 via the hot-water-shaft seal member 48*a*.

Likewise, as illustrated in FIG. 8, the cold-water supply pipe 46 includes a lower connection section 46*a* and an upper connection section 46*b*. The lower connection section 46*a* of the cold-water supply pipe 46 is connected in a watertight manner, that is, shaft-sealed, by being fitted into a cold-water connection receiver 16*d* at the upper end (i.e. the downstream end) of the cold-water hole 16*b* in the base member 16 via the cold-water-shaft seal member 42*b*. On the other hand, the upper connection section 46*b* of the cold-water supply pipe 46 is connected in a watertight manner, that is, shaft-sealed, by being fitted into a cold-water connection receiver 50*d* at the lower end (i.e. the upstream end) of the cold-water hole 50*b* in the primary adapter member via the cold-water-shaft seal member 48*b*.

Next, as illustrated in FIG. 8, the connection receivers 16*c*, 16*d*, 50*c*, and 50*d* of the base member 16 and the primary adapter member 50 are respectively provided with clearances d1, d2, d3, and d4 relative to the connection sections 44*a*, 44*b*, 46*a*, and 46*b* of the hot-water supply pipe 44 and the cold-water supply pipe 46.

With these clearances d1, d2, d3, and d4, the connection sections 44*a* and 44*b* of the hot-water supply pipe 44 and the connection sections 46*a* and 46*b* of the cold-water supply pipe 46 can be moved within the ranges of the clearances d1 to d4 in the connection receivers 16*c* and 16*d* of the base member 16 and the connection receivers 50*c* and 50*d* of the primary adapter member 50 while the watertight state is maintained.

Next, as illustrated in FIGS. 4, 8, and 9, the valve seat member 52 is connected in a watertight manner to the upper surface of the primary adapter member 50. The single lever cartridge 54 is connected in a watertight manner to the upper surface of the valve seat member 52. The primary adapter member 50 and the valve seat member 52 are formed to have a substantially circular columnar shape by using a resin material, such as polyphenylene sulfide (PPS), and are separate components.

Furthermore, the primary adapter member 50 and the valve seat member 52 function as connecting members that sandwich a bottom section 74*a* of an upper casing member 74, to be described in detail later, therebetween while connecting the downstream ends of the hot-water supply pipe 44 and the cold-water supply pipe 46 to the single lever cartridge 54 in a watertight manner.

As illustrated in FIGS. 4, 8, and 9, since the single lever cartridge 54 has a structure similar to the structure of a commonly-known single lever cartridge, a detailed description thereof will be omitted. Representatively, the single lever cartridge 54 includes the stationary valve body 54*a*, the movable valve body 54*b*, and the lever 54*c*, from the lower side toward the upper side.

Furthermore, as illustrated in FIGS. 4, 8, and 9, the stationary valve body 54*a* is fixed to a bottom section within the single lever cartridge 54.

Next, as illustrated in FIGS. 8 and 9, the movable valve body 54*b* is disposed in a translationally and rotationally slidable manner on the upper surface of the stationary valve body 54*a*.

Moreover, as illustrated in FIGS. 8 and 9, the lever 54*c* is a single shaft member having a lower end coupled to the movable valve body 54*b* and an upper end coupled to the operation handle 2.

As illustrated in FIG. 8, the stationary valve body 54*a* and the movable valve body 54*b* are each provided with a hot-water channel 54*d* and a cold-water channel 54*e*, serving as primary channels, respectively communicating with a hot-water hole 52*a* and a cold-water hole 52*b* in the valve seat member 52.

Furthermore, as illustrated in FIG. 9, the stationary valve body 54*a* and the movable valve body 54*b* are each provided with a hot-water cold-water mixing channel 54*f* serving as a secondary channel where hot water and cold water respectively supplied from the hot-water channel 54*d* and the cold-water channel 54*e* are mixed. The mixture ratio and the flow of the hot-and-cold water mixture supplied to the hot-water cold-water mixing channel 54*f* from the hot-water channel 54*d* and the cold-water channel 54*e* are adjusted in accordance with the position of the movable valve body 54*b*.

Moreover, as illustrated in FIGS. 5 and 9, an outflow port 54*g* of the hot-water cold-water mixing channel 54*f* in the single lever cartridge 54 communicates with outflow holes 74*f* in the side surface of the upper casing member 74 of the casing member 40 to be described in detail later.

As illustrated in FIGS. 3 and 9, the faucet device 1 according to this embodiment includes the secondary adapter member 64 between the outer side of the casing member 40, located laterally to the single lever cartridge 54, and the inner side of the columnar section 8*a* of the outer shell member 8.

Furthermore, as described above, in the spout section 8*b* of the outer shell member 8, the faucet device 1 according to this embodiment includes the spout-channel forming member 68 that forms the spout channel 68*a*, and also includes the outlet forming member 70 that forms the outlet 6.

As illustrated in FIGS. 3, 6, 7, and 9, the secondary-adapter-member-64-side end of the spout-channel forming member 68 is fixed by being inserted into an opening 64*a* provided in the secondary adapter member 64, located substantially lateral to the outflow holes 74*f* in the upper casing member 74, via a seal member 68*s* such as an O-ring.

The outer peripheral surface of the spout-channel forming member 68 is provided with a flanged protrusion 68f near the secondary-adapter-member-64-side end of the spout-channel forming member 68.

The securing member 62 secures the outlet-side surface (excluding the lower surface) of the flanged protrusion 68f so as to prevent the spout-channel forming member 68 from falling out from the secondary adapter member 64. In detail, the fit recess 62g of the securing member 62 has a shape and size that allow the protrusion 68f of the spout-channel forming member 68 to fit to a part (i.e. a fit recess 68g) adjacent thereto at the outlet side but that do not allow the protrusion 68f to pass through.]

Furthermore, the outer peripheral surface at the lower side of the spout-channel forming member 68 is provided with a rib 68r near the secondary-adapter-member-64-side end of the spout-channel forming member 68. A lower region of the rib 68r extends toward the secondary adapter member 64 (i.e. toward the secondary-adapter-member-64-side end of the spout-channel forming member 68) so as to be in contact with the secondary adapter member 64.

Accordingly, the rib 68r in contact with the secondary adapter member 64 functions similarly to a "tension rod", so that the occurrence of a phenomenon in which the outlet side of the spout-channel forming member 68 bends downward ("bows") is effectively suppressed.

Next, the casing member 40 of the faucet device 1 according to this embodiment will be described in detail together with a method for processing the casing member 40, with reference to FIGS. 10 and 11.

Figure 10:
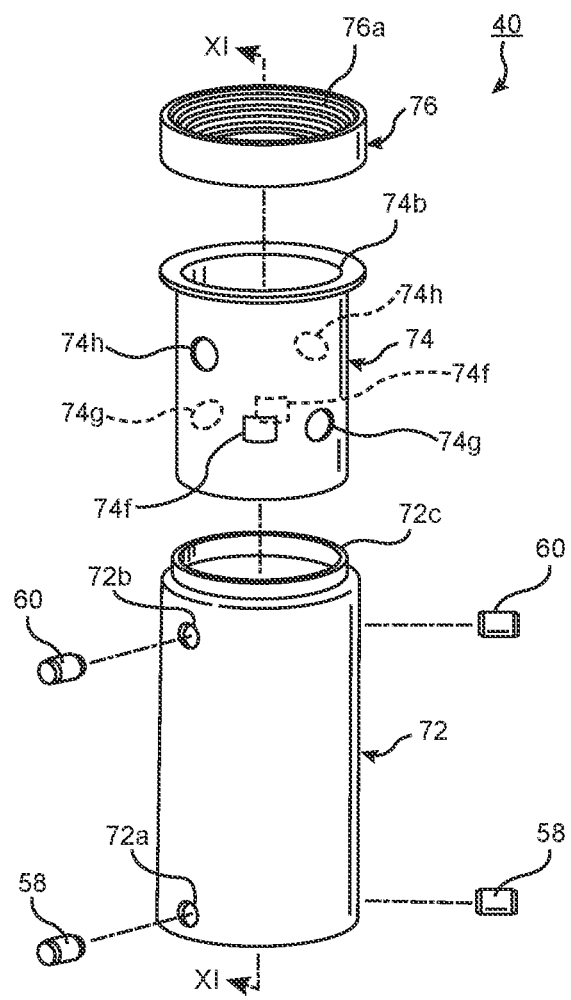
FIG. 10 is an exploded perspective view of a casing member of the faucet device according to the first embodiment of the present invention.

FIG. 10 is an exploded perspective view of the casing member 40 of the faucet device 1 according to the first embodiment of the present invention. FIG. 11 is a cross-sectional view taken along line XI-XI in FIG. 10.

Figure 11:
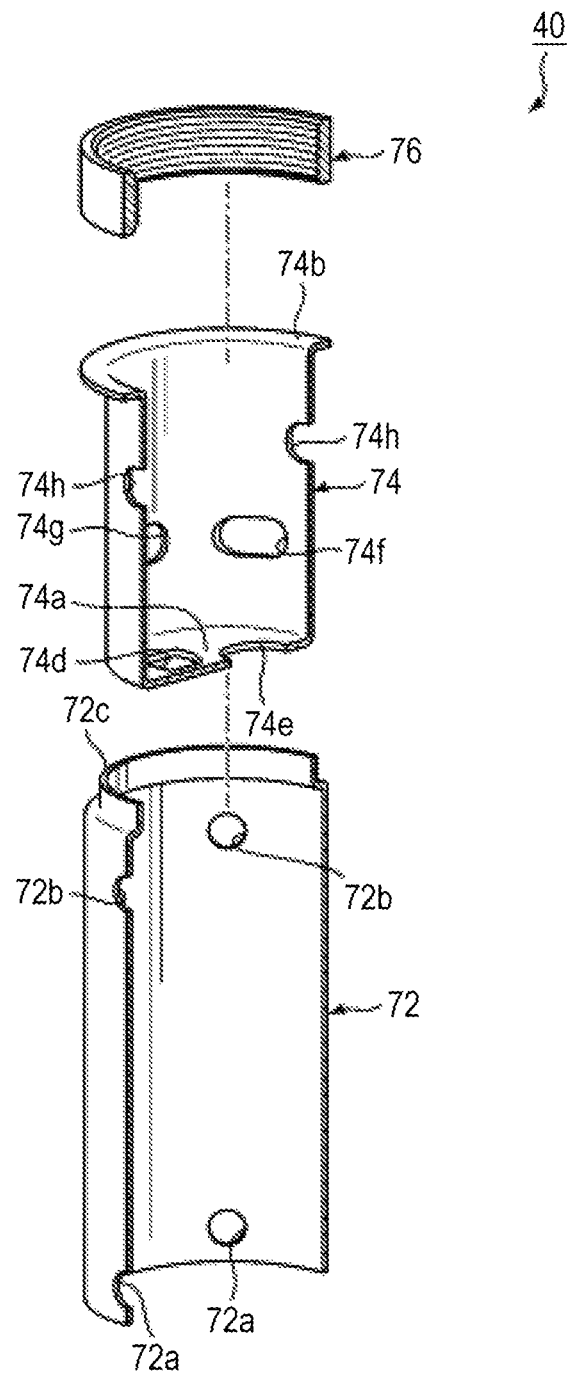
FIG. 11 is a cross-sectional view taken along line XI-XI in FIG. 10.

As illustrated in FIGS. 4, 10, and 11, the metallic casing member 40 of the faucet device 1 according to this embodiment includes a lower casing member 72, an upper casing member 74, and an upper circular-ring member 76, from the lower side toward the upper side.

These members 72, 74, and 76 are composed of a metallic material, such as stainless steel (e.g. SUS 304) having relatively high corrosion resistance as well as relatively high durability and strength.

However, the metallic casing member 40 of the faucet device 1 according to this embodiment may be composed of an alternative metallic material other than stainless steel so long as the metallic material has relatively high corrosion resistance as well as relatively high durability and strength.

As illustrated in FIGS. 4, 10, and 11, the upper end of the lower casing member 72 and the lower end of the upper casing member 74 are integrally connected to each other by, for example, welding, and the upper end of the upper casing member 74 and the lower end of the upper circular-ring member 76 are integrally connected to each other by, for example, welding.

As illustrated in FIGS. 10 and 11, the lower casing member 72 prior to being welded to the upper casing member 74 is formed to be substantially cylindrical by using a metallic plate or pipe so as to have a size that allows the lower casing member 72 to be insertable into the columnar section 8a of the outer shell member 8.

For example, when the substantially-cylindrical lower casing member 72 composed of metal is to be formed, a thin metallic plate is formed into a curved shape by performing bending, such as roll forming, and is ultimately formed into a substantially cylindrical shape so as to have a size that allows the lower casing member 72 to be insertable into the columnar section 8a of the outer shell member 8.

Alternatively, a metallic pipe with a diameter that allows it to be insertable into the columnar section 8a of the outer shell member 8 is prepared in advance, and this pipe is cut or ground so as to be adjusted to a length in the axial direction that allows the pipe to be insertable into the columnar section 8a of the outer shell member 8.

Specifically, when the metallic lower casing member 72 is to be formed, a casting process using a mold is not employed, so that a mold for forming the lower casing member 72 does not have to be prepared for each shape of the outer shell member 8 according to the type of the faucet device 1.

Next, as illustrated in FIGS. 4, 10, and 11, a plurality of lower pin engagement holes 72a extending radially through the lower side surface of the lower casing member 72 are formed at intervals in the circumferential direction by, for example, a hole-forming process.

Accordingly, as illustrated in FIGS. 3, 4, 10, and 11, the mechanical engagement pins 58 for retaining the base member are inserted into the lower pin engagement holes 72a from the outside. After the mechanical engagement pins 58 are engaged with the lower pin engagement holes 72a, the inner ends thereof are engaged with engagement holes 16e in the side surface of the base member 16.

Therefore, the lower pin engagement holes 72a in the lower casing member 72, the mechanical engagement pins 58 for retaining the base member, and the engagement holes 16e in the base member 16 function as mechanical engagement means that can retain the base member 16 in accordance with mechanical engagement of the lower casing member 72.

Likewise, as illustrated in FIGS. 4, 10, and 11, a plurality of upper pin engagement holes 72b extending radially through the upper side surface of the lower casing member 72 are formed in the circumferential direction by, for example, a hole-forming process.

Accordingly, as illustrated in FIGS. 3, 4, 10, and 11, the mechanical engagement pins 60 for retaining the primary adapter member are inserted into the upper pin engagement holes 72b from the outside. After the mechanical engagement pins 60 are engaged with the upper pin engagement holes 72b, the inner ends thereof are engaged with engagement holes 50e in the side surface of the primary adapter member 50.

Therefore, the upper pin engagement holes 72b in the lower casing member 72, the mechanical engagement pins 60 for retaining the primary adapter member, and the engagement holes 50e in the primary adapter member 50 function as mechanical engagement means that can retain the primary adapter member 50 in accordance with mechanical engagement of the lower casing member 72.

The faucet device according to this embodiment employs a mode in which a hole-forming process is performed on the side surface of the lower casing member 72 so that the lower pin engagement holes 72a and the upper pin engagement holes 72b serve as a mechanical engagement section of the lower casing member 72.

Alternatively, a mode in which the side surface of the lower casing member 72 is provided with, for example, an engagement surface, which allows for mechanical engagement by bending the lower casing member 72, as the mechanical engagement section of the lower casing member 72 in place of the lower pin engagement holes 72a and the upper pin engagement holes 72b may be employed.

Figure 12:
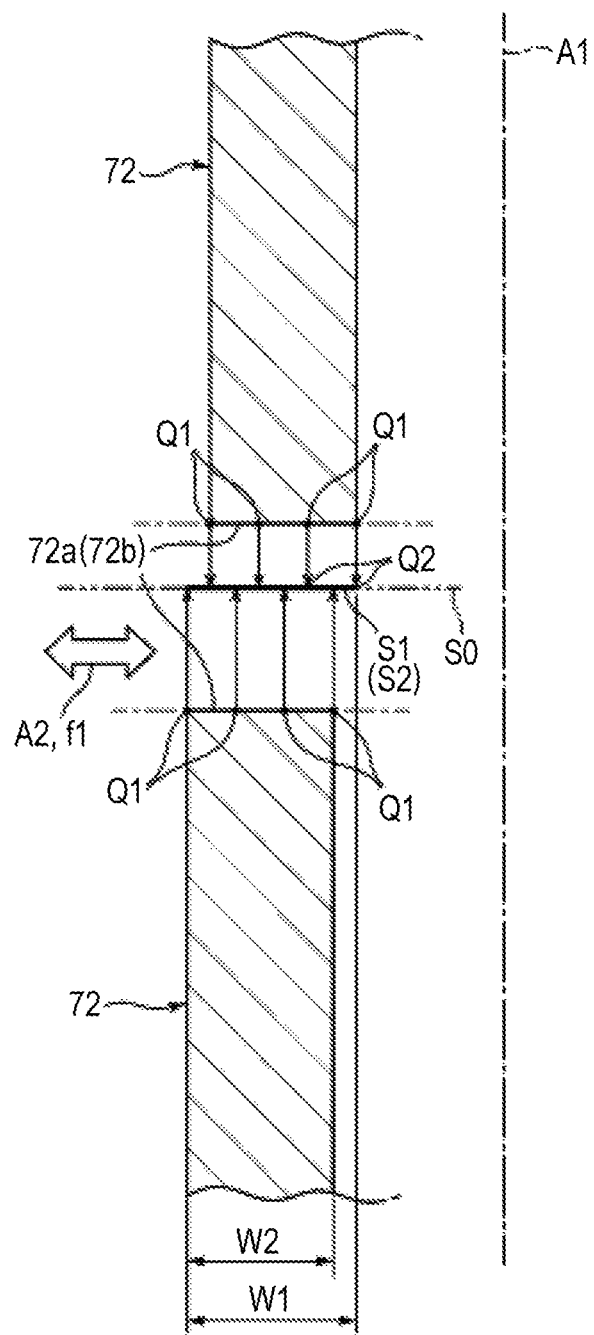
FIG. 12 is a diagram schematically illustrating a part where lower pin engagement holes (or upper pin engagement holes) are formed by a hole-forming process in a lower casing member of the faucet device according to the first embodiment of the present invention.

FIG. 12 is a diagram schematically illustrating a part where the lower pin engagement holes 72a (or the upper pin engagement holes 72b) are formed by a hole-forming process in the lower casing member 72 of the faucet device 1 according to the first embodiment of the present invention.

First, as illustrated in FIG. 12, in a case where the lower pin engagement holes 72a and the upper pin engagement holes 72b in the lower casing member 72 are each formed by a hole-forming process, arbitrary points Q1 on the inner peripheral surface of the lower pin engagement hole 72a (or the upper pin engagement hole 72b) in the lower casing member 72 are moved parallel to the central axis A1 in the axial direction of the lower casing member 72 so as to be projected onto an arbitrary imaginary plane S0 orthogonal to the central axis A1 in the axial direction of the lower casing member 72.

In this case, the imaginary plane S0 has imaginary points Q2 located in the vertical direction of the points Q1, and a plane where a group of these points Q2 is entirely connected is formed as a so-called projection plane S1 or S2 on the imaginary plane S0.

Specifically, in the faucet device 1 according to this embodiment, the lower pin engagement holes 72a and the upper pin engagement holes 72b formed in the lower casing member 72 by a hole-forming process can respectively form the projection planes S1 and S2 in the arbitrary plane S0 orthogonal to the central axis A1 in the axial direction of the lower casing member 72.

Furthermore, as illustrated in FIG. 12, with regard to the sidewall located above and below the lower pin engagement holes 72a and the upper pin engagement holes 72b in the lower casing member 72, for example, a shearing force f1 caused by a cutting tool (not illustrated) during the hole-forming process acts in the direction (i.e. a radial direction A2 of the lower casing member 72) orthogonal to the central axis A1 in the axial direction of the lower casing member 72, so that the sidewall tends to become misaligned in the A2 direction.

Figure 13:
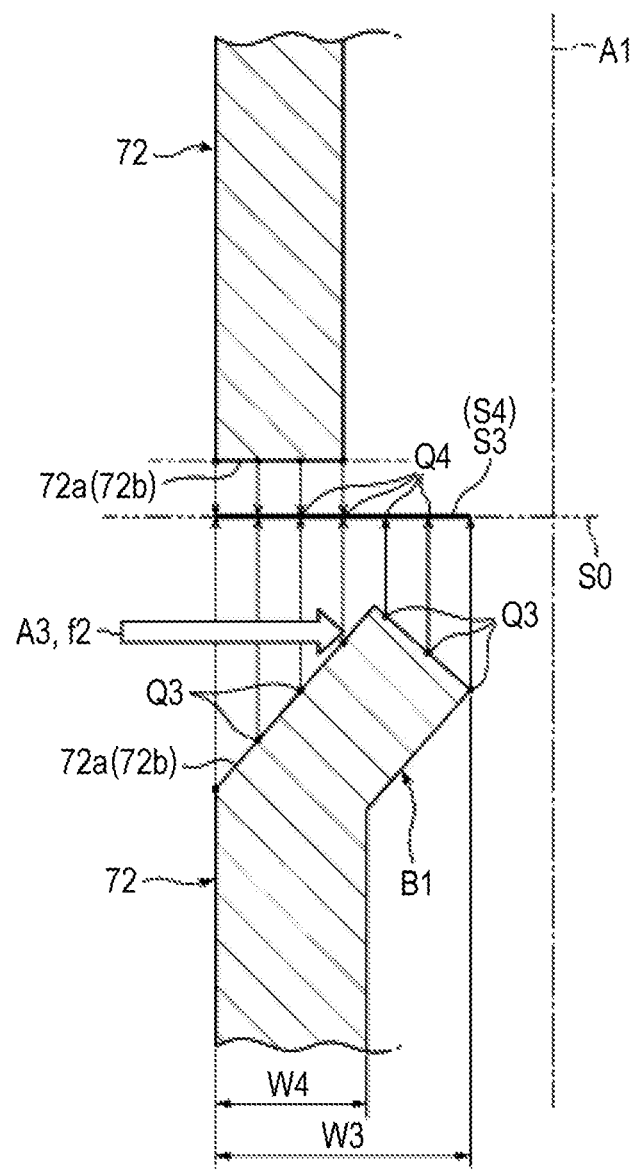
FIG. 13 is a diagram schematically illustrating a part where the lower pin engagement holes (or the upper pin engagement holes) are formed by bending in the lower casing member of the faucet device according to the first embodiment of the present invention.

Moreover, as illustrated in FIG. 13, in a state where the sidewall above and below the lower pin engagement holes 72a and the upper pin engagement holes 72b in the lower casing member 72 is misaligned in the A2 direction, a width W1 in the radial direction A2 of the lower casing member 72 in each of the projection planes S1 and S2 is larger than a thickness W2 of the sidewall of the lower casing member 72 (W1>W2).

Therefore, as illustrated in FIG. 12, the fact that the lower pin engagement holes 72a and the upper pin engagement holes 72b in the lower casing member 72 can respectively form the projection planes S1 and S2 implies that the inner peripheral surfaces of the engagement holes 72a and 72b in the lower casing member 72 naturally form surfaces mechanically engageable with the mechanical engagement pins 58 and 60 when the mechanical engagement pins 58 and 60 that engage with the engagement holes 72a and 72b shift in the vertical direction (i.e. the direction of the central axis A1) relative to the lower casing member 72, and also implies that the inner peripheral surfaces form surfaces mechanically engageable with the base member 16 and the primary adapter member 50 via the mechanical engagement pins 58 and 60.

Next, FIG. 13 is a diagram schematically illustrating a part where the lower pin engagement holes 72a (or the upper pin engagement holes 72b) are formed by bending in the lower casing member 72 of the faucet device 1 according to the first embodiment of the present invention.

First, as illustrated in FIG. 13, in a case where the lower pin engagement holes 72a and the upper pin engagement holes 72b in the lower casing member 72 are each formed by bending, a segment B1 of the sidewall of the lower casing member 72 is folded by being pressed by a pressing force (i.e. a bending force f2) in the inward direction A2, which is the radial direction of the lower casing member 72.

Next, as illustrated in FIG. 13, arbitrary points Q3 on the inner peripheral surface of the lower pin engagement hole 72a (or the upper pin engagement hole 72b) in the lower casing member 72 are moved parallel to the central axis A1 in the axial direction of the lower casing member 72 so as to be projected onto the arbitrary imaginary plane S0 orthogonal to the central axis A1 in the axial direction of the lower casing member 72.

In this case, the imaginary plane S0 has imaginary points Q4 located in the vertical direction of the points Q3, and a plane where a group of these points Q4 is entirely connected is formed as a so-called projection plane S3 or S4 on the imaginary plane S0.

Specifically, in the faucet device 1 according to this embodiment, the lower pin engagement holes 72a and the upper pin engagement holes 72b formed in the lower casing member 72 by bending can respectively form the projection planes S3 and S4 in the arbitrary plane S0 orthogonal to the central axis A1 in the axial direction of the lower casing member 72.

Furthermore, as illustrated in FIG. 13, a width W3 in the radial direction A2 of the lower casing member 72 in each of the projection planes S3 and S4 is larger than a thickness W4 of the sidewall of the lower casing member 72 (W3>W4).

Therefore, as illustrated in FIG. 13, the fact that the lower pin engagement holes 72a and the upper pin engagement holes 72b of the lower casing member 72 can respectively form the projection planes S3 and S4 implies that the inner peripheral surfaces of the engagement holes 72a and 72b in the lower casing member 72 naturally form surfaces mechanically engageable with the mechanical engagement pins 58 and 60 when the mechanical engagement pins 58 and 60 that engage with the engagement holes 72a and 72b shift in the vertical direction (i.e. the direction of the central axis A1) relative to the lower casing member 72, and also implies that the inner peripheral surfaces form surfaces mechanically engageable with the base member 16 and the primary adapter member 50 via the mechanical engagement pins 58 and 60.

Next, as illustrated in FIGS. 10 and 11, the upper casing member 74 prior to being welded to the lower casing member 72 includes the bottom section 74a and is a cup-shaped member having an upper opening and a closed bottom.

Furthermore, as illustrated in FIGS. 10 and 11, the upper casing member 74 extends upward substantially cylindrically from the bottom section 74a.

Moreover, the upper edge of the upper casing member 74 is provided with a flange 74b that protrudes outward.

For example, when the upper casing member 74 with the closed-bottom cup shape is to be formed, a thin metallic plate undergoes raising so as to be formed into the shape of a closed-bottom cup with a size that allows it to be insertable into the columnar section 8a of the outer shell member 8.

Specifically, when the metallic upper casing member 74 is to be formed, a casting process using a mold is not employed, so that a mold for forming the upper casing member 74 does not have to be prepared for each shape of the outer shell member 8 according to the type of the faucet device 1.

Next, as illustrated in FIGS. 8, 9, and 11, a hot-water communication hole 74c, a cold-water communication hole 74d, and an attachment hole 74e are formed by a hole-forming process in the bottom section 74a of the upper casing member 74.

In this regard, as illustrated in FIG. 8, the hot-water communication hole 74c in the bottom section 74a of the upper casing member 74 allows the hot-water hole 50a in the primary adapter member 50, located at the lower side, and the hot-water hole 52a in the valve seat member 52, located at the upper side, to communicate with each other.

Furthermore, as illustrated in FIGS. 8 and 11, the cold-water communication hole 74d in the bottom section 74a of the upper casing member 74 allows the cold-water hole 50b in the primary adapter member 50, located at the lower side, and the cold-water hole 52b in the valve seat member 52 to communicate with each other.

Moreover, as illustrated in FIGS. 9 to 11, after a protrusion 52c protruding downward from the bottom surface of the valve seat member 52 located above the attachment hole 74e in the bottom section 74a of the upper casing member 74 is inserted therein, the protrusion 52c is inserted into an attachment hole 50f in the primary adapter member 50, located at the lower side. Thus, the valve seat member 52 is fixed to the bottom section 74a of the upper casing member 74.

Next, as illustrated in FIGS. 10 and 11, the side surface of the upper casing member 74 is provided with a plurality of (e.g. two) outflow holes 74f that are formed adjacent to each other in the circumferential direction by a hole-forming process.

Furthermore, as illustrated in FIGS. 10 and 11, the side surface of the upper casing member 74 is provided with a plurality of (e.g. two) lower protrusion engagement holes 74g formed diagonally from each other by a hole-forming process at the sides distant from the outflow holes 74f in the circumferential direction.

In this regard, as illustrated in FIGS. 2, 5, and 10, a plurality of (e.g. two) protrusions 24a provided diagonally on the inner peripheral surface of the upper-side lower-seal retaining member 24 are respectively fitted into the lower protrusion engagement holes 74g in the side surface of the upper casing member 74. Thus, the inner peripheral surface of the upper-side lower-seal retaining member 24 is retained on the outer peripheral surface of the upper casing member 74.

Furthermore, as illustrated in FIGS. 10 and 11, the side surface of the upper casing member 74 is provided with a plurality of (e.g. two) upper protrusion engagement holes 74h formed diagonally from each other by a hole-forming process above the outflow holes 74f and the lower protrusion engagement holes 74g.

In this regard, as illustrated in FIGS. 2, 5, and 11, a plurality of (e.g. two) protrusions 26a provided diagonally on the inner peripheral surface of the lower-side upper-seal retaining member 26 are respectively fitted into the upper protrusion engagement holes 74h in the side surface of the upper casing member 74. Thus, the inner peripheral surface of the lower-side upper-seal retaining member 26 is retained on the outer peripheral surface of the upper casing member 74 at a position above the upper-side lower-seal retaining member 24.

As illustrated in FIGS. 10 and 11, after these hole-forming processes, the outer and lower edge portions of the bottom section 74a of the upper casing member 74 having the closed-bottom cup shape and an upper opening edge 72c of the lower casing member 72 are welded to each other in a state where the outer and lower edge portions of the bottom section 74a of the upper casing member 74 are inserted in the upper opening edge 72c of the lower casing member 72. Accordingly, the upper end of the lower casing member 72 and the lower end of the upper casing member 74 are integrally connected to each other.

Next, as illustrated in FIGS. 10 and 11, the upper circular-ring member 76 prior to being welded to the upper casing member 74 is formed to be substantially circular-ring-shaped by using a metallic plate or pipe so as to have a size that allows the upper circular-ring member 76 to be insertable into the columnar section 8a of the outer shell member 8.

For example, when the substantially circular-ring-shaped upper circular-ring member 76 composed of metal is to be formed, a metallic pipe with a diameter that allows it to be insertable into the columnar section 8a of the outer shell member 8 is prepared in advance, and this pipe is cut or ground so as to be adjusted to a length in the axial direction that allows the pipe to be insertable into the columnar section 8a of the outer shell member 8.

Specifically, when the metallic upper circular-ring member 76 is to be formed, a casting process using a mold is not employed, so that a mold for forming the upper circular-ring member 76 does not have to be prepared for each shape of the outer shell member 8 according to the type of the faucet device 1.

Next, as illustrated in FIGS. 10 and 11, a female thread 76a is formed in the inner peripheral surface of the upper circular-ring member 76 by female-threading.

Furthermore, as illustrated in FIGS. 8 and 9, a male thread 56a formed in the outer peripheral surface of the cartridge holding member 56 can be screwed to the female thread 76a of the upper circular-ring member 76, so that the cartridge holding member 56 is fixed to the upper end (i.e. the upper circular-ring member 76) of the casing member 40.

As illustrated in FIGS. 10 and 11, after such female-threading, the lower edge portion of the upper circular-ring member 76 and the outer edge portion of the flange 74b of the upper casing member 74 are welded to each other, so that the upper end of the upper casing member 74 and the lower end of the upper circular-ring member 76 are integrally connected to each other.

The faucet device 1 according to this embodiment employs a mode in which a female member is defined by forming the female thread 76a in the inner peripheral surface of the upper circular-ring member 76, a male member is defined by forming the male thread 56a in the outer peripheral surface of the cartridge holding member 56, and the female member and the male member are screwed to each other. However, the mode is not limited to the above mode. An alternative mode may be employed in which a male member is defined by forming a male thread in the outer peripheral surface of the upper circular-ring member 76, a female member is defined by forming a female thread in the inner peripheral surface of the cartridge holding member 56, and the male member and the female member are screwed to each other.

Next, as illustrated in FIGS. 4 and 9, the primary adapter member 50 is retained at the upper side within the lower casing member 72 by the mechanical engagement pins 60, and the valve seat member 52 is retained by the bottom section 74a within the upper casing member 74.

Furthermore, as illustrated in FIG. 9, the primary adapter member 50 having a substantially circular columnar shape has an outer diameter D1 set to be larger than an outer diameter D2 of the valve seat member 52 (D1>D2).

Next, as illustrated in FIG. 9, the single lever cartridge 54 is disposed at the upper side of the valve seat member 52 within the upper casing member 74.

Moreover, as illustrated in FIG. 9, the male thread 56a of the cartridge holding member 56 is screwed to the female thread 76a of the upper circular-ring member 76 at the upper side of the single lever cartridge 54, so that the single lever cartridge 54 is retained in a pressed state at the upper side of the valve seat member 52 within the upper casing member 74. Specifically, the cartridge holding member 56 serves as a fixing member that fixes the single lever cartridge 54 to the valve seat member 52.

In this case, as illustrated in FIGS. 5 and 9, the outflow port 54g of the hot-water cold-water mixing channel 54f in the single lever cartridge 54 communicates with the outflow holes 74f in the upper casing member 74.

Furthermore, as illustrated in FIGS. 5 and 9, a secondary channel 78 is formed between the outer peripheral surface of the upper casing member 74 and the inner peripheral surface of the secondary adapter member 64 at the outer side thereof. A hot-and-cold water mixture flowing out from the outflow port 54g of the hot-water cold-water mixing channel 54f in the single lever cartridge 54 flows out to the secondary channel 78 via the outflow holes 74f in the upper casing member 74.

Moreover, as illustrated in FIG. 9, the hot-and-cold water mixture in the secondary channel 78 flows out to the opening 64a in the secondary adapter member 64, and subsequently flows out to the spout channel 68a in the spout-channel forming member 68.

Next, the operation of the faucet device 1 according to the first embodiment of the present invention described above will be described together with an assembly method and a processing method of the faucet device 1.

First, according to the faucet device 1 according to this embodiment, when this faucet device 1 is to be assembled, the substantially-cylindrical faucet functioning unit 18 is inserted into the substantially-tubular columnar section 8a of the outer shell member 8 formed to have a shape according to the type of the faucet device 1.

In this case, the base member 16 and the primary adapter member 50 can be preliminarily retained in the casing member 40 of the faucet functioning unit 18 via the mechanical engagement pins 58 for retaining the base member and the mechanical engagement pins 60 for retaining the primary adapter member, respectively. Accordingly, the base member 16 and the primary adapter member 50 can be connected in the axial direction via the casing member 40.

Furthermore, with the metallic casing member 40, the space and the dimensional distance in the axial direction between the base member 16 and the primary adapter member 50 within the columnar section 8a can be set in accordance with the outer shell member 8 having a shape according to the type of the faucet device 1, and moreover, the strength of the internal structure of the faucet functioning unit 18 and the like inserted in the columnar section 8a of the outer shell member 8 can be increased.

Moreover, the metallic casing member 40 can be formed to be substantially cylindrical by using a metallic plate or pipe so as to be insertable into the columnar section 8a of the outer shell member 8 having a shape according to the type of the faucet device 1.

Consequently, as compared with a case where the casing member 40 is injection molded using a resin material or is cast molded using a metallic material, a mold for forming the casing member 40 does not have to be prepared for each shape of the outer shell member 8 according to the type of the faucet device 1, so that the size and shape of the casing member 40 can be readily adjusted using a relatively inexpensive processing method.

Moreover, because the casing member 40 is formed to be substantially cylindrical by using a metallic plate or pipe, the casing member 40 can be formed to have a small thickness while required strength is maintained. Thus, the internal size of the faucet device 1 can be reduced.

Furthermore, by preparing a casing member 40 that is standardized to some extent for outer shell members 8 having various shapes according to the types of faucet devices 1, the casing member 40 can be adjusted to a desired size in the axial direction based on a relatively inexpensive processing method by simply performing, for example, a cutting process on a part of the casing member 40. Consequently, the dimensional distance in the axial direction of the casing member 40 between the base member 16 and the primary adapter member 50 can also be freely set in accordance with the size of the casing member 40 in the axial direction. Moreover, by simply inserting the casing member 40, whose size in the axial direction is adjusted, into the columnar section 8a of the outer shell member 8, the assembly process can be readily performed.

As a result, the degree of design freedom of the faucet device 1 can be improved, and the manufacturing cost can be reduced.

According to the faucet device 1 according to this embodiment, the secondary adapter member 64 is provided between the casing member 40 and the outer shell member 8, the secondary adapter member 64 is supported by the casing member 40, and the spout-channel forming member 68 is fixed by the secondary adapter member 64.

Accordingly, the spout-channel forming member 68 is supported by the casing member 40 via the secondary adapter member 64. Therefore, the outer shell member 8 becomes free from (at least a part of) the support for the spout-channel forming member 68, so that the strength required in the outer shell member 8 can be reduced.

Furthermore, according to the faucet device 1 according to this embodiment, the secondary adapter member 64 is a substantially-tubular member that surrounds the casing member 40 in the circumferential direction.

Accordingly, the secondary adapter member 64 is effectively supported by the casing member 40. Moreover, the secondary adapter member 64 can be readily designed to be small (thin), so that the compactness of the faucet device 1 is not inhibited.

Moreover, according to the faucet device 1 according to this embodiment, the secondary-adapter-member-64-side end of the spout-channel forming member 68 is fixed by being inserted into the opening 64a provided in the secondary adapter member 64 via the seal member 68s, such as an O-ring.

Thus, the spout-channel forming member 68 can be effectively supported by the secondary adapter member 64.

Furthermore, according to the faucet device 1 according to this embodiment, the outer peripheral surface of the spout-channel forming member 68 is provided with the flanged protrusion 68f near the secondary-adapter-member-64-side end of the spout-channel forming member 68. The securing member 62 that secures the outlet-side surface of the protrusion 68f to prevent the spout-channel forming member 68 from falling out from the secondary adapter member 64 is supported by the secondary adapter member 64.

Consequently, the spout-channel forming member 68 can be effectively prevented from falling out from the secondary adapter member 64.

Moreover, the securing member 62 is supported by (e.g. fixed to) the secondary adapter member 64 so that the securing force is also supported by the casing member 40 via the secondary adapter member 64, whereby an undesired load does not occur in the outer shell member 8.

Although the protrusion 68$f$ preferably has a flanged shape for easier manufacture, other shapes are not to be excluded at the time of application of this invention.

In a case where the securing member 62 is a tubular member or cross-sectionally circular-arc-shaped (e.g. cross-sectionally C-shaped) wall member extending along the outer peripheral surface of the secondary adapter member 64, the compactness of the faucet device 1 is not inhibited (i.e. an increase in size of the faucet device 1 is suppressed).

Furthermore, as illustrated in FIG. 2, the fit recess 62$g$ in the securing member 62 according to this embodiment has a semicircular shape at the upper side and a rectangular shape at the lower side, as viewed from the front of the recess. Alternatively, other shapes are not to be excluded so long as the fit recess 62$g$ has a shape and size that allow the protrusion 68$f$ of the spout-channel forming member 68 to fit to a part adjacent thereto at the outlet side but that do not allow the protrusion 68$f$ to pass through.

Moreover, according to the faucet device 1 according to this embodiment, the outer peripheral surface at the lower side of the spout-channel forming member 68 is provided with the rib 68$r$ near the secondary-adapter-member-64-side end of the spout-channel forming member 68. The lower region of the rib 68$r$ extends toward the secondary adapter member 64 (i.e. toward the secondary-adapter-member-64-side end of the spout-channel forming member 68) so as to be in contact with the secondary adapter member 64.

Accordingly, the rib 68$r$ in contact with the secondary adapter member 64 functions similarly to a "tension rod", so that the occurrence of a phenomenon in which the outlet side of the spout-channel forming member 68 bends downward ("bows") can be effectively suppressed.

Furthermore, according to the faucet device 1 according to this embodiment, the lower casing member 72 formed to be substantially cylindrical by using a metallic plate or pipe and being smooth at first with no projections or recesses undergoes a bending or hole-forming process on the side portion of the lower casing member 72 so that the lower pin engagement holes 72$a$ and the upper pin engagement holes 72$b$ can be formed as mechanical engagement means.

Moreover, as illustrated in FIGS. 12 and 13, the inner peripheral surface of each of the engagement holes 72$a$ and 72$b$ in the lower casing member 72 is projected onto the plane S0 orthogonal to the axial direction (i.e. the direction of the central axis A1) of the lower casing member 72, so that the projection planes S1 to S4 can be formed. When the base member 16 and the primary adapter member 50 move in the axial direction (i.e. the direction of the central axis A1) relative to the lower casing member 72, planes that allow for mechanical engagement between the base member 16 and the primary adapter member 50 can be formed.

Specifically, as illustrated in FIGS. 12 and 13, the fact that the projection planes S1 to S4 can be formed by projecting the engagement holes 72$a$ and 72$b$ in the lower casing member 72 onto the plane S0 orthogonal to the axial direction (i.e. the direction of the central axis A1) of the lower casing member 72 implies that, when the base member 16 and the primary adapter member 50 move in the axial direction (i.e. the direction of the central axis A1) relative to the lower casing member 72, the engagement holes 72$a$ and 72$b$ in the lower casing member 72 can form planes that allow for mechanical engagement between the base member 16 and the primary adapter member 50 via the mechanical engagement pins 58 and 60.

Therefore, with the engagement holes 72$a$ and 72$b$ in the lower casing member 72 that can form such projection planes S1 to S4, the lower casing member 72 can retain the base member 16 and the primary adapter member 50.

As a result, the lower pin engagement holes 72$a$ in the lower casing member 72, the mechanical engagement pins 58 for retaining the base member, and the engagement holes 16$e$ in the base member 16 function as mechanical engagement means that can retain the base member 16 in accordance with mechanical engagement of the lower casing member 72.

Furthermore, the upper pin engagement holes 72$b$ in the lower casing member 72, the mechanical engagement pins 60 for retaining the primary adapter member, and the engagement holes 50$e$ in the primary adapter member 50 function as mechanical engagement means that can retain the primary adapter member 50 in accordance with mechanical engagement of the lower casing member 72.

Consequently, even with the casing member 40 formed to be substantially cylindrical by using a metallic plate or pipe, the casing member 40 can reliably retain the base member 16 and the primary adapter member 50.

Furthermore, as illustrated in FIG. 8, according to the faucet device 1 according to this embodiment, for example, thermal expansion occurs in the hot-water supply pipe 44 and the neighboring cold-water supply pipe 46 or in the connection sections 44$a$ and 44$b$ of the hot-water supply pipe 44 and the connection sections 46$a$ and 46$b$ of the cold-water supply pipe 46 particularly in accordance with the amount of heat of hot water flowing through the hot-water supply pipe 44, sometimes causing movement to occur in the axial direction.

In contrast, as illustrated in FIG. 8, in the faucet device 1 according to this embodiment, the connection sections 44$a$ and 44$b$ of the hot-water supply pipe 44 and the connection sections 46$a$ and 46$b$ of the cold-water supply pipe 46 can move while maintaining the watertight state within the ranges of the clearances d1 to d4 in the connection receivers 16$c$ and 16$d$ of the base member 16 and the connection receivers 50$c$ and 50$d$ of the primary adapter member 50. Consequently, the movement of the connection sections 44$a$ and 44$b$ of the hot-water supply pipe 44 and the connection sections 46$a$ and 46$b$ of the cold-water supply pipe 46 caused by thermal expansion can be compensated.

Furthermore, as illustrated in FIG. 9, according to the faucet device 1 according to this embodiment, the single lever cartridge 54 can be disposed on the bottom section 74$a$ of the upper casing member 74. Thus, the single lever cartridge 54 can be reliably retained by the closed-bottom upper casing member 74.

Moreover, as illustrated in FIG. 7, according to the faucet device 1 according to this embodiment, for example, in a case where the single lever cartridge 54 used has a relatively small cross-sectional area, even if the cross-sectional area (i.e. an outer diameter D2) of the valve seat member 52 to which the single lever cartridge 54 is connected is set to be relatively small, the outer diameter D1 of the primary adapter member 50 can still be set to be larger than the outer diameter D2 of the valve seat member 52 (D1>D2).

Therefore, the space in which the hot-water supply pipe 44 and the cold-water supply pipe 46 are each connected in the axial direction can be sufficiently ensured in the primary adapter member 50.

Furthermore, according to the faucet device 1 according to this embodiment, the primary adapter member 50 and the valve seat member 52 serving as connecting members are composed of a resin material. Thus, a primary adapter member 50 and a valve seat member 52 that are inexpensive and lightweight can be provided, and the leaching performance can also be ensured.

Moreover, according to the faucet device 1 according to this embodiment, when the closed-bottom upper casing member 74 is to be formed, a metallic plate undergoes raising so as to be integrally formed into a closed-bottom cup shape in a state where there are no joint lines caused by, for example, welding.

Consequently, there is no risk that joint lines caused by, for example, welding in the upper casing member 74 may come into contact with water in the vicinity of the single lever cartridge 54 retained by the upper casing member 74.

Therefore, the risk of corrosion of the metallic upper casing member 74 can be reduced.

In the faucet device 1 according to this embodiment described above, the hot-water supply pipe 44 and the cold-water supply pipe 46 are described as being separate components from the base member 16 located therebelow. Alternatively, the hot-water supply pipe 44 and the cold-water supply pipe 46 may be integrated with the base member 16.

Furthermore, in the faucet device 1 according to this embodiment, the hot-water supply pipe 44 and the cold-water supply pipe 46 are described as being separate components from each other. Alternatively, the hot-water supply pipe 44 and the cold-water supply pipe 46 may be integrated with each other, so long as the channels (i.e. the hot-water supply channel and the cold-water supply channel) within the supply pipes 44 and 46 are channels independent from each other.

Figure 14:
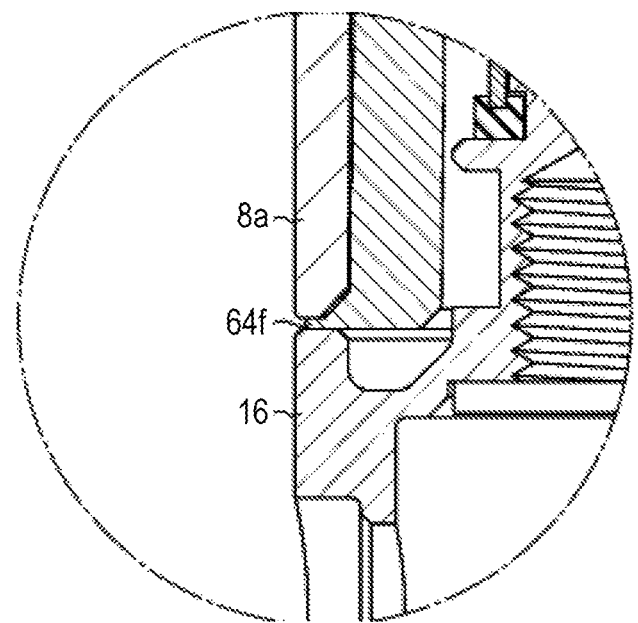
FIG. 14 is an enlarged view of an area XIV in FIG. 3.

Next, FIG. 14 is an enlarged view of an area XIV in FIG. 3.

As illustrated in FIG. 14, the lower end of the secondary adapter member 64 is provided with a flange 64*f*, and the flange 64*f* is placed on the base member 16. The lower end of the columnar section 8*a* of the outer shell member 8 is placed on the flange 64*f*.

Accordingly, the columnar section 8*a* of the outer shell member 8 and the base member 16 are prevented from directly rubbing against each other.

Figure 15:
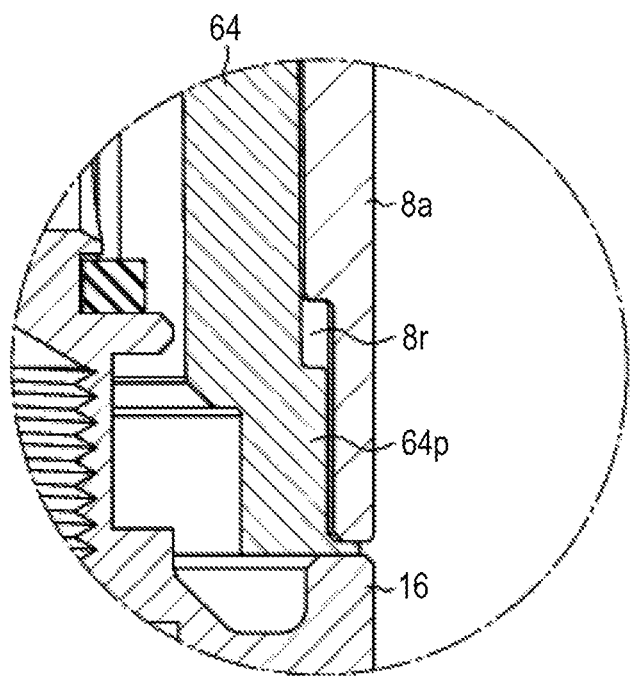
FIG. 15 is an enlarged view of an area XV in FIG. 3.
Figure 16:
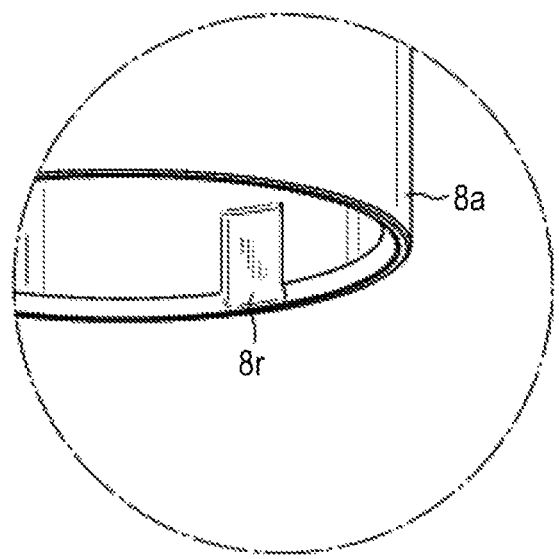
FIG. 16 is a perspective view of a rotational engagement recess in FIG. 15.
Figure 17:
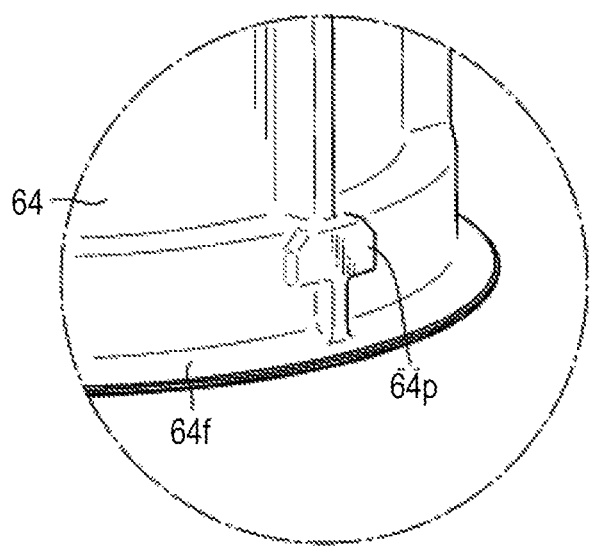
FIG. 17 is a perspective view of a rotational engagement projection in FIG. 15.

Next, FIG. 15 is an enlarged view of an area XV in FIG. 3, FIG. 16 is a perspective view of a rotational engagement recess in FIG. 15, and FIG. 17 is a perspective view of a rotational engagement projection in FIG. 15.

As illustrated in FIGS. 15 to 17, the columnar section 8*a* of the outer shell member 8 and the secondary adapter member 64 are directly engaged with each other in the rotational direction with respect to the functional unit 19.

More specifically, a rotational engagement recess 8*r* provided in the inner peripheral surface at the lower end of the columnar section 8*a* of the outer shell member 8 and a rotational engagement projection 64*p* provided on the upper outer peripheral surface of the flange 64*f* of the secondary adapter member 64 are engaged with each other in the rotational direction with respect to the functional unit 19 (i.e. slidable in the vertical direction).

Accordingly, the outer shell member 8 and the secondary adapter member 64 are rotatable together relative to the functional unit 19. Moreover, because a rotational force is directly transmitted between the rotational engagement recess 8*r* of the outer shell member 8 and the rotational engagement projection 64*p* of the secondary adapter member 64, the occurrence of rattling is significantly suppressed, as compared with a case where the rotational force is transmitted via the spout-channel forming member 68.

Figure 18:
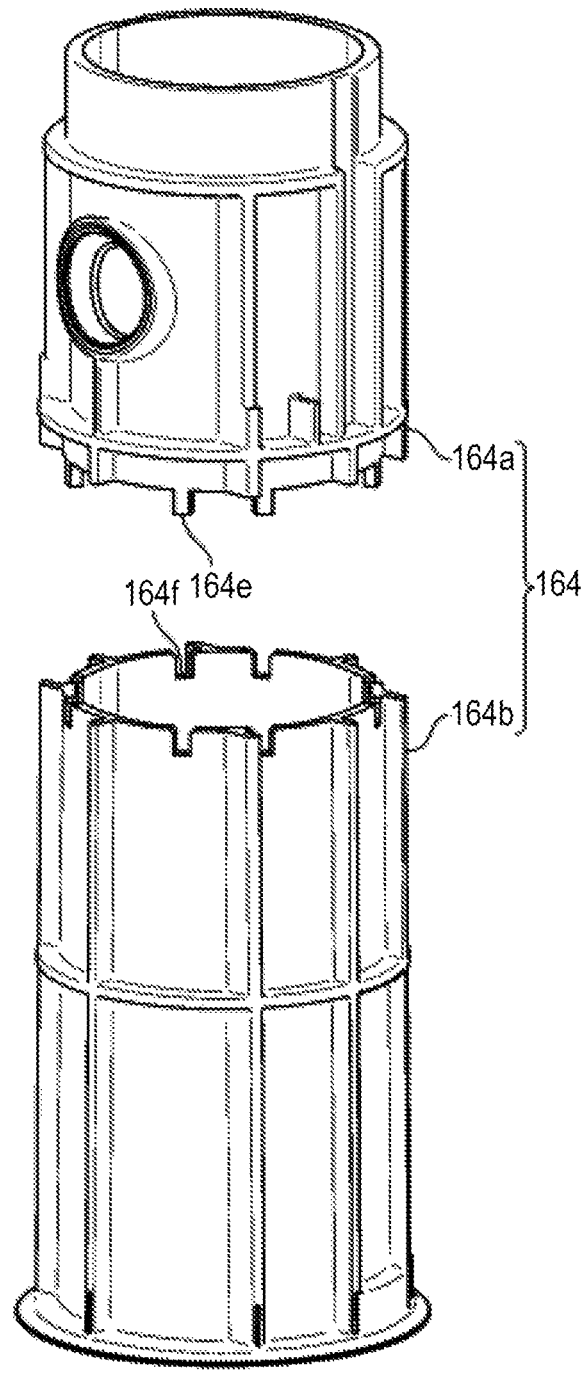
FIG. 18 is a perspective view of the secondary adapter member in FIG. 3.

Next, a faucet device will be described with reference to FIGS. 3 to 18. FIG. 18 is a perspective view of the secondary adapter member in FIG. 3.

As illustrated in FIGS. 3 and 18, a secondary adapter member 164 of a faucet device 100 is split into two pieces in the vertical direction. In detail, the secondary adapter member 164 has an upper secondary adapter member 164*a* and a lower secondary adapter member 164*b*. The secondary channel 78 is formed between the outer peripheral surface of the functional unit 19 and the inner peripheral surface of the upper secondary adapter member 164*a*.

Furthermore, as illustrated in FIG. 18, a rotational engagement projection 164*e* provided at the lower end of the upper secondary adapter member 164*a* and a rotational engagement recess 164*f* provided at the upper end of the lower secondary adapter member 164*b* are engaged with each other in the rotational direction with respect to the functional unit 19. Accordingly, a rotational force is directly transmitted between the upper secondary adapter member 164*a* and the lower secondary adapter member 164*b*, so that the occurrence of rattling is significantly suppressed. Alternatively, a rotational engagement recess may be provided at the lower end of the upper secondary adapter member 164*a*, and a rotational engagement projection may be provided at the upper end of the lower secondary adapter member 164*b*.

Furthermore, as illustrated in FIG. 3, the lower secondary adapter member 164*b* is not involved with the secondary channel 78, meaning that a particular adjustment process is not necessary even when the lower secondary adapter member 164*b* is replaced. Therefore, by preparing lower secondary adapter members 164*b* having different heights and replacing them where appropriate, the height of the secondary adapter member 164 can be readily changed.

Next, a faucet device according to a second embodiment of the present invention will be described with reference to FIGS. 19 and 20.

Figure 19:
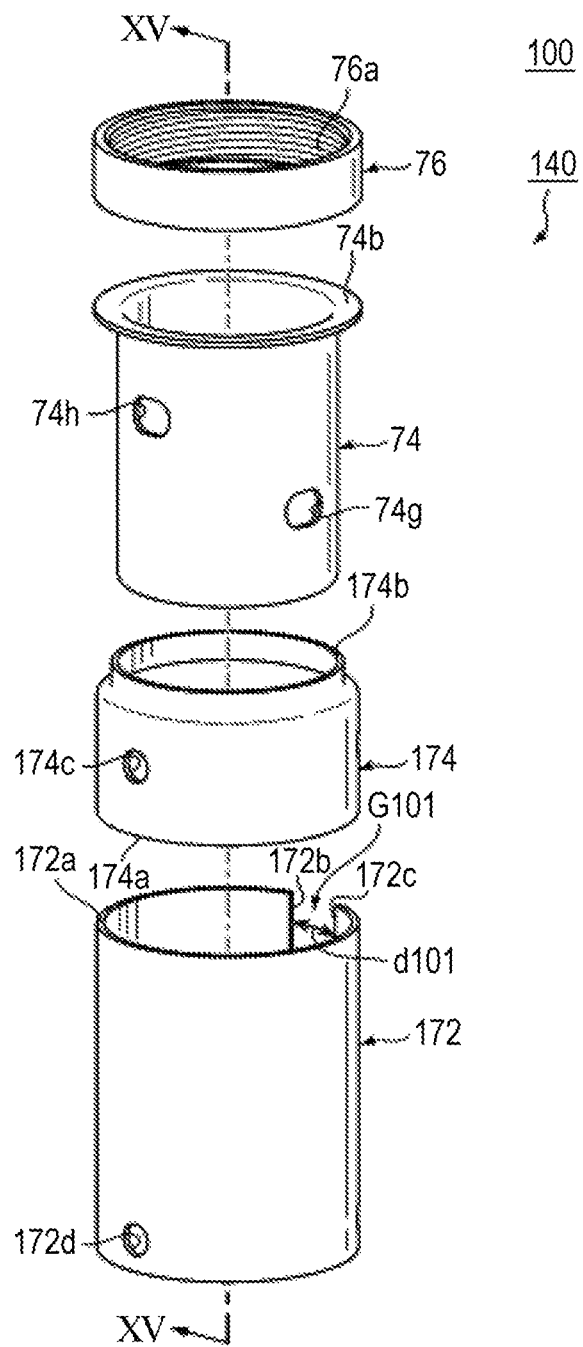
FIG. 19 is an exploded perspective view of a casing member of a faucet device according to a second embodiment of the present invention.

FIG. 19 is an exploded perspective view of a casing member of the faucet device according to the second embodiment of the present invention. FIG. 20 is a cross-sectional view taken along line XV-XV in FIG. 19.

Figure 20:
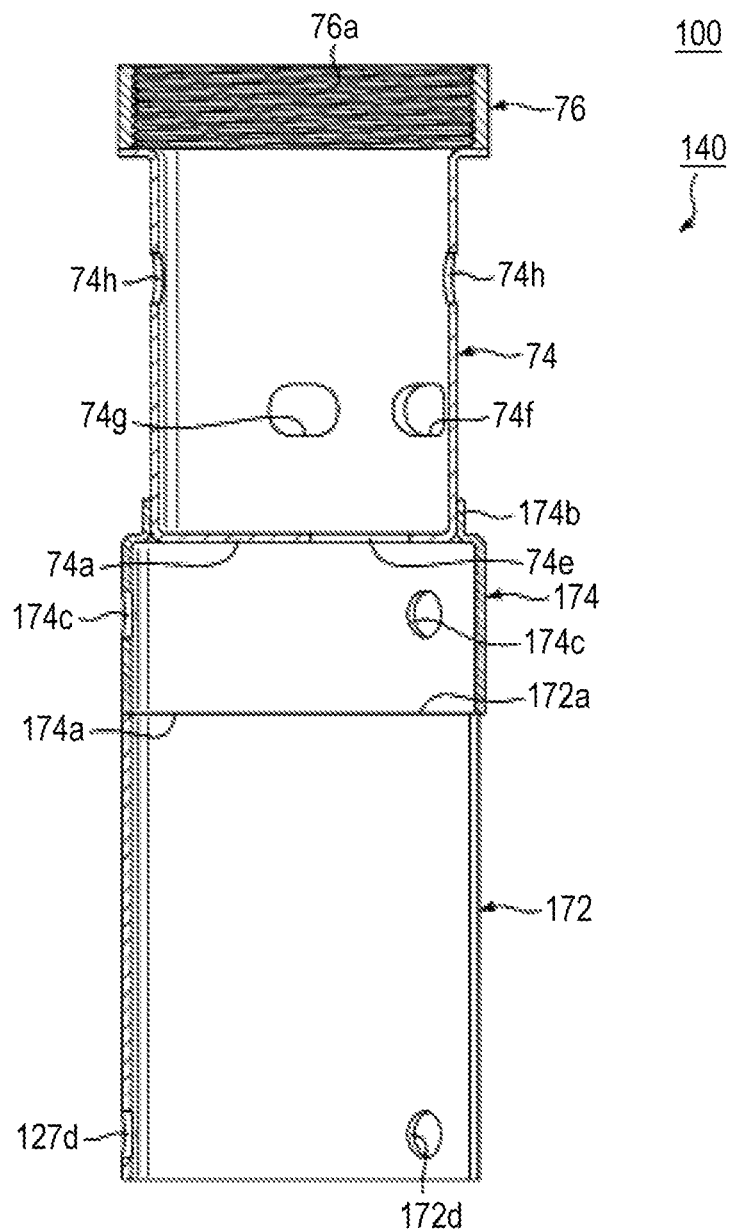
FIG. 20 is a cross-sectional view taken along line XV-XV in FIG. 19.

With regard to a casing member 140 of the faucet device 100 according to the second embodiment of the present invention illustrated in FIGS. 19 and 20, components identical to those of the casing member 40 of the faucet device 1 according to the first embodiment of the present invention illustrated in FIGS. 8 and 9 are given the same reference signs, and descriptions thereof will be omitted.

First, as illustrated in FIGS. 19 and 20, the casing member 140 of the faucet device 100 according to the second embodiment of the present invention includes a lower casing member 172, a middle casing member 174, an upper casing member 74, and an upper circular-ring member 76, from the lower side toward the upper side.

Specifically, the casing member 140 of the faucet device 100 according to this embodiment shown in FIGS. 19 and 20 has a different structure in that a component corresponding to the lower casing member 72 of the casing member 40 of the faucet device 1 according to the first embodiment of the present invention described above includes two metallic members, namely, a substantially-cylindrical lower casing member 172 and a substantially-cylindrical middle casing member 174.

Furthermore, the lower casing member 172 and the middle casing member 174 are composed of a metallic material, such as stainless steel (e.g. SUS 304) having relatively high corrosion resistance as well as relatively high durability and strength.

However, the metallic casing member 140 of the faucet device 100 according to this embodiment may be composed of an alternative metallic material other than stainless steel 15 so long as the metallic material has relatively high corrosion resistance as well as relatively high durability and strength.

As illustrated in FIGS. 19 and 20, the outer peripheral surface of an upper edge 172a of the lower casing member 172 and the inner peripheral surface of a lower opening end 174a of the middle casing member 174 are integrally connected to each other by, for example, welding.

Moreover, as illustrated in FIGS. 19 and 20, the inner peripheral surface of an upper opening end 174b of the middle casing member 174 and the outer peripheral surface of the bottom section 74a of the closed-bottom upper casing member 74 are integrally connected to each other by, for example, welding.

As illustrated in FIG. 19, the lower casing member 172 prior to being welded to the middle casing member 174 is formed to be substantially C-shaped in cross section by using a metallic plate or pipe so as to have a size that allows the lower casing member 172 to be insertable into the columnar section 8a of the outer shell member 8. Accordingly, opposite side edges 172b and 172c of the lower casing member 172 are formed at a predetermined distance d101 [mm] from each other in the circumferential direction.

For example, when the metallic lower casing member 172 is to be formed, a thin metallic plate is formed into a curved shape by performing bending, such as roll forming, and is ultimately formed into a substantially C-shape in cross section so as to have a size that allows the lower casing member 172 to be insertable into the columnar section 8a of the outer shell member 8.

Alternatively, a metallic pipe with a diameter that allows it to be insertable into the columnar section 8a of the outer shell member 8 is prepared in advance, and this pipe is cut or ground so as to be adjusted to a length in the axial direction that allows the pipe to be insertable into the columnar section 8a of the outer shell member 8. In addition, a vertical slit G101 with a recess width that is substantially equal to the predetermined distance d101 is formed so that the predetermined distance between the side edges 172b and 172c of the lower casing member 172 in the circumferential direction becomes equal to d101 [mm].

Specifically, when the metallic lower casing member 172 is to be formed, a casting process using a mold is not employed, so that a mold for forming the lower casing member 172 does not have to be prepared for each shape of the outer shell member 8 according to the type of the faucet device 100.

Next, as illustrated in FIGS. 19 and 20, a plurality of lower engagement holes 172d extending radially through the lower side surface of the lower casing member 172 are formed at intervals in the circumferential direction by, for example, a hole-forming process.

Accordingly, as illustrated in FIGS. 19 and 20, the mechanical engagement pins 58 for retaining the base member are inserted into the lower engagement holes 172d from the outside. After the mechanical engagement pins 58 are engaged with the lower engagement holes 172d, the inner ends thereof are engaged with the engagement holes 16e in the side surface of the base member 16.

Therefore, the lower engagement holes 172d in the lower casing member 172, the mechanical engagement pins 58 for retaining the base member, and the engagement holes 16e in the base member 16 function as mechanical engagement means that can retain the base member 16 in accordance with mechanical engagement of the lower casing member 172.

Next, as illustrated in FIGS. 19 and 20, the middle casing member 174 prior to being welded to the upper casing member 74 is similarly formed to be substantially cylindrical by using a metallic plate or pipe so as to have a size that allows the middle casing member 174 to be insertable into the columnar section 8a of the outer shell member 8.

For example, when the substantially-cylindrical middle casing member 174 composed of metal is to be formed, a thin metallic plate is formed into a curved shape by performing bending, such as roll forming, and is ultimately formed into a substantially cylindrical shape so as to have a size that allows the middle casing member 174 to be insertable into the columnar section 8a of the outer shell member 8.

Alternatively, a metallic pipe with a diameter that allows it to be insertable into the columnar section 8a of the outer shell member 8 is prepared in advance, and this pipe is cut or ground so as to be adjusted to a length in the axial direction that allows the pipe to be insertable into the columnar section 8a of the outer shell member 8.

Specifically, when the metallic middle casing member 174 is to be formed, a casting process using a mold is not employed, so that a mold for forming the middle casing member 174 does not have to be prepared for each shape of the outer shell member 8 according to the type of the faucet device 100.

Next, as illustrated in FIGS. 19 and 20, a plurality of engagement holes 174c extending radially through the side surface of the middle casing member 174 are formed in the circumferential direction by, for example, a hole-forming process.

Accordingly, as illustrated in FIGS. 19 and 20, the mechanical engagement pins 60 for retaining the primary adapter member are inserted into the engagement holes 174c from the outside. After the mechanical engagement pins 60 are engaged with the engagement holes 174c, the inner ends thereof are engaged with the engagement holes 50e in the side surface of the primary adapter member 50.

Therefore, the engagement holes 174c in the middle casing member 174, the mechanical engagement pins 60 for retaining the primary adapter member, and the engagement holes 50e in the primary adapter member 50 function as mechanical engagement means that can retain the primary adapter member 50 in accordance with mechanical engagement of the lower casing member 172.

According to the faucet device 100 according to the second embodiment of the present invention described above, the lower casing member 172 is formed to be substantially C-shaped in cross section, so that when the lower casing member 172 is to be formed into a substantially C-shape, the metallic plate can be formed readily using a relatively inexpensive bending process.

Moreover, by simply changing the lower casing member 172 to be formed using the relatively inexpensive bending process, casing members 40 of various shapes according to the types of faucet devices 100 can be prepared, thereby achieving further cost reduction.

Consequently, the degree of design freedom of the faucet device 100 can be improved, and the manufacturing cost can be reduced.

Next, a faucet device according to a third embodiment of the present invention will be described with reference to FIGS. 21 and 22.

Figure 21:
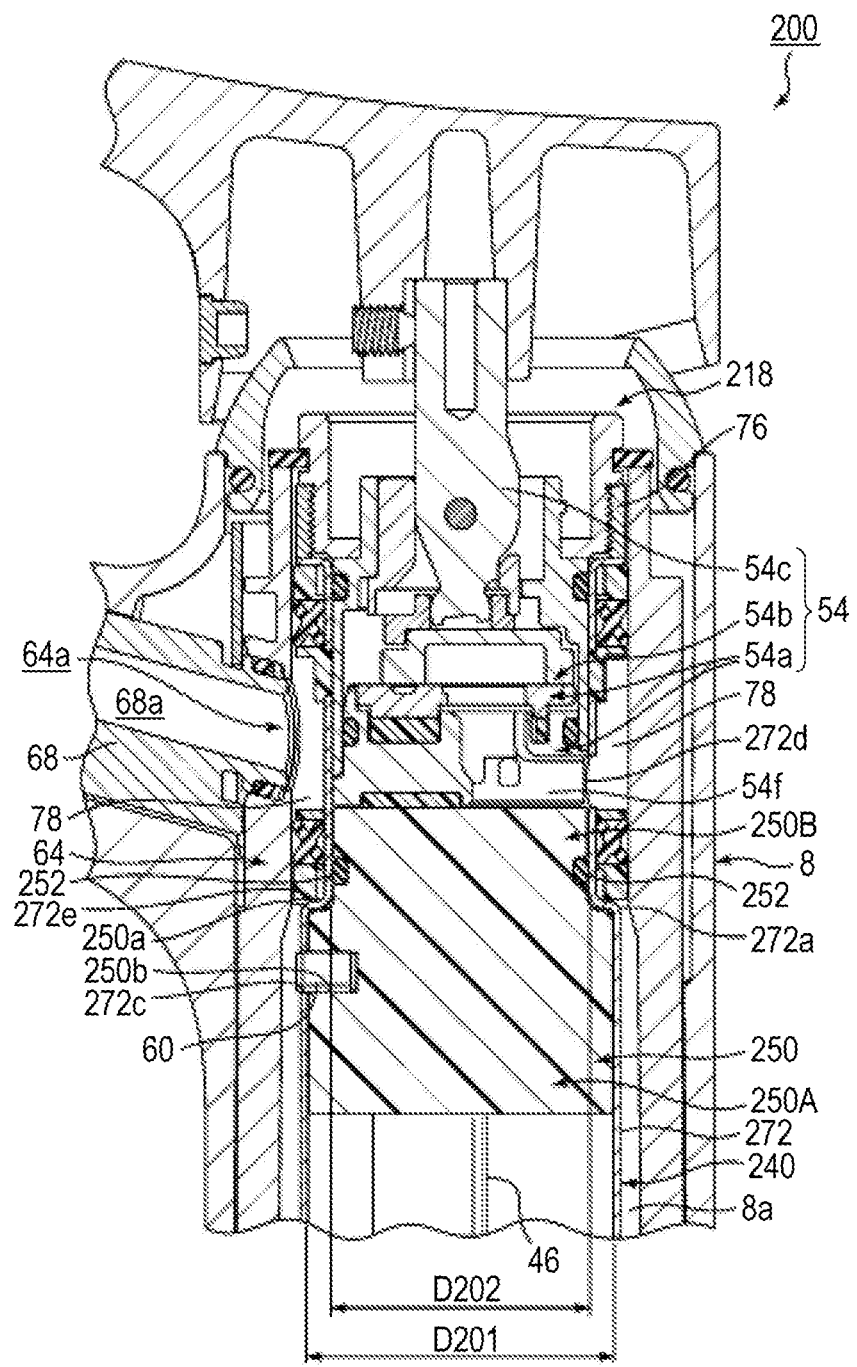
FIG. 21 is a partially-enlarged cross-sectional view in which an upper part of a faucet functioning unit is enlarged, similarly to FIG. 7, in a central cross-sectional view of a faucet device according to a third embodiment of the present invention.

FIG. 21 is a partially-enlarged cross-sectional view in which an upper part of a faucet functioning unit is enlarged, similarly to FIG. 7, in a central cross-sectional view of the faucet device according to the third embodiment of the present invention. FIG. 22 is a perspective cross-sectional view of the faucet functioning unit of the faucet device according to the third embodiment of the present invention in a disassembled state.

Figure 22:
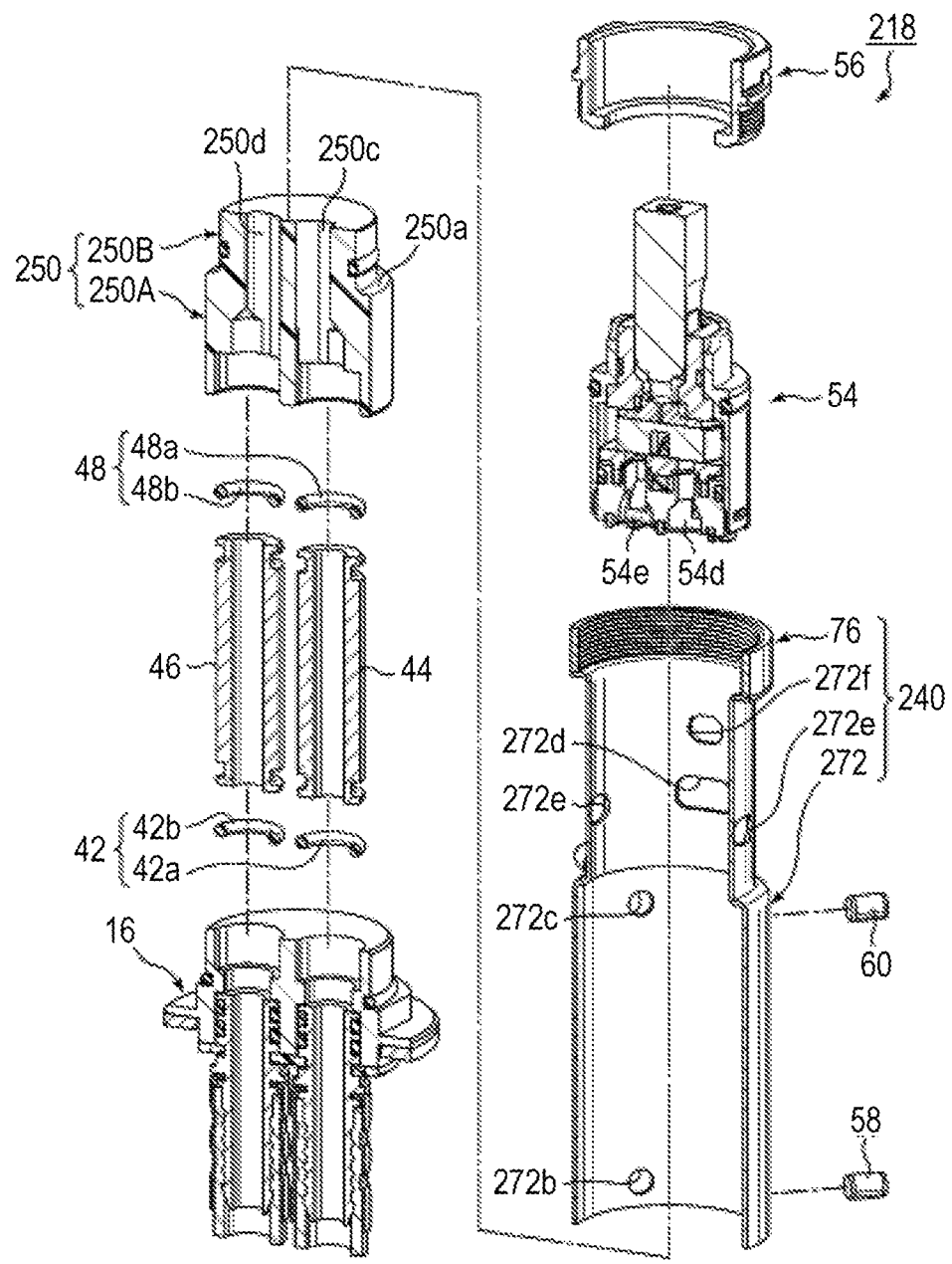
FIG. 22 is a perspective cross-sectional view of the faucet functioning unit of the faucet device according to the third embodiment of the present invention in a disassembled state.

In a faucet device 200 according to the third embodiment of the present invention illustrated in FIGS. 21 and 22, components identical to those of the faucet device 1 according to the first embodiment of the present invention illustrated in FIGS. 4 and 7 are given the same reference signs, and descriptions thereof will be omitted.

First, as illustrated in FIGS. 21 and 22, in the faucet device 200 according to the third embodiment of the present invention, only the structures of a casing member 240 and a connecting member 250 (i.e. a primary adapter section 250A and a valve seat section 250B) of a faucet functioning unit 218 are different from those of the casing member 40 and the connecting members (i.e. the primary adapter member 50 and the valve seat member 52) of the faucet functioning unit 18 in the faucet device 1 according to the first embodiment of the present invention illustrated in FIGS. 4 and 7.

In detail, as illustrated in FIGS. 21 and 22, the casing member 240 of the faucet functioning unit 218 in the faucet device 200 according to this embodiment includes a substantially-cylindrical stepped casing member 272 and an upper circular-ring member 76. The upper circular-ring member 76 is integrally connected to the upper end of the stepped casing member 272 by welding.

Specifically, as illustrated in FIGS. 21 and 22, the stepped casing member 272 prior to being welded to the upper circular-ring member 76 is a single non-closed-bottom component formed to be substantially cylindrical by using a metallic plate or pipe so as to have a size that allows the stepped casing member 272 to be insertable into the columnar section 8a of the outer shell member 8.

Thus, the stepped casing member 272 is different from a component obtained by integrally connecting the cylindrical lower casing member 72 and the closed-bottom upper casing member 74 in the faucet device 1 according to the first embodiment by welding.

Furthermore, as illustrated in FIGS. 21 and 22, an intermediate section of the stepped casing member 272 in the vertical direction is provided with a waist (i.e. a step 272a) formed as a result of performing, for example, raising on the metallic plate or pipe. Accordingly, a step 250a of the connecting member 250 is in contact with the waist (i.e. the step 272a) of the stepped casing member 272 from below, and the connecting member 250 is retained by the stepped casing member 272 via a seal member 252.

Next, as illustrated in FIGS. 21 and 22, the connecting member 250 of the faucet device 200 according to this embodiment is formed to have a substantially circular columnar shape by using a resin material, such as polyphenylene sulfide (PPS).

Furthermore, as illustrated in FIGS. 21 and 22, the connecting member 250 (i.e. the primary adapter section 250A and the valve seat section 250B) is integrally formed. Specifically, the connecting member 250 corresponds to a component obtained by integrating the primary adapter member 50 and the valve seat member 52 of the faucet device 1 according to the first embodiment of the present invention with each other, and is different from a configuration in which the primary adapter member 50 and the valve seat member 52 of the faucet device 1 according to the first embodiment are separate components.

As illustrated in FIG. 21, an outer diameter D201 of the primary adapter section 250A located below the step 250a of the connecting member 250 is set to be larger than an outer diameter D202 of the valve seat section 250B located above the step 250a of the connecting member 250 (D201>D202).

Furthermore, as illustrated in FIGS. 21 and 22, in the casing member 240 of the faucet functioning unit 218, the mechanical engagement pins 58 and 60 respectively engage with the engagement holes 16e in the base member 16 and engagement holes 250b in the connecting member 250 via upper and lower pin engagement holes 272b and 272c in the stepped casing member 272, so that the base member 16 and the connecting member 250 are retained by the stepped casing member 272.

Therefore, the pin engagement holes 272b and 272c in the stepped casing member 272, the mechanical engagement pins 58 and 60, the engagement holes 16e in the base member 16, and the engagement holes 250b in the connecting member 250 function as mechanical engagement means that can retain the base member 16 and the connecting member 250 in accordance with mechanical engagement of the stepped casing member 272.

Next, as illustrated in FIGS. 21 and 22, in the connecting member 250 inside the casing member 240, the lower (i.e. upstream) ends of a hot-water hole 250c and a cold-water hole 250d are connected in a watertight manner, that is, shaft-sealed, to the supply pipes 44 and 46 via the shaft seal members 48a and 48b.

On the other hand, as illustrated in FIGS. 21 and 22, the upper (i.e. downstream) ends of the hot-water hole 250c and the cold-water hole 250d in the connecting member 250 are connected in a watertight manner, that is, surface-sealed, to the hot-water channel 54d and the cold-water channel 54e in the stationary valve body 54a of the single lever cartridge 54.

Moreover, as illustrated in FIGS. 21 and 22, the side surface located above the engagement holes 272c in the stepped casing member 272 is provided with a plurality of (e.g. two) outflow holes 272d similar to the outflow holes 74f in the first embodiment, a plurality of (e.g. two) lower protrusion engagement holes 272e similar to the lower protrusion engagement holes 74g in the first embodiment, and a plurality of (e.g. two) upper protrusion engagement holes 272f similar to the upper protrusion engagement holes 74h in the first embodiment, all of which are formed by a hole-forming process.

Furthermore, as illustrated in FIGS. 21 and 22, the outflow holes 272d in the stepped casing member 272 communicate with the outflow port 54g of the hot-water cold-water mixing channel 54f in the single lever cartridge 54. A hot-and-cold water mixture flowing out from the outflow port 54g of the hot-water cold-water mixing channel 54f flows out to the secondary channel 78 via the outflow holes 272d in the stepped casing member 272.

Then, as illustrated in FIG. 21, the hot-and-cold water mixture in the secondary channel 78 flows out to the opening 64a in the secondary adapter member 64, and subsequently flows out to the spout channel 68a in the spout-channel forming member 68.

As illustrated in FIGS. 21 and 22, according to the faucet device 200 according to the third embodiment of the present invention described above, when this faucet device 200 is to be assembled, the substantially-cylindrical faucet functioning unit 218 is inserted into the substantially-tubular columnar section 8a of the outer shell member 8 formed to have a shape according to the type of the faucet device 200.

In this case, the base member 16 and the connecting member 250 can be preliminarily retained in the casing member 240 of the faucet functioning unit 218 via the mechanical engagement pins 58 and 60. Accordingly, the base member 16 and the connecting member 250 can be connected in the axial direction via the casing member 240.

Furthermore, with the metallic casing member 240, the space and the dimensional distance in the axial direction between the base member 16 and the connecting member 250 within the columnar section 8a can be set in accordance with the outer shell member 8 having a shape according to the type of the faucet device 200, and moreover, the strength of the internal structure of the faucet functioning unit 218 and the like inserted in the columnar section 8a of the outer shell member 8 can be increased.

Moreover, the metallic casing member 240 can be formed to be substantially cylindrical by using a metallic plate or pipe so as to be insertable into the columnar section 8a of the outer shell member 8 having a shape according to the type of the faucet device 200.

Consequently, as compared with a case where the casing member 240 is injection molded using a resin material or is cast molded using a metallic material, a mold for forming the casing member 240 does not have to be prepared for each height of the outer shell member 8 according to the type of the faucet device 200, so that the size and shape of the casing member 240 can be readily adjusted using a relatively inexpensive processing method.

Moreover, because the stepped casing member 272 of the casing member 240 is formed to be substantially cylindrical by using a metallic plate or pipe, the casing member 240 can be formed to have a small thickness while required strength is maintained. Thus, the internal size of the faucet device 200 can be reduced.

Furthermore, by preparing a casing member 240 that is standardized to some extent for outer shell members 8 having various shapes according to the types of faucet devices 200, the casing member 240 can be adjusted to a desired size in the axial direction based on a relatively inexpensive processing method, such as a cutting process. Consequently, the dimensional distance in the axial direction of the casing member 240 between the base member 16 and the connecting member 250 can also be freely set in accordance with the size of the casing member 240 in the axial direction. Moreover, by simply inserting the casing member 240, whose size in the axial direction is adjusted, into the columnar section 8a of the outer shell member 8, the assembly process can be readily performed.

As a result, the degree of design freedom of the faucet device 200 can be improved, and the manufacturing cost can be reduced.

According to the faucet device 200 according to this embodiment, the step 272a and the pin engagement holes 272b and 272c of the stepped casing member 272, the mechanical engagement pins 58 and 60, the engagement holes 16e in the base member 16, and the engagement holes 250b in the connecting member 250 function as mechanical engagement means that can retain the base member 16 and the connecting member 250 in accordance with mechanical engagement of the stepped casing member 272.

Consequently, even with the casing member 240 formed to be substantially cylindrical by using a metallic plate or pipe, the casing member 240 can reliably retain the base member 16 and the connecting member 250.

Furthermore, as illustrated in FIG. 21, according to the faucet device 200 according to this embodiment, for example, in a case where the single lever cartridge 54 used has a relatively small cross-sectional area, even if the cross-sectional area (i.e. an outer diameter D202) of the valve seat section 250B of the connecting member 250 to which the single lever cartridge 54 is connected is set to be relatively small, the outer diameter D201 of the primary adapter section 250A of the connecting member 250 can be set to be larger than the outer diameter D202 of the valve seat section 250B (D201>D202).

Therefore, the space in which the hot-water supply pipe 44 and the cold-water supply pipe 46 are each connected in the axial direction can be sufficiently ensured in the primary adapter section 250A of the connecting member 250.

Next, a faucet device according to a fourth embodiment of the present invention will be described with reference to FIGS. 23 and 24.

Figure 23:
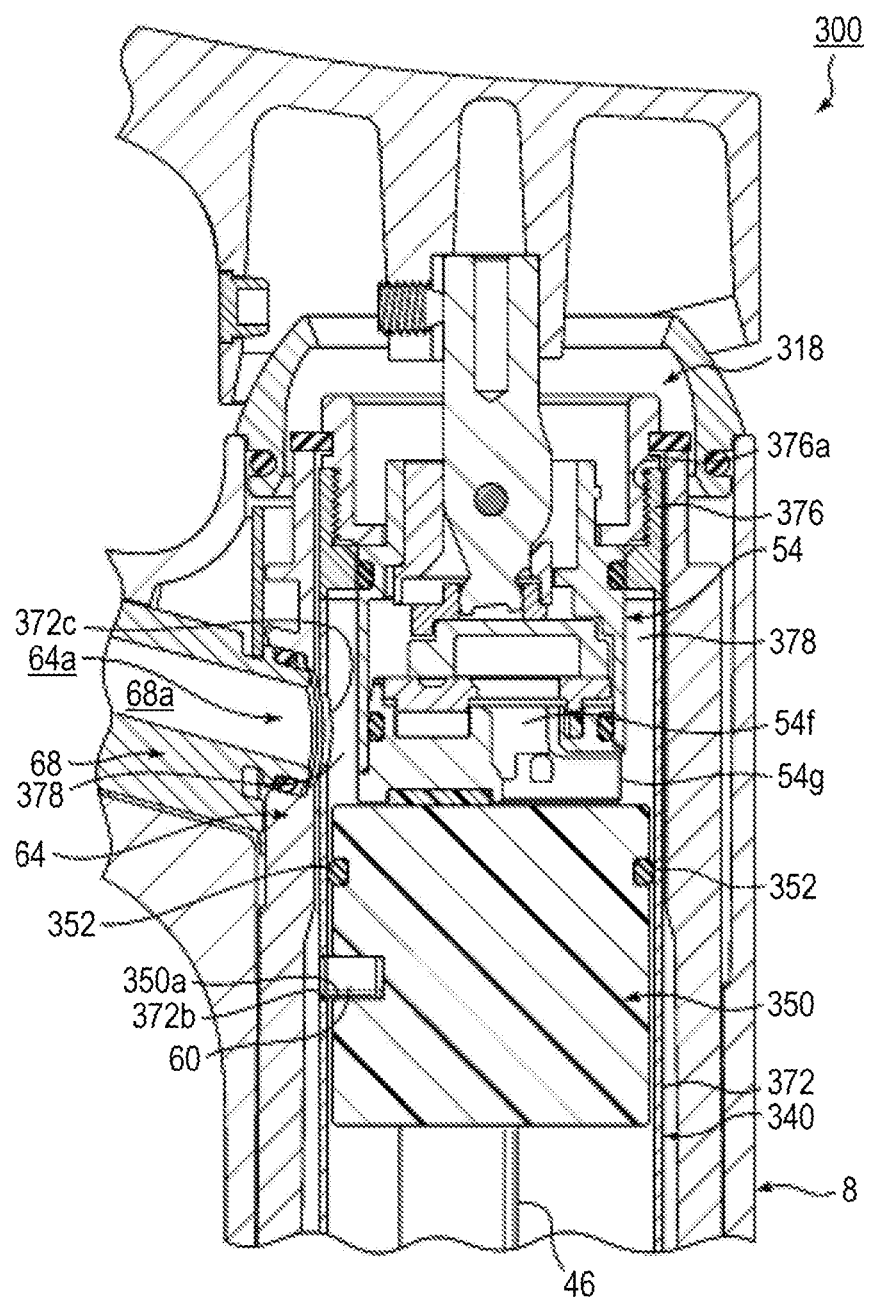
FIG. 23 is a partially-enlarged cross-sectional view in which an upper part of a faucet functioning unit is enlarged, similarly to FIG. 7, in a central cross-sectional view of a faucet device according to a fourth embodiment of the present invention.

FIG. 23 is a partially-enlarged cross-sectional view in which an upper part of a faucet functioning unit is enlarged, similarly to FIG. 7, in a central cross-sectional view of the faucet device according to the fourth embodiment of the present invention. FIG. 24 is a perspective cross-sectional view of the faucet functioning unit of the faucet device according to the fourth embodiment of the present invention in a disassembled state.

Figure 24:
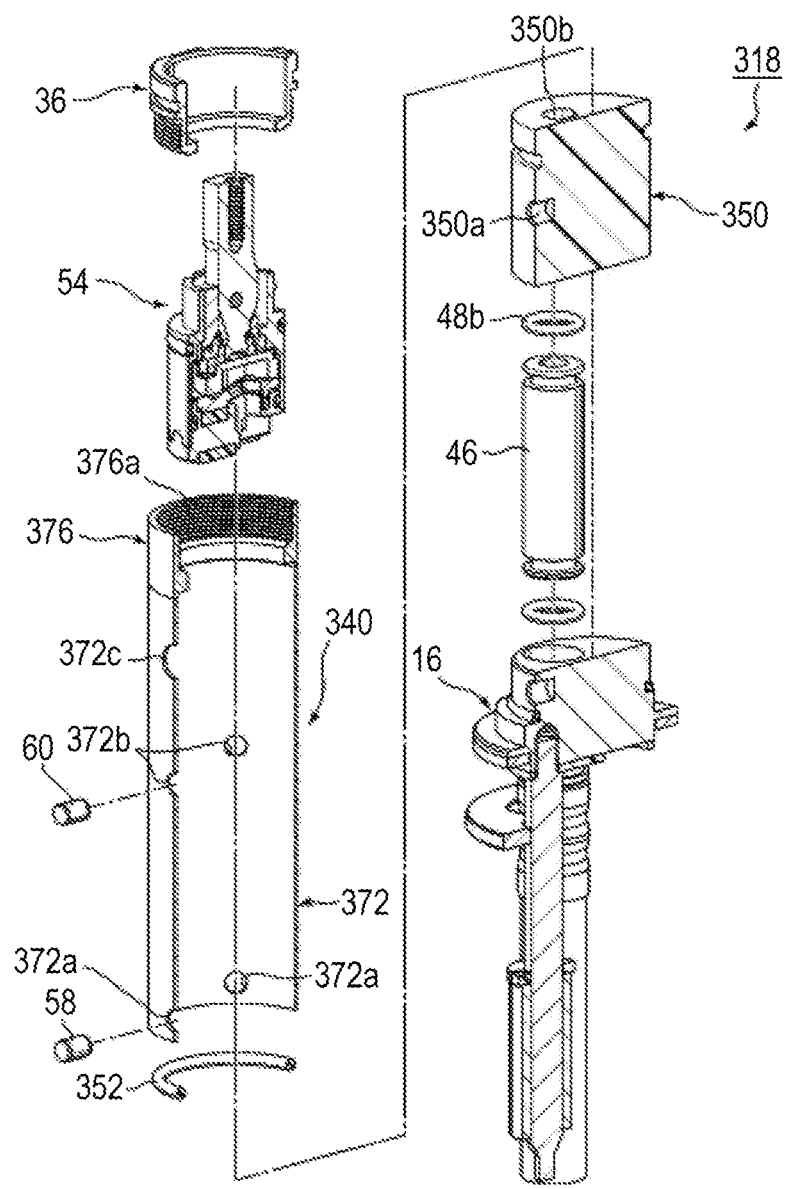
FIG. 24 is a perspective cross-sectional view of the faucet functioning unit of the faucet device according to the fourth embodiment of the present invention in a disassembled state.

In a faucet device 300 according to the fourth embodiment of the present invention illustrated in FIGS. 23 and 24, components identical to those of the faucet device 1 according to the first embodiment of the present invention illustrated in FIGS. 4 and 7 and the faucet device 200 according to the third embodiment of the present invention illustrated in FIGS. 21 and 22 are given the same reference signs, and descriptions thereof will be omitted.

First, as illustrated in FIGS. 23 and 24, in the faucet device 300 according to the fourth embodiment of the present invention, only the structures of a casing member 340 and a connecting member 350 of a faucet functioning unit 318 are different from those of the casing member 240 and the connecting member 250 of the faucet functioning unit 218 in the faucet device 200 according to the third embodiment of the present invention illustrated in FIGS. 21 and 22.

In detail, as illustrated in FIGS. 23 and 24, the casing member 340 of the faucet functioning unit 318 in the faucet device 300 according to this embodiment includes a metallic cylindrical casing member 372 that is straight and has no waist (step), and a metallic upper circular-ring member 376. The upper circular-ring member 376 is integrally connected to the upper end of the cylindrical casing member 372 by welding, and the inner peripheral surface of the upper circular-ring member 376 is provided with a female thread 376a.

Thus, the cylindrical casing member 372 is different from the stepped casing member 272 of the faucet device 200 according to the third embodiment.

Furthermore, as illustrated in FIGS. 23 and 24, the connecting member 350 of the faucet device 300 according to this embodiment is formed to have a substantially circular columnar shape by using a resin material, such as polyphenylene sulfide (PPS), but does not include a step 250a as in the connecting member 250 according to the third embodiment.

Next, as illustrated in FIGS. 23 and 24, the cylindrical casing member 372 prior to being welded to the upper circular-ring member 376 is formed to be cylindrical by using a metallic plate or pipe so as to have a size that allows the cylindrical casing member 372 to be insertable into the columnar section 8a of the outer shell member 8.

For example, when the cylindrical casing member 372 is to be formed, a thin metallic plate is formed into a curved shape by performing bending, such as roll forming, and is ultimately formed into a substantially cylindrical shape so as to have a size that allows the cylindrical casing member 372 to be insertable into the columnar section 8a of the outer shell member 8.

Alternatively, a metallic pipe with a diameter that allows it to be insertable into the columnar section 8a of the outer shell member 8 is prepared in advance, and this pipe is cut or ground so as to be adjusted to a length in the axial direction that allows the pipe to be insertable into the columnar section 8a of the outer shell member 8.

Specifically, when the metallic cylindrical casing member 372 is to be formed, a casting process using a mold is not employed, so that a mold for forming the cylindrical casing member 372 does not have to be prepared for each shape of the outer shell member 8 according to the type of the faucet device 300.

Next, as illustrated in FIGS. 23 and 24, a plurality of pin engagement holes 372a and 372b extending radially through the side surface of the cylindrical casing member 372 are formed at intervals in the circumferential direction by, for example, a hole-forming process.

Accordingly, as illustrated in FIGS. 23 and 24, the mechanical engagement pins 58 and 60 are inserted into the corresponding pin engagement holes 372a and 372b in the cylindrical casing member 372 from the outside. After the mechanical engagement pins 58 and 60 are engaged with the pin engagement holes 372a and 372b, the inner ends thereof are engaged with the engagement holes 16e in the side surface of the base member 16 and the engagement holes 350a in the connecting member 350. Accordingly, the base member 16 and the connecting member 350 are retained by the cylindrical casing member 372.

Therefore, the upper and lower pin engagement holes 372a and 372b in the cylindrical casing member 372, the mechanical engagement pins 58 and 60, the engagement holes 16e in the base member 16, and the engagement holes 350a in the connecting member 350 function as mechanical engagement means that can retain the base member 16 and the connecting member 350 in accordance with mechanical engagement of the cylindrical casing member 372.

Next, as illustrated in FIGS. 23 and 24, in the connecting member 350 inside the casing member 340, the lower (i.e. upstream) ends of a hot-water hole (not illustrated) and a cold-water hole 350b are connected in a watertight manner to the supply pipes 44 and 46 via the shaft seal members 48a and 48b.

On the other hand, as illustrated in FIGS. 23 and 24, the upper (i.e. downstream) ends of the hot-water hole (not illustrated) and the cold-water hole 350b in the connecting member 350 are connected in a watertight manner to the hot-water channel 54d and the cold-water channel 54e in the stationary valve body 54a of the single lever cartridge 54.

Moreover, as illustrated in FIG. 23, the outer surface of the connecting member 350 and the inner surface of the cylindrical casing member 372 are sealed in a watertight manner by a seal member 352. A secondary channel 378 is formed between the outer surface of the single lever cartridge 54 and the inner surface of the cylindrical casing member 372.

Accordingly, a hot-and-cold water mixture flowing out to the secondary channel 378 from the outflow port 54g of the hot-water cold-water mixing channel 54f in the single lever cartridge 54 flows out to the opening 64a in the secondary adapter member 64 via an outflow hole 372c in the cylindrical casing member 372, and subsequently flows out into the spout channel 68a in the spout-channel forming member 68.

As illustrated in FIGS. 23 and 24, according to the faucet device 300 according to the fourth embodiment of the present invention described above, when this faucet device 300 is to be assembled, the substantially-cylindrical faucet functioning unit 318 is inserted into the substantially-tubular columnar section 8a of the outer shell member 8 formed to have a shape according to the type of the faucet device 300.

In this case, the base member 16 and the connecting member 350 can be preliminarily retained in the casing member 340 of the faucet functioning unit 318 via the mechanical engagement pins 58 and 60. Accordingly, the base member 16 and the connecting member 350 can be connected in the axial direction via the casing member 340.

Furthermore, with the metallic casing member 340, the space and the dimensional distance in the axial direction between the base member 16 and the connecting member 350 within the columnar section 8a can be set in accordance with the outer shell member 8 having a shape according to the type of the faucet device 300, and moreover, the strength of the internal structure of the faucet functioning unit 318 and the like inserted in the columnar section 8a of the outer shell member 8 can be increased.

Moreover, the metallic casing member 340 can be formed to be substantially cylindrical by using a metallic plate or pipe so as to be insertable into the columnar section 8a of the outer shell member 8 having a shape according to the type of the faucet device 300.

Consequently, as compared with a case where the casing member 340 is injection molded using a resin material or is cast molded using a metallic material, a mold for forming the casing member 340 does not have to be prepared for each shape of the outer shell member 8 according to the type of the faucet device 300, so that the size and shape of the casing member 340 can be readily adjusted using a relatively inexpensive processing method.

Moreover, because the cylindrical casing member 372 of the casing member 340 is formed to be substantially cylindrical by using a metallic plate or pipe, the casing member 340 can be formed to have a small thickness while required strength is maintained. Thus, the internal size of the faucet device 300 can be reduced.

Furthermore, by preparing a casing member 340 that is standardized to some extent for outer shell members 8 having various shapes according to the types of faucet devices 300, the casing member 340 can be adjusted to a desired size in the axial direction based on a relatively inexpensive processing method, such as a cutting process. Consequently, the dimensional distance in the axial direction of the casing member 340 between the base member 16 and the connecting member 350 can also be freely set in accordance with the size of the casing member 340 in the axial direction. Moreover, by simply inserting the casing member 340, whose size in the axial direction is adjusted, into the columnar section 8a of the outer shell member 8, the assembly process can be readily performed.

As a result, the degree of design freedom of the faucet device 300 can be improved, and the manufacturing cost can be reduced.

According to the faucet device 300 according to this embodiment, the upper and lower pin engagement holes 372a and 372b in the cylindrical casing member 372, the mechanical engagement pins 58 and 60, the engagement holes 16e in the base member 16, and the engagement holes 350a in the connecting member 350 function as mechanical engagement means that can retain the base member 16 and the connecting member 350 in accordance with mechanical engagement of the cylindrical casing member 372.

Consequently, even with the casing member 340 formed to be substantially cylindrical by using a metallic plate or pipe, the casing member 340 can reliably retain the base member 16 and the connecting member 350.

Next, a faucet device according to a fifth embodiment of the present invention will be described with reference to FIG. 25.

Figure 25:
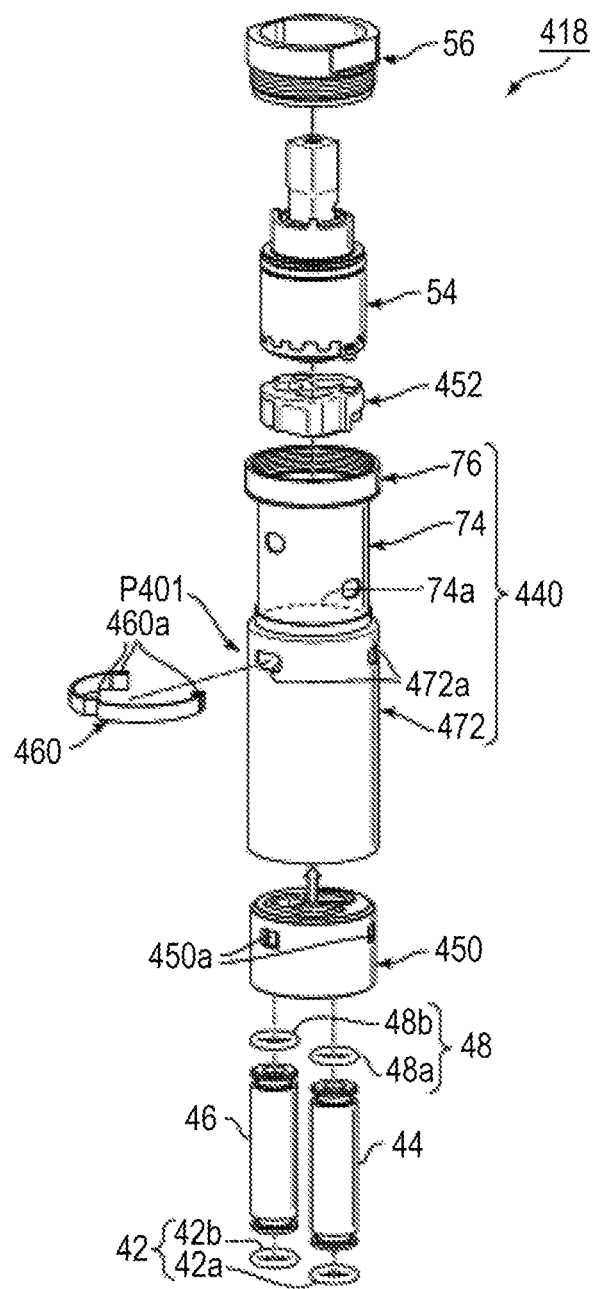
FIG. 25 is a perspective cross-sectional view of a faucet functioning unit of a faucet device according to a fifth embodiment of the present invention in a disassembled state.

FIG. 25 is a perspective cross-sectional view of a faucet functioning unit of the faucet device according to the fifth embodiment of the present invention in a disassembled state.

In a faucet device 400 according to a fifth embodiment of the present invention illustrated in FIG. 25, components identical to those of the faucet device 1 according to the first embodiment of the present invention illustrated in FIG. 4 are given the same reference signs, and descriptions thereof will be omitted.

First, as illustrated in FIG. 25, a faucet functioning unit 418 of the faucet device 400 according to the fifth embodiment of the present invention includes a collar 460 attachable, from the outside, to a predetermined attachment position P401 at the outer side of a lower casing member 472 of a casing member 440.

This collar 460 functions as mechanical engagement means that can retain therein a connecting member (i.e. a primary adapter member 450) at the predetermined attachment position P401 in accordance with mechanical engagement of the lower casing member 472 of the casing member 440.

In detail, as illustrated in FIG. 25, when the faucet functioning unit 418 is to be assembled, the primary adapter member 450 is inserted into the lower casing member 472 of the casing member 440 from below.

Then, as illustrated in FIG. 25, the upper end of the primary adapter member 450 is connected in a watertight manner to the lower end of the bottom section 74a of the closed-bottom upper casing member 74 retaining a valve seat member 452.

In this case, as illustrated in FIG. 25, the outer peripheral surface of the primary adapter member 450 is provided with a plurality of securing holes 450a at intervals in the circumferential direction. Furthermore, the side surface of the lower casing member 472 at the outer side of the securing holes 450a in the primary adapter member 450 is provided with collar attachment holes 472a facing the securing holes 450a in the radial direction.

The inner surface of the collar 460 is provided with a plurality of securing protrusions 460a protruding inward. When these protrusions 460a are attached to the collar attachment holes 472a in the lower casing member 472 from the outside, the securing protrusions 460a are inserted and secured to the securing holes 450a in the primary adapter member 450 via the collar attachment holes 472a in the lower casing member 472. Accordingly, the lower casing member 472 can retain the primary adapter member 450 therein.

As a result, the protrusions 460a of the collar 460, the collar attachment holes 472a in the lower casing member 472, and the securing holes 450a in the primary adapter member 450 can function as mechanical engagement means that can retain the primary adapter member 450 at the predetermined attachment position P401 in accordance with mechanical engagement of the lower casing member 472.

Next, a faucet device according to a sixth embodiment of the present invention will be described with reference to FIG. 26.

Figure 26:
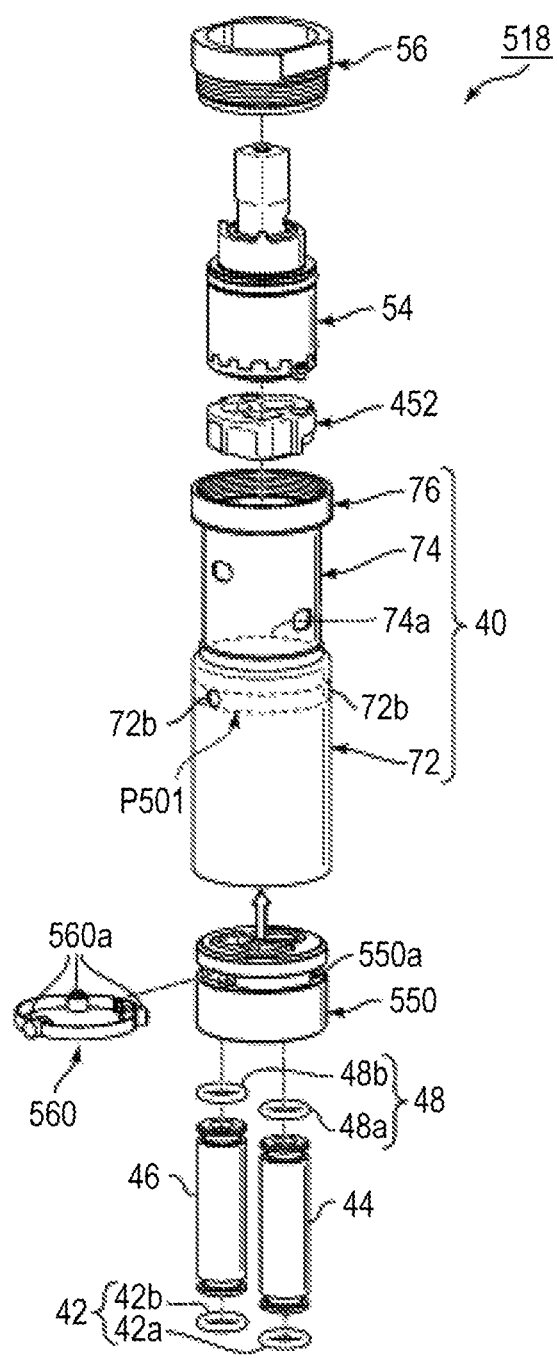
FIG. 26 is a perspective cross-sectional view of a faucet functioning unit of a faucet device according to a sixth embodiment of the present invention in a disassembled state.

FIG. 26 is a perspective cross-sectional view of a faucet functioning unit of the faucet device according to the sixth embodiment of the present invention in a disassembled state.

In a faucet device 500 according to the sixth embodiment of the present invention illustrated in FIG. 26, components identical to those of the faucet device 1 according to the first embodiment of the present invention illustrated in FIG. 4 and the faucet device 400 according to the fifth embodiment of the present invention illustrated in FIG. 25 are given the same reference signs, and descriptions thereof will be omitted.

First, as illustrated in FIG. 26, a faucet functioning unit 518 of the faucet device 500 according to the sixth embodiment of the present invention includes a substantially circular-ring-shaped snap-fit member 560 attachable, from the inside, to a predetermined attachment position P501 at the inner side of the lower casing member 72 of the casing member 40.

This snap-fit member 560 functions as mechanical engagement means that can retain therein a connecting member (i.e. a primary adapter member 550) at the predetermined attachment position P501 in accordance with mechanical engagement of the lower casing member 72 of the casing member 40.

In detail, as illustrated in FIG. 26, when the faucet functioning unit 518 is to be assembled, the substantially circular-ring-shaped snap-fit member 560 is first fitted from the outside into an annular fit recess 550a formed along the outer peripheral surface of the primary adapter member 550.

Subsequently, the primary adapter member 550 in a state where the snap-fit member 560 is fitted in the fit recess 550a is inserted to the predetermined attachment position P501 in the lower casing member 72 of the casing member 40 from below.

Then, as illustrated in FIG. 26, the upper end of the primary adapter member 550 is connected in a watertight manner to the lower end of the bottom section 74a of the closed-bottom upper casing member 74 retaining the valve seat member 452.

In this case, as illustrated in FIG. 26, the outer surface of the snap-fit member 560 attached to the outer peripheral surface of the primary adapter member 550 is provided with a plurality of outward-protruding securing protrusions 560a at intervals in the circumferential direction.

The securing protrusions 560a of the snap-fit member 560 are elastically fitted in and secured to the engagement holes 72b in the lower casing member 72 at the predetermined attachment position P501 in the lower casing member 72.

Accordingly, the lower casing member 72 can retain the primary adapter member 550 therein.

As a result, the securing protrusions 560a of the snap-fit member 560, the fit recess 550a of the primary adapter member 550, and the engagement holes 72b in the lower casing member 72 can function as mechanical engagement means that can retain the primary adapter member 550 at the predetermined attachment position P501 in accordance with mechanical engagement of the lower casing member 72.

Next, a faucet device according to a seventh embodiment of the present invention will be described with reference to FIG. 27.

Figure 27:
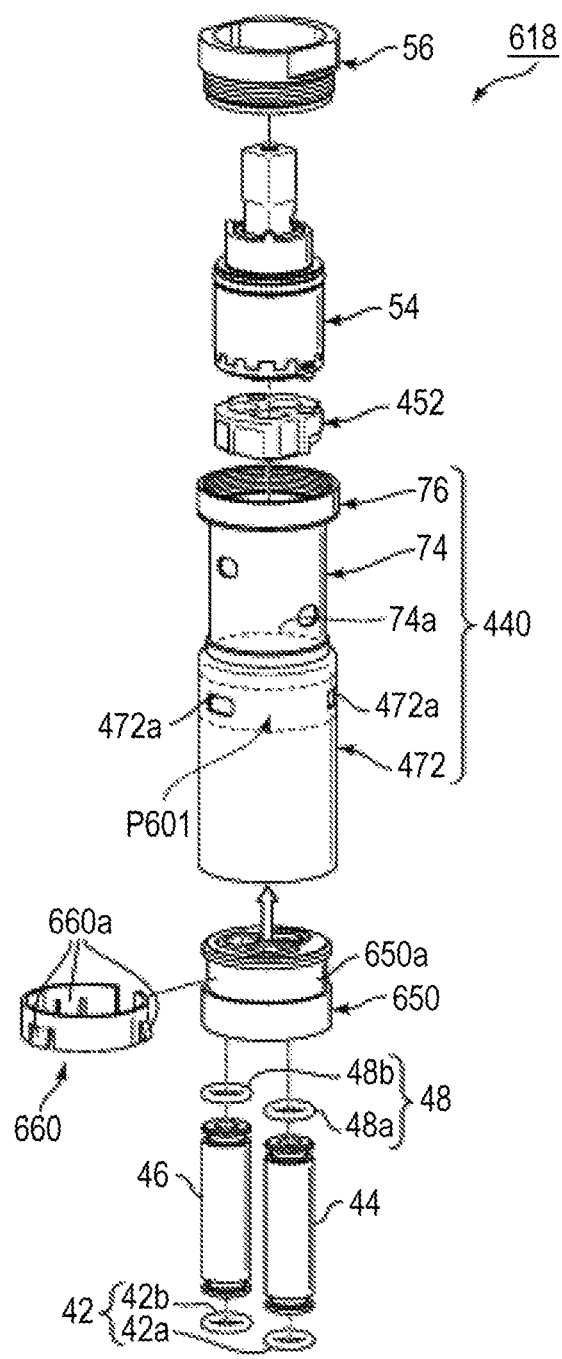
FIG. 27 is a perspective cross-sectional view of a faucet functioning unit of a faucet device according to a seventh embodiment of the present invention in a disassembled state.

FIG. 27 is a perspective cross-sectional view of a faucet functioning unit of the faucet device according to the seventh embodiment of the present invention in a disassembled state.

In a faucet device 600 according to the seventh embodiment of the present invention illustrated in FIG. 27, components identical to those of the faucet device 1 according to the first embodiment of the present invention illustrated in FIG. 4 and the faucet device 400 according to the fifth embodiment of the present invention illustrated in FIG. 25 are given the same reference signs, and descriptions thereof will be omitted.

First, as illustrated in FIG. 27, a faucet functioning unit 618 of the faucet device 600 according to the seventh embodiment of the present invention includes a substantially circular-ring-shaped snap-fit member 660 attachable, from the inside, to a predetermined attachment position P601 at the inner side of the lower casing member 472 of the casing member 440.

The snap-fit member 660 functions as mechanical engagement means that can retain therein a connecting member (i.e. a primary adapter member 650) at the predetermined attachment position P601 in accordance with mechanical engagement of the lower casing member 472 of the casing member 440.

In detail, as illustrated in FIG. 27, when the faucet functioning unit 618 is to be assembled, the substantially circular-ring-shaped snap-fit member 660 is first fitted from the outside into an annular fit recess 650a formed along the outer peripheral surface of the primary adapter member 650.

Subsequently, the primary adapter member 650 in a state where the snap-fit member 660 is fitted to the fit recess 650a is inserted to the predetermined attachment position P601 in the lower casing member 472 of the casing member 440 from below.

Then, as illustrated in FIG. 27, the upper end of the primary adapter member 650 is connected in a watertight manner to the lower end of the bottom section 74a of the closed-bottom upper casing member 74 retaining the valve seat member 452.

In this case, as illustrated in FIG. 27, the outer surface of the snap-fit member 660 attached to the outer peripheral surface of the primary adapter member 650 is provided with a plurality of outward-protruding securing inclined protrusions 660a at intervals in the circumferential direction. Each securing inclined protrusion 660a has an outer surface that is inclined outward from the upper side toward the lower side and is elastically fittable to the corresponding collar attachment hole 472a provided in the upper side surface of the lower casing member 472.

The securing inclined protrusions 660a of the snap-fit member 660 are elastically fitted in and secured to the collar attachment holes 472a in the lower casing member 472 at the predetermined attachment position P601 in the lower casing member 472.

Accordingly, the lower casing member 472 can retain the primary adapter member 650 therein.

As a result, the securing inclined protrusions 660a of the snap-fit member 660, the fit recess 650a in the primary adapter member 650, and the collar attachment holes 472a in the lower casing member 472 can function as mechanical engagement means that can retain the primary adapter member 650 at the predetermined attachment position P601 in accordance with mechanical engagement of the lower casing member 472.

Next, a faucet device according to an eighth embodiment of the present invention will be described with reference to FIG. 28.

Figure 28:
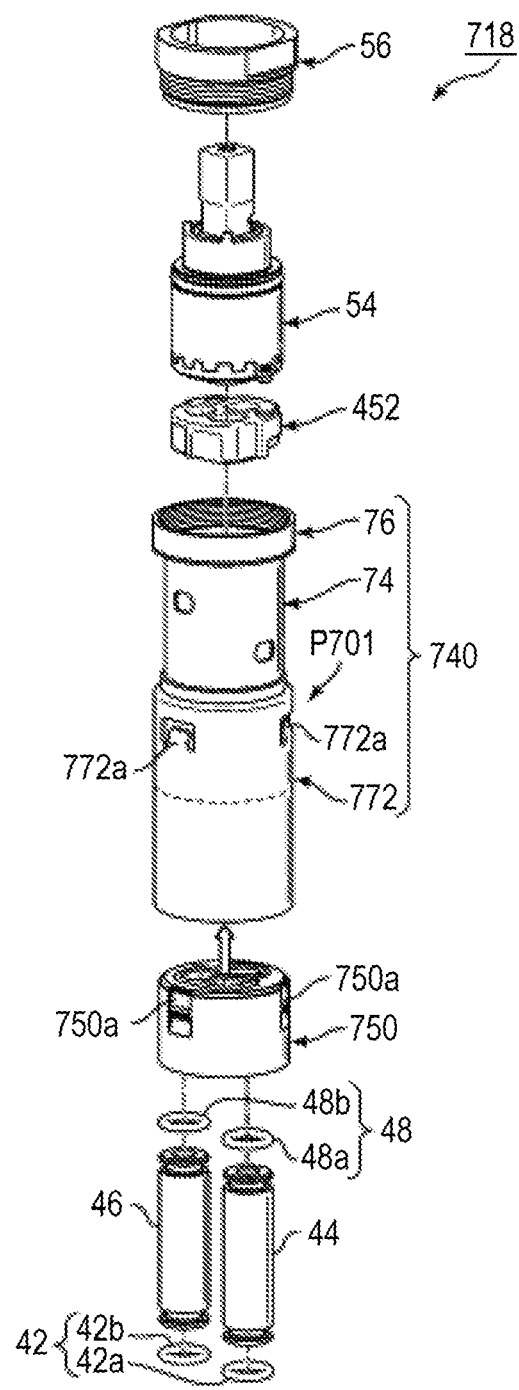
FIG. 28 is a perspective cross-sectional view of a faucet functioning unit of a faucet device according to an eighth embodiment of the present invention in a disassembled state.

FIG. 28 is a perspective cross-sectional view of a faucet functioning unit of the faucet device according to the eighth embodiment of the present invention in a disassembled state.

In a faucet device 700 according to the eighth embodiment of the present invention illustrated in FIG. 28, components identical to those of the faucet device 1 according to the first embodiment of the present invention illustrated in FIG. 4 and the faucet device 400 according to the fifth embodiment of the present invention illustrated in FIG. 25 are given the same reference signs, and descriptions thereof will be omitted.

First, as illustrated in FIG. 28, a faucet functioning unit 718 of the faucet device 700 according to the eighth embodiment of the present invention is provided with a plurality of snap-fit sections 772a at a predetermined attachment position P701, where a primary adapter member 750 is attached, on the side surface of a lower casing member 772 of a casing member 740.

Furthermore, the outer peripheral surface of the primary adapter member 750 is also provided with a plurality of snap-fit sections 750a at intervals in the circumferential direction.

At least the snap-fit sections 750a or 772a are elastically deformable and function as mechanical engagement means that can retain therein the primary adapter member 750 at the predetermined attachment position P701 in accordance with mechanical engagement of the lower casing member 772 of the casing member 740.

In detail, as illustrated in FIG. 28, when the faucet functioning unit 718 is to be assembled, an insertion process to the predetermined attachment position P701 is first performed from the lower side of the lower casing member 772 of the casing member 740.

Then, as illustrated in FIG. 28, the upper end of the primary adapter member 750 is connected in a watertight manner to the lower end of the bottom section 74a of the closed-bottom upper casing member 74 retaining the valve seat member 452.

In this case, as illustrated in FIG. 28, the snap-fit sections 750a in the outer surface of the primary adapter member 750 and the snap-fit sections 772a in the inner surface of the lower casing member 772 are elastically fitted and secured to each other.

Accordingly, the lower casing member 772 can retain the primary adapter member 650 at the predetermined attachment position P701.

As a result, the snap-fit sections 750a of the primary adapter member 750 and the snap-fit sections 772a of the lower casing member 772 can function as mechanical engagement means that can retain the primary adapter member 750 at the predetermined attachment position P701 in accordance with mechanical engagement of the lower casing member 472.

Next, the internal structure of a faucet device according to a ninth embodiment of the present invention will be described in detail with reference to FIGS. 2, 4, 5, 8, 10, 11, 29, and 30.

Figure 29:
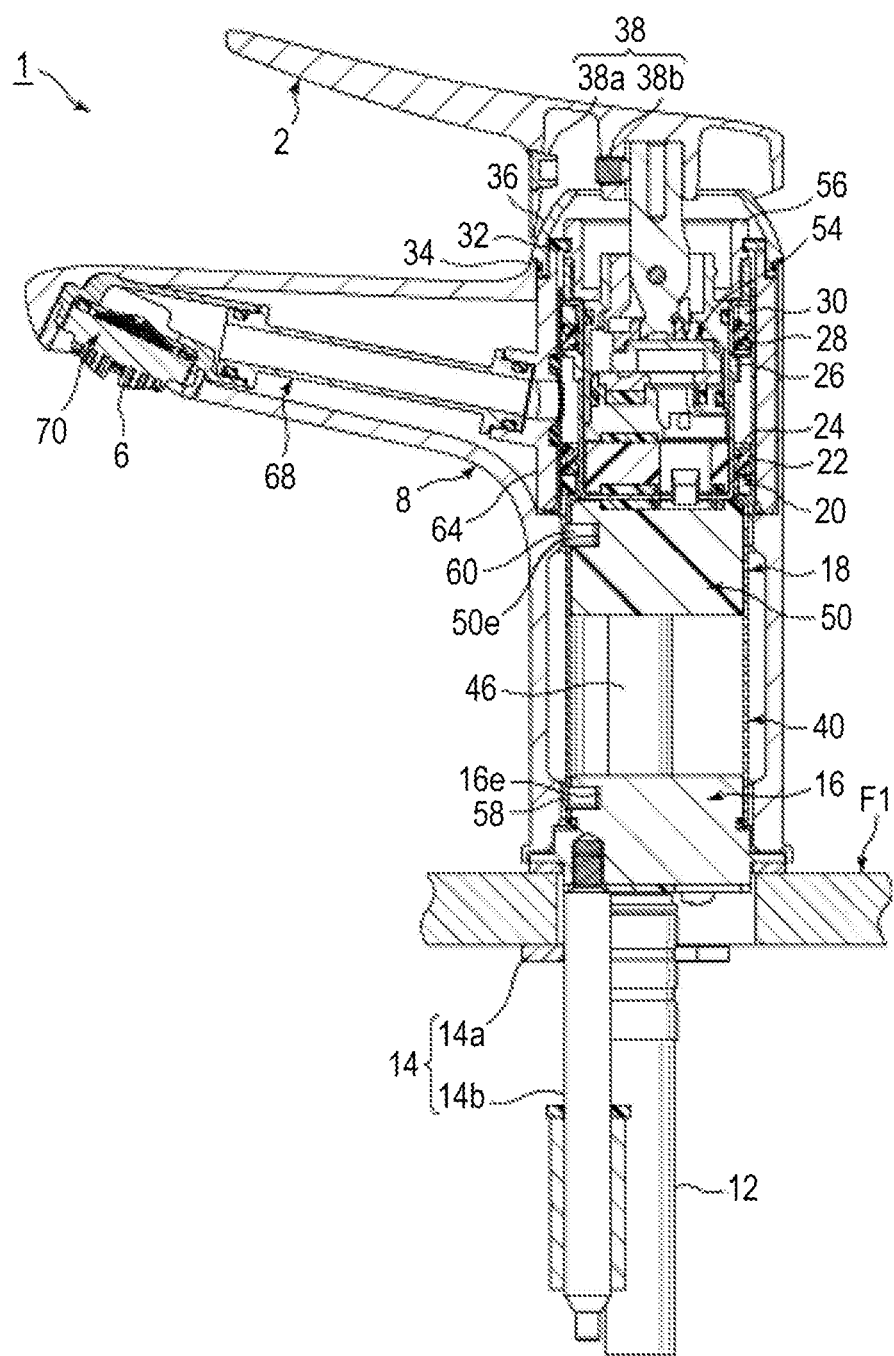
FIG. 29 is a central cross-sectional view of a faucet device according to a ninth embodiment of the present invention.

FIG. 29 is a central cross-sectional view of the faucet device.

First, as illustrated in FIG. 29, a faucet device 1 includes a hollow outer shell member 8 formed to have a shape according to the type or specifications thereof. The outer shell member 8 includes a columnar section 8*a* extending substantially tubular in the vertical direction and a spout section 8*b* extending outward from the side surface of the columnar section 8*a*.

The outer shell member 8 may be composed of a metallic material or may be composed of a resin material.

Next, as illustrated in FIGS. 2, 4, 5, 8, 10, 11, 29, and 30, the faucet device 1 includes a hot-water supply pipe 10, a cold-water supply pipe 12, fixation fittings 14 (i.e. a gripper 14*a* and a fastener 14*b*), and a base member 16 that are provided below (i.e. the upstream side of) the outer shell member 8.

As illustrated in FIGS. 2, 4, 5, 8, 10, 11, 29, and 30, in a state where the base member 16 is disposed on the installation surface F1 of the faucet device 1, the base member 16 is fixed thereto by the gripper 14*a*, which is horseshoe-shaped, and the fastener 14*b* of the fixation fittings 14.

Furthermore, as illustrated in FIG. 2, the base member 16 is provided with a hot-water hole 16*a* and a cold-water hole 16*b* that extend vertically therethrough. The hot-water supply pipe 10 that supplies hot water from a hot-water supply source (not illustrated), such as a water heater, is connected to the hot-water hole 16*a* from below. Likewise, the cold-water supply pipe 12 that supplies cold water from a cold-water supply source (not illustrated), such as a waterworks, is connected to the cold-water hole 16*b* from below.

Moreover, as illustrated in FIGS. 2, 4, 5, 8, 10, 11, 29, and 30, the faucet device 1 according to this embodiment includes a faucet functioning unit 18, to be described below in detail, inside the columnar section 8*a* of the outer shell member 8.

Next, FIG. 4 is a perspective view of the faucet functioning unit 18 of the faucet device 1 in a disassembled state. FIG. 5 is a perspective view of the faucet functioning unit 18 of the faucet device 1, as viewed at an angle from the rear.

As illustrated in FIGS. 4 and 5, at the outer side of the faucet functioning unit 18, the faucet device 1 according to this embodiment includes a lower-side lower-seal retaining member 20, a lower seal member 22, an upper-side lower-seal retaining member 24, a lower-side upper-seal retaining member 26, an upper seal member 28, and an upper-side upper-seal retaining member 30, from the lower side toward the upper side.

Furthermore, as illustrated in FIGS. 4 and 5, the lower seal member 22 and the upper seal member 28 form a watertight seal between the outer side surface of the faucet functioning unit 18 and the inner side surface of the columnar section 8*a* of the outer shell member 8.

Moreover, as illustrated in FIGS. 4 and 5, the lower-side lower-seal retaining member 20 and the upper-side lower-seal retaining member 24 are for retaining the lower seal member 22, and the lower-side upper-seal retaining member 26 and the upper-side upper-seal retaining member 30 are for retaining the upper seal member 28.

Furthermore, as illustrated in FIGS. 2, 4, 5, 8, 10, 11, 29, and 30, the faucet device 1 includes a C-ring 32, a seal member 34, a fixing member 36, and fasteners 38 (i.e. a screw 38*a* and a cap 38*b*), from the lower side toward the upper side, between the outer shell member 8 and the operation handle 2 thereabove in the vertical direction.

These members 32, 34, 36, and 38 retain the faucet functioning unit 18, inserted in the columnar section 8*a* of the outer shell member 8, in a watertight manner from above.]

Figure 30:
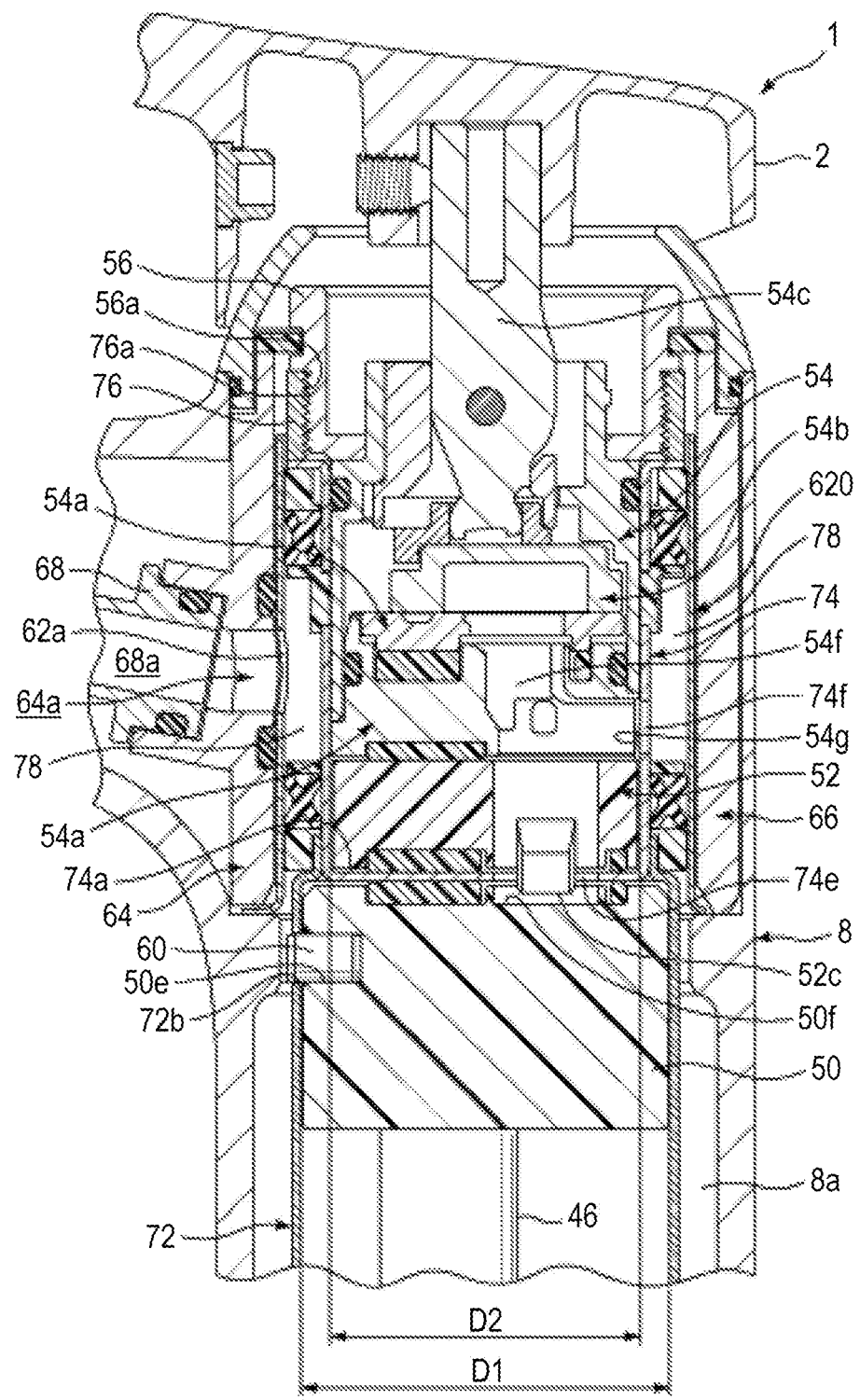
FIG. 30 is a cross-sectional view of the faucet device according to the ninth embodiment of the present invention.

Next, FIG. 8 is a front cross-sectional view of the faucet functioning unit 18 of the faucet device 1 and illustrates a vertical section of primary channels for hot water and cold water. FIG. 30 is a partially-expanded cross-sectional view in which an upper part of the faucet functioning unit 18 is expanded in the central cross-sectional view of the faucet device 1 illustrated in FIG. 29.

First, as illustrated in FIGS. 2, 4, 5, 8, 10, 11, 29, and 30, the faucet functioning unit 18 of the faucet device 1 includes a metallic casing member 40. This metallic casing member 40 has its one end (i.e. lower end) fixed to the base member 16 in a state where the casing member 40 is inserted in the columnar section 8*a* of the outer shell member 8.

Next, as illustrated in FIGS. 4 and 8, inside the casing member 40, the faucet functioning unit 18 includes shaft seal members 42 (i.e. a hot-water-shaft seal member 42*a* and a cold-water-shaft seal member 42*b*), a hot-water supply pipe 44, a cold-water supply pipe 46, shaft seal members 48 (i.e. a hot-water-shaft seal member 48*a* and a cold-water-shaft seal member 48*b*), a primary adapter member 50, a valve seat member 52, a single lever cartridge 54 (i.e. a stationary valve body 54*a*, a movable valve body 54*b*, and a single lever 54*c*), and a cartridge holding member 56, from the lower side toward the upper side as well as from the inner side toward the outer side (or from the upstream side toward the downstream side).

Furthermore, as illustrated in FIGS. 4 and 5, at the outer side surface of the casing member 40, the faucet functioning unit 18 includes mechanical engagement pins 58 for retaining the base member and mechanical engagement pins 60 for retaining the primary adapter member.

Moreover, as illustrated in FIGS. 4 and 8, the hot-water supply pipe 44 and the cold-water supply pipe 46 respectively form a primary hot-water channel (i.e. a hot-water supply channel) and a primary cold-water channel (i.e. a cold-water supply channel) that allow a hot-water hole 16*a* and a cold-water hole 16*b* in the lower base member 16 to communicate with a hot-water hole 50*a* and a cold-water hole 50*b* in the primary adapter member 50, located at the upper side.

Furthermore, as illustrated in FIG. 8, the hot-water supply pipe 44 includes a lower connection section 44*a* and an upper connection section 44*b*. The lower connection section 44*a* of the hot-water supply pipe 44 is connected in a watertight manner, that is, shaft-sealed, by being fitted into a hot-water connection receiver 16*c* at the upper end (i.e. the downstream end) of the hot-water hole 16*a* in the base member 16 via the hot-water-shaft seal member 42*a*. On the other hand, the upper connection section 44*b* of the hot-water supply pipe 44 is connected in a watertight manner, that is, shaft-sealed, by being fitted into a hot-water connection receiver 50*c* at the lower end (i.e. the upstream end) of the hot-water hole 50*a* in the primary adapter member 50 via the hot-water-shaft seal member 48*a*.

Likewise, as illustrated in FIG. 8, the cold-water supply pipe 46 includes a lower connection section 46*a* and an upper connection section 46*b*. The lower connection section 46*a* of the cold-water supply pipe 46 is connected in a watertight manner, that is, shaft-sealed, by being fitted into a cold-water connection receiver 16*d* at the upper end (i.e. the downstream end) of the cold-water hole 16*b* in the base member 16 via the cold-water-shaft seal member 42*b*. On the other hand, the upper connection section 46*b* of the cold-water supply pipe 46 is connected in a watertight manner, that is, shaft-sealed, by being fitted into a cold-water connection receiver 50*d* at the lower end (i.e. the upstream end) of the cold-water hole 50*b* of the primary adapter member via the cold-water-shaft seal member 48*b*.

Next, as illustrated in FIG. 8, the connection receivers 16c, 16d, 50c, and 50d of the base member 16 and the primary adapter member 50 are respectively provided with clearances d1, d2, d3, and d4 relative to the connection sections 44a, 44b, 46a, and 46b of the hot-water supply pipe 44 and the cold-water supply pipe 46.

With these clearances d1, d2, d3, and d4, the connection sections 44a and 44b of the hot-water supply pipe 44 and the connection sections 46a and 46b of the cold-water supply pipe 46 can be moved within the ranges of the clearances d1 to d4 in the connection receivers 16c and 16d of the base member 16 and the connection receivers 50c and 50d of the primary adapter member 50 while the watertight state is maintained.

Next, as illustrated in FIGS. 2, 4, 5, 8, 10, 11, 29, and 30, the valve seat member 52 is connected in a watertight manner to the upper surface of the primary adapter member 50. The single lever cartridge 54 is connected in a watertight manner to the upper surface of the valve seat member 52. The primary adapter member 50 and the valve seat member 52 are formed to have a substantially circular columnar shape by using a resin material, such as polyphenylene sulfide (PPS), and are separate components.

Furthermore, the primary adapter member 50 and the valve seat member 52 function as connecting members that sandwich a bottom section 74a of an upper casing member 74, to be described in detail later, therebetween while connecting the downstream ends of the hot-water supply pipe 44 and the cold-water supply pipe 46 to the single lever cartridge 54 in a watertight manner.

As illustrated in FIGS. 2, 4, 5, 8, 10, 11, 29, and 30, since the single lever cartridge 54 has a structure similar to the structure of a commonly-known single lever cartridge, a detailed description thereof will be omitted. Representatively, the single lever cartridge 54 includes the stationary valve body 54a, the movable valve body 54b, and the lever 54c, from the lower side toward the upper side.

As illustrated in FIGS. 2, 4, 5, 8, 10, 11, 29, and 30, the stationary valve body 54a is fixed to the bottom section within the single lever cartridge 54.

Next, as illustrated in FIGS. 2, 4, 5, 8, 10, 11, 29, and 30, the movable valve body 54b is disposed in a translationally and rotationally slidable manner on the upper surface of the stationary valve body 54a.

Moreover, as illustrated in FIGS. 8 and 30, the lever 54c is a single shaft member having a lower end coupled to the movable valve body 54b and an upper end coupled to the operation handle 2.

As illustrated in FIG. 8, the stationary valve body 54a and the movable valve body 54b are each provided with a hot-water channel 54d and a cold-water channel 54e, serving as primary channels, respectively communicating with a hot-water hole 52a and a cold-water hole 52b in the valve seat member 52.

Furthermore, as illustrated in FIG. 30, the stationary valve body 54a and the movable valve body 54b are each provided with a hot-water cold-water mixing channel 54f serving as a secondary channel where hot water and cold water respectively supplied from the hot-water channel 54d and the cold-water channel 54e are mixed. The mixture ratio and the flow of hot-and-cold water mixture supplied to the hot-water cold-water mixing channel 54f from the hot-water channel 54d and the cold-water channel 54e are adjusted in accordance with the position of the movable valve body 54b.

Moreover, as illustrated in FIGS. 5 and 30, an outflow port 54g of the hot-water cold-water mixing channel 54f in the single lever cartridge 54 communicates with outflow holes 74f in the side surface of the upper casing member 74 of the casing member 40 to be described in detail later.

Next, as illustrated in FIGS. 29 and 30, the faucet device 1 according to this embodiment includes a secondary-channel forming member 620, a secondary adapter member 64, and a spacer member 66 between the outer side of the casing member 40, located laterally to the single lever cartridge 54, and the inner side of the columnar section 8a of the outer shell member 8.

Furthermore, as illustrated in FIGS. 29 and 30, in the spout section 8b of the outer shell member 8, the faucet device 1 according to this embodiment includes a spout-channel forming member 68 that forms a spout channel 68a, and also includes an outlet forming member 70 that forms an outlet 6.

Next, as illustrated in FIGS. 4, 10, and 11, a plurality of lower pin engagement holes 72a extending radially through the lower side surface of the lower casing member 72 are formed at intervals in the circumferential direction by, for example, a hole-forming process.

Accordingly, as illustrated in FIGS. 29, 4, 10, and 11, the mechanical engagement pins 58 for retaining the base member are inserted into the lower pin engagement holes 72a from the outside. After the mechanical engagement pins 58 are engaged with the lower pin engagement holes 72a, the inner ends thereof are engaged with engagement holes 16e in the side surface of the base member 16.

Therefore, the lower pin engagement holes 72a in the lower casing member 72, the mechanical engagement pins 58 for retaining the base member, and the engagement holes 16e in the base member 16 function as mechanical engagement means that can retain the base member 16 in accordance with mechanical engagement of the lower casing member 72.

Likewise, as illustrated in FIGS. 4, 10, and 11, a plurality of upper pin engagement holes 72b extending radially through the upper side surface of the lower casing member 72 are formed in the circumferential direction by, for example, a hole-forming process.

Accordingly, as illustrated in FIGS. 29, 4, 10, and 11, the mechanical engagement pins 60 for retaining the primary adapter member are inserted into the upper pin engagement holes 72b from the outside. After the mechanical engagement pins 60 are engaged with the upper pin engagement holes 72b, the inner ends thereof are engaged with engagement holes 50e in the side surface of the primary adapter member 50.

Therefore, the upper pin engagement holes 72b in the lower casing member 72, the mechanical engagement pins 60 for retaining the primary adapter member, and the engagement holes 50e in the primary adapter member 50 function as mechanical engagement means that can retain the primary adapter member 50 in accordance with mechanical engagement of the lower casing member 72.

The faucet device according to this embodiment employs a mode in which a hole-forming process is performed on the side surface of the lower casing member 72 so that the lower pin engagement holes 72a and the upper pin engagement holes 72b serve as a mechanical engagement section of the lower casing member 72.

Alternatively, a mode in which the side surface of the lower casing member 72 is provided with, for example, an engagement surface, which allows for mechanical engagement by bending the lower casing member 72, as the mechanical engagement section of the lower casing member 72 in place of the lower pin engagement holes 72a and the upper pin engagement holes 72b may be employed.

Next, as illustrated in FIGS. 10 and 11, the upper casing member 74 prior to being welded to the lower casing member 72 includes the bottom section 74*a* and is a cup-shaped member having an upper opening and a closed bottom.

Furthermore, as illustrated in FIGS. 10 and 11, the upper casing member 74 extends upward substantially cylindrically from the bottom section 74*a*.

Moreover, the upper edge of the upper casing member 74 is provided with a flange 74*b* that protrudes outward.

For example, when the upper casing member 74 with the closed-bottom cup shape is to be formed, a thin metallic plate undergoes raising so as to be formed into the shape of a closed-bottom cup with a size that allows it to be insertable into the columnar section 8*a* of the outer shell member 8.

Specifically, when the metallic upper casing member 74 is to be formed, a casting process using a mold is not employed, so that a mold for forming the upper casing member 74 does not have to be prepared for each shape of the outer shell member 8 according to the type of the faucet device 1.

Next, as illustrated in FIGS. 8, 30, and 11, a hot-water communication hole 74*c*, a cold-water communication hole 74*d*, and an attachment hole 74*e* are formed by a hole-forming process in the bottom section 74*a* of the upper casing member 74.

In this regard, as illustrated in FIG. 8, the hot-water communication hole 74*c* in the bottom section 74*a* of the upper casing member 74 allows the hot-water hole 50*a* in the primary adapter member 50, located at the lower side, and the hot-water hole 52*a* in the valve seat member 52, located at the upper side, to communicate with each other.

Furthermore, as illustrated in FIGS. 8 and 11, the cold-water communication hole 74*d* in the bottom section 74*a* of the upper casing member 74 allows the cold-water hole 50*b* in the primary adapter member 50, located at the lower side, and the cold-water hole 52*b* in the valve seat member 52 to communicate with each other.

Moreover, as illustrated in FIGS. 2, 4, 5, 8, 10, 11, 29, and 30, after a protrusion 52*c* protruding downward from the bottom surface of the valve seat member 52 located above the attachment hole 74*e* in the bottom section 74*a* of the upper casing member 74 is inserted therein, the protrusion 52*c* is inserted into an attachment hole 50*f* in the primary adapter member 50, located at the lower side. Thus, the valve seat member 52 is fixed to the bottom section 74*a* of the upper casing member 74.

Next, as illustrated in FIGS. 10 and 11, the side surface of the upper casing member 74 is provided with a plurality of (e.g. two) outflow holes 74*f* that are formed adjacent to each other in the circumferential direction by a hole-forming process.

Furthermore, as illustrated in FIGS. 10 and 11, the side surface of the upper casing member 74 is provided with a plurality of (e.g. two) lower protrusion engagement holes 74*g* formed diagonally from each other by a hole-forming process at the sides distant from the outflow holes 74*f* in the circumferential direction.

In this regard, as illustrated in FIGS. 2, 5, and 10, a plurality of (e.g. two) protrusions 24*a* provided diagonally on the inner peripheral surface of the upper-side lower-seal retaining member 24 are respectively fitted into the lower protrusion engagement holes 74*g* in the side surface of the upper casing member 74. Thus, the inner peripheral surface of the upper-side lower-seal retaining member 24 is retained on the outer peripheral surface of the upper casing member 74.

Furthermore, as illustrated in FIGS. 10 and 11, the side surface of the upper casing member 74 is provided with a plurality of (e.g. two) upper protrusion engagement holes 74*h* formed diagonally from each other by a hole-forming process above the outflow holes 74*f* and the lower protrusion engagement holes 74*g*.

In this regard, as illustrated in FIGS. 2, 5, and 11, a plurality of (e.g. two) protrusions 26*a* provided diagonally on the inner peripheral surface of the lower-side upper-seal retaining member 26 are respectively fitted into the upper protrusion engagement holes 74*h* in the side surface of the upper casing member 74. Thus, the inner peripheral surface of the lower-side upper-seal retaining member 26 is retained on the outer peripheral surface of the upper casing member 74 at a position above the upper-side lower-seal retaining member 24.

As illustrated in FIGS. 10 and 11, after these hole-forming processes, the outer and lower edge portions of the bottom section 74*a* of the upper casing member 74 having the closed-bottom cup shape and an upper opening edge 72*c* of the lower casing member 72 are welded to each other in a state where the outer and lower edge portions of the bottom section 74*a* of the upper casing member 74 are inserted in the upper opening edge 72*c* of the lower casing member 72. Accordingly, the upper end of the lower casing member 72 and the lower end of the upper casing member 74 are integrally connected to each other.

Next, as illustrated in FIGS. 10 and 11, the upper circular-ring member 76 prior to being welded to the upper casing member 74 is formed to be substantially circular-ring-shaped by using a metallic plate or pipe so as to have a size that allows the upper circular-ring member 76 to be insertable into the columnar section 8*a* of the outer shell member 8.

For example, when the substantially circular-ring-shaped upper circular-ring member 76 composed of metal is to be formed, a metallic pipe with a diameter that allows it to be insertable into the columnar section 8*a* of the outer shell member 8 is prepared in advance, and this pipe is cut or ground so as to be adjusted to a length in the axial direction that allows the pipe to be insertable into the columnar section 8*a* of the outer shell member 8.

Specifically, when the metallic upper circular-ring member 76 is to be formed, a casting process using a mold is not employed, so that a mold for forming the upper circular-ring member 76 does not have to be prepared for each shape of the outer shell member 8 according to the type of the faucet device 1.

Next, as illustrated in FIGS. 10 and 11, a female thread 76*a* is formed in the inner peripheral surface of the upper circular-ring member 76 by female-threading.

Furthermore, as illustrated in FIGS. 8 and 30, a male thread 56*a* formed in the outer peripheral surface of the cartridge holding member 56 can be screwed to the female thread 76*a* of the upper circular-ring member 76, so that the cartridge holding member 56 is fixed to the upper end (i.e. the upper circular-ring member 76) of the casing member 40.

As illustrated in FIGS. 10 and 11, after such female-threading, the lower edge portion of the upper circular-ring member 76 and the outer edge portion of the flange 74*b* of the upper casing member 74 are welded to each other, so that the upper end of the upper casing member 74 and the lower end of the upper circular-ring member 76 are integrally connected to each other.

The faucet device 1 according to this embodiment employs a mode in which a female member is defined by forming the female thread 76a in the inner peripheral surface of the upper circular-ring member 76, a male member is defined by forming the male thread 56a in the outer peripheral surface of the cartridge holding member 56, and the female member and the male member are screwed to each other. However, the mode is not limited to the above mode. An alternative mode may be employed in which a male member is defined by forming a male thread in the outer peripheral surface of the upper circular-ring member 76, a female member is defined by forming a female thread in the inner peripheral surface of the cartridge holding member 56, and the male member and the female member are screwed to each other.

Next, as illustrated in FIGS. 4 and 30, the primary adapter member 50 is retained at the upper side within the lower casing member 72 by the mechanical engagement pins 60, and the valve seat member 52 is retained by the bottom section 74a within the upper casing member 74.

Furthermore, as illustrated in FIG. 30, the primary adapter member 50 having a substantially circular columnar shape has an outer diameter D1 set to be larger than an outer diameter D2 of the valve seat member 52 (D1>D2).

Next, as illustrated in FIG. 30, the single lever cartridge 54 is disposed at the upper side of the valve seat member 52 within the upper casing member 74.

Moreover, as illustrated in FIG. 30, the male thread 56a of the cartridge holding member 56 is screwed to the female thread 76a of the upper circular-ring member 76 at the upper side of the single lever cartridge 54, so that the single lever cartridge 54 is retained in a pressed state at the upper side of the valve seat member 52 within the upper casing member 74. Specifically, the cartridge holding member 56 serves as a fixing member that fixes the single lever cartridge 54 to the valve seat member 52.

In this case, as illustrated in FIGS. 5 and 30, the outflow port 54g of the hot-water cold-water mixing channel 54f in the single lever cartridge 54 communicates with the outflow holes 74f in the upper casing member 74.

Furthermore, as illustrated in FIGS. 5 and 30, a secondary channel 78 is formed between the outer peripheral surface of the upper casing member 74 and the inner peripheral surface of the secondary-channel forming member 620 at the outer side thereof. A hot-and-cold water mixture flowing out from the outflow port 54g of the hot-water cold-water mixing channel 54f in the single lever cartridge 54 flows out to the secondary channel 78 via the outflow holes 74f in the upper casing member 74.

Moreover, as illustrated in FIG. 30, the hot-and-cold water mixture in the secondary channel 78 flows out to an opening 64a in the secondary adapter member 64 from outflow holes 62a formed in the side surface at the spout-side of the secondary-channel forming member 620, and subsequently flows out to the spout channel 68a in the spout-channel forming member 68.

Furthermore, as illustrated in FIG. 8, according to the faucet device 1 according to this embodiment, for example, thermal expansion occurs in the hot-water supply pipe 44 and the neighboring cold-water supply pipe 46 or in the connection sections 44a and 44b of the hot-water supply pipe 44 and the connection sections 46a and 46b of the cold-water supply pipe 46 particularly in accordance with the amount of heat of hot water flowing through the hot-water supply pipe 44, sometimes causing movement to occur in the axial direction.

In contrast, as illustrated in FIG. 8, in the faucet device 1 according to this embodiment, the connection sections 44a and 44b of the hot-water supply pipe 44 and the connection sections 46a and 46b of the cold-water supply pipe 46 can move while maintaining the watertight state within the ranges of the clearances d1 to d4 in the connection receivers 16c and 16d of the base member 16 and the connection receivers 50c and 50d of the primary adapter member 50. Consequently, the movement of the connection sections 44a and 44b of the hot-water supply pipe 44 and the connection sections 46a and 46b of the cold-water supply pipe 46 caused by thermal expansion can be compensated.

Furthermore, as illustrated in FIG. 30, according to the faucet device 1 according to this embodiment, the single lever cartridge 54 can be disposed on the bottom section 74a of the upper casing member 74. Thus, the single lever cartridge 54 can be reliably retained by the closed-bottom upper casing member 74.

Moreover, as illustrated in FIG. 30, according to the faucet device 1 according to this embodiment, for example, in a case where the single lever cartridge 54 used has a relatively small cross-sectional area, even if the cross-sectional area (i.e. an outer diameter D2) of the valve seat member 52 to which the single lever cartridge 54 is connected is set to be relatively small, the outer diameter D1 of the primary adapter member 50 can be set to be larger than the outer diameter D2 of the valve seat member 52 (D1>D2).

Therefore, the space in which the hot-water supply pipe 44 and the cold-water supply pipe 46 are each connected in the axial direction can be sufficiently ensured in the primary adapter member 50.

Furthermore, according to the faucet device 1 according to this embodiment, the primary adapter member 50 and the valve seat member 52 serving as connecting members are composed of a resin material. Thus, a primary adapter member 50 and a valve seat member 52 that are inexpensive and lightweight can be provided, and the leaching performance can also be ensured.

Moreover, according to the faucet device 1 according to this embodiment, when the closed-bottom upper casing member 74 is to be formed, a metallic plate undergoes raising so as to be integrally formed into a closed-bottom cup shape in a state where there are no joint lines caused by, for example, welding.

Consequently, there is no risk that joint lines caused by, for example, welding in the upper casing member 74 may come into contact with water in the vicinity of the single lever cartridge 54 retained by the upper casing member 74.

Therefore, the risk of corrosion of the metallic upper casing member 74 can be reduced.

In the faucet device 1 according to this embodiment described above, the hot-water supply pipe 44 and the cold-water supply pipe 46 are described as being separate components from the base member 16 located therebelow. Alternatively, the hot-water supply pipe 44 and the cold-water supply pipe 46 may be integrated with the base member 16.

Furthermore, in the faucet device 1 according to this embodiment, the hot-water supply pipe 44 and the cold-water supply pipe 46 are described as being separate components from each other. Alternatively, the hot-water supply pipe 44 and the cold-water supply pipe 46 may be integrated with each other, so long as the channels (i.e. the hot-water supply channel and the cold-water supply channel) within the supply pipes 44 and 46 are channels independent from each other.

The metallic casing member 40, 140, 240, 340, 440, or 740 used in the faucet device 1, 100, 200, 300, 400, 500, 600, or 700 according to any one of the first to ninth embodiments of the present invention described above is described as being formed to be substantially cylindrical by using a metallic plate or pipe so as to have a size that allows the casing member to be insertable into the columnar section 8a of the outer shell member 8.

Alternatively, in each of these embodiments, the shape of the metallic casing member is not necessarily limited to a perfect cylindrical shape that is continuous over the entire circumference, and may be, for example, a semi-cylindrical shape, a shape that extends more than a semi-cylinder but less than a perfect cylinder in the circumferential direction, or a shape that extends less than a semi-cylinder. In other words, the shape of the metallic casing member may at least be a semi-cylindrical shape or may be a planar shape extending less than a semi-cylinder.

REFERENCE SIGNS LIST

1: faucet device according to first embodiment of present invention
2: operation handle
4: spout
6: outlet
8: outer shell member
8a: columnar section
8b: spout section
10: hot-water supply pipe (primary channel)
12: cold-water supply pipe (primary channel)
14: fixation fitting
14a: gripper
14b: fastener
16: base member
16a: hot-water hole
16b: cold-water hole
16c: hot-water connection receiver
16d: cold-water connection receiver
16e: engagement hole
18: faucet functioning unit
19: functional unit
20: lower-side lower-seal retaining member
22: lower seal member
24: upper-side lower-seal retaining member
24a: protrusion
26: lower-side upper-seal retaining member
28: upper seal member
30: upper-side upper-seal retaining member
32: C-ring
34: seal member
36: fixing member
38: fastener
38a: screw
38b: cap
40: casing member
42: shaft seal member
42a: hot-water-shaft seal member
42b: cold-water-shaft seal member
44: hot-water supply pipe (primary channel, hot-water supply channel)
44a: lower connection section (connection section)
44b: upper connection section (connection section)
46: cold-water supply pipe (primary channel, cold-water supply channel)
46a: lower connection section
46b: upper connection section
48: shaft seal member
48a: hot-water-shaft seal member
48b: cold-water-shaft seal member
50: primary adapter member (connecting member)
50a: hot-water hole
50b: cold-water hole
50c: hot-water connection section
50d: cold-water connection section
50e: engagement hole
50f: attachment hole
52: valve seat member (connecting member)
52a: hot-water hole
52b: cold-water hole
52c: protrusion
54: single lever cartridge
54a: stationary valve body of single lever cartridge
54b: movable valve body (on-off valve) of single lever cartridge
54c: lever of single lever cartridge
54d: hot-water channel (primary channel) in single lever cartridge
54e: cold-water channel (primary channel) in single lever cartridge
54f: hot-water cold-water mixing channel (secondary channel) in single lever cartridge
54g: outflow port of hot-water cold-water mixing channel in single lever cartridge
56: cartridge holding member (fixing member)
56a: male thread
58: mechanical engagement pin (second mechanical engagement means) for retaining base member
60: mechanical engagement pin (mechanical engagement means, first mechanical engagement means) for retaining primary adapter member
62: securing member
62g: fit recess
62f: fit protrusion
64: secondary adapter member
64a: opening
68: spout-channel forming member
68a: spout channel
68f: protrusion (flanged)
68g: fit recess
68s: seal member (e.g. O-ring)
68r: rib
70: outlet forming member
72: lower casing member
72a: lower pin engagement hole (mechanical engagement means, second engagement section)
72b: upper pin engagement hole (mechanical engagement means, first engagement section)
72c: upper opening edge
74: upper casing member
74a: bottom section of upper casing member (bottom surface of upper casing member)
74b: flange of upper casing member
74c: hot-water communication hole in bottom section of upper casing member
74d: cold-water communication hole in bottom section of upper casing member
74e: attachment hole in bottom section of upper casing member
74f: outflow hole in side surface of upper casing member
74g: lower protrusion engagement hole in side surface of upper casing member
74h: upper protrusion engagement hole in side surface of upper casing member
76: upper circular-ring member
76a: female thread
78: secondary channel 100: faucet device according to second embodiment of present invention
140: casing member
172: lower casing member
172a: upper edge
172b: side edge
172c: side edge
172d: lower engagement hole
174: middle casing member
174a: lower opening end
174b: upper opening end
174c: engagement hole
200: faucet device according to third embodiment of present invention
218: faucet functioning unit
240: casing member
250: connecting member
250A: primary adapter section
250B: valve seat section
250a: step
250b: engagement hole
250c: hot-water hole
250d: cold-water hole
252: seal member
272: stepped casing member
272a: step
272b: lower pin engagement hole
272c: upper pin engagement hole
272d: outflow hole
272e: lower protrusion engagement hole
272f: upper protrusion engagement hole
300: faucet device according to fourth embodiment of present invention
318: faucet functioning unit
340: casing member
350: connecting member
350a: engagement hole
350b: cold-water hole
352: seal member
372: cylindrical casing member
372a: lower pin engagement hole
372b: upper pin engagement hole
372c: outflow hole
376: upper circular-ring member
376a: female thread
378: secondary channel
400: faucet device according to fifth embodiment of present invention
418: faucet functioning unit
440: casing member
450: primary adapter member (connecting member)
450a: securing hole
452: valve seat member (connecting member)
460: collar
460a: securing protrusion
472: lower casing member
472a: collar attachment hole
500: faucet device according to sixth embodiment of present invention
518: faucet functioning unit
550: primary adapter member (connecting member)
550a: fit recess
560: snap-fit member
560a: securing protrusion
600: faucet device according to seventh embodiment of present invention
618: faucet functioning unit
650: primary adapter member (connecting member)
660: snap-fit member
660a: securing inclined protrusion
700: faucet device according to eighth embodiment of present invention
718: faucet functioning unit
750: primary adapter member (connecting member)
750a: snap-fit section
772: lower casing member
772a: snap-fit section
A1: rotational central axis, central axis in axial direction of lower casing member
A2: radial direction of lower casing member
A3: inward in radial direction of lower casing member
B1: segment of sidewall of lower casing member
D1: outer diameter of primary adapter member
D2: outer diameter of valve seat member
D201: outer diameter of primary adapter section of connecting member
D202: outer diameter of valve seat section of connecting member
d1: clearance
d2: clearance
d3: clearance
d4: clearance
d101: distance
F1: installation surface
f1: shearing force
f2: bending force
G101: vertical slit
P401: attachment position of primary adapter member
P501: attachment position of primary adapter member
P601: attachment position of primary adapter member
P701: attachment position of primary adapter member
Q1: arbitrary point on inner peripheral surface of lower pin engagement hole (or upper pin engagement hole)
Q2: arbitrary point on inner peripheral surface of lower pin engagement hole (or upper pin engagement hole)
Q3: arbitrary point on inner peripheral surface of lower pin engagement hole (or upper pin engagement hole)
Q4: arbitrary point on inner peripheral surface of lower pin engagement hole (or upper pin engagement hole)
S0: arbitrary imaginary plane orthogonal to central axis in axial direction of lower casing member
S1: projection plane (second projection plane)
S2: projection plane (first projection plane)
W1: width of projection plane
W2: thickness of sidewall of lower casing member
W3: width of projection plane
W4: thickness of sidewall of lower casing member

The invention claimed is:

1. A faucet device that allows a hot-and-cold water mixture containing hot water supplied from a hot-water supply source and cold water supplied from a cold-water supply source to be released and shut off, the faucet device comprising:
a base member for being fixed to an installation surface on which the faucet device is installed;
an outer shell member formed to have a shape according to a type of the faucet device and including a substantially-tubular columnar section attached to the base member;
a metallic casing member inserted into the columnar section of the outer shell member and having one end for being fixed to the base member;
a hot-water supply channel and a cold-water supply channel provided inside the casing member and extending downstream from the base member to form primary channels that supply the hot water and the cold water;

a single lever cartridge provided inside another end of the casing member and including an on-off valve and a single lever, the on-off valve adjusting a mixture ratio and flow of the hot-and-cold water mixture supplied from the hot-water supply channel and the cold-water supply channel, the single lever allowing the on-off valve to open and close;

a connecting member provided inside the casing member and connecting downstream ends of the hot-water supply channel and the cold-water supply channel to the single lever cartridge; and a fixing member that fixes the single lever cartridge to the connecting member, wherein the casing member is formed of a metallic plate or pipe, wherein the casing member has a mechanical engagement element capable of retaining the connecting member in accordance with the mechanical engagement element, wherein the connecting member is retained by the casing member via the mechanical engagement element, wherein the hot-water supply channel and the cold-water supply channel are formed of supply pipes separate from the base member, wherein the supply pipes include connection sections connected in a watertight manner by being fitted into connection receivers of the base member and the connecting member, and wherein the connection receivers of the base member and the connecting member have clearances that allow the connection sections of the supply pipes to move while watertightness relative to the connection receivers of the base member and the connecting member is maintained in a state where the connection sections of the supply pipes are connected to the connection receivers of the base member and the connecting member, wherein the casing member includes an upper casing member having a bottom surface on which the single lever cartridge is disposed, and also includes a lower casing member provided below the upper casing member and formed in a circular or curved shape as viewed in a vertical direction.

2. The faucet device according to claim 1,
wherein the casing member is formed in a circular or curved shaped as viewed in a vertical direction,
wherein the mechanical engagement element is a first mechanical engagement element including a first engagement section that is formed by performing a bending or hole-forming process on a side portion of the casing member and that is engageable with the connecting member, and
wherein the first engagement section is capable of forming a first projection plane by being projected onto a plane orthogonal to an axial direction of the casing member, and forms a surface mechanically engageable with the connecting member when the connecting member moves in the axial direction relative to the casing member, so that the casing member becomes capable of retaining the connecting member.

3. The faucet device according to claim 1,
wherein the casing member further has a second mechanical engagement element capable of retaining the base member in accordance with mechanical engagement, the second mechanical engagement element including a second engagement section that is formed by performing a bending or hole-forming process on a side portion of the casing member and that is engageable with the base member, and
wherein the second engagement section is capable of forming a second projection plane by being projected onto a plane orthogonal to an axial direction of the casing member, and forms a surface mechanically engageable with the base member when the base member moves in the axial direction relative to the casing member, so that the casing member becomes capable of retaining the base member.

4. The faucet device according to claim 1,
wherein the lower casing member is substantially C-shaped in cross section.

5. The faucet device according to claim 1,
wherein the connecting member includes a primary adapter section to which a downstream connecting section of the connection sections of the hot-water supply pipe and a downstream connecting section of the connecting sections of the cold-water supply pipe are each connected in a watertight manner in an axial direction, and also includes a valve seat section whose upstream side is connected to the primary adapter section and whose downstream side is connected in a watertight manner to the single lever cartridge, and
wherein an outer diameter of the primary adapter section is set to be larger than an outer diameter of the valve seat section.

6. The faucet device according to claim 1,
wherein the connecting member comprises a resin material.

7. The faucet device according to claim 1, further comprising:
a spout-channel forming member provided in a spout section and forming a spout channel extending to an outlet,
wherein a secondary adapter member is provided between the casing member and the outer shell member,
wherein the secondary adapter member is supported by the casing member, and
wherein the spout-channel forming member is fixed by the secondary adapter member.

8. The faucet device according to claim 7,
wherein the secondary adapter member has a tubular section that surrounds the casing member in a circumferential direction.

9. The faucet device according to claim 7,
wherein a secondary-adapter-member-side end of the spout-channel forming member is fixed by being inserted into an opening provided in the secondary adapter member.

10. The faucet device according to claim 9,
wherein an outer peripheral surface of the spout-channel forming member is provided with a protrusion near the secondary-adapter-member-side end of the spout-channel forming member, and
wherein a securing member that prevents the spout-channel forming member from falling out from the secondary adapter member by securing an outlet-side surface of the protrusion is supported by the secondary adapter member.

11. The faucet device according to claim 10,
wherein the protrusion is provided in a flanged shape.

12. The faucet device according to claim 10,
wherein the securing member is a tubular member or cross-sectionally circular-arc-shaped wall member provided with a fit recess, and wherein the fit recess has a shape and size that allow the protrusion of the spout-channel forming member to fit to a part adjacent thereto at an outlet side of the protrusion but do not allow the protrusion to pass through.

13. The faucet device according to claim 10, wherein the securing member comprises metal.

14. The faucet device according to claim 1, further comprising:
a functional unit that is formed by at least the metallic casing member, the single lever cartridge, the connecting member, and the fixing member,
a spout-channel forming member is provided in a spout section to form a spout channel extending to an outlet,
a substantially-tubular secondary adapter member is provided between the functional unit and the columnar section, and
the spout-channel forming member communicates with the secondary adapter member.

15. The faucet device according to claim 14,
wherein a secondary channel sealed in a watertight manner is formed between an outer peripheral surface of the functional unit and an inner peripheral surface of the secondary adapter member,
wherein the hot-and-cold water mixture is mixed in the secondary channel,
wherein the outer peripheral surface of the functional unit is provided with an outflow hole that allows the hot-and-cold water mixture mixed in the secondary channel to flow out, and
wherein the spout-channel forming member communicates with the secondary channel.

16. The faucet device according to claim 14,
wherein the outer shell member and the secondary adapter member are rotatable together relative to the functional unit.

17. A faucet device that allows a hot-and-cold water mixture containing hot water supplied from a hot-water supply source and cold water supplied from a cold-water supply source to be released and shut off, the faucet device comprising:
a base member for being fixed to an installation surface on which the faucet device is installed;
an outer shell member formed to have a shape according to a type of the faucet device and including a substantially-tubular columnar section attached to the base member, a metallic casing member inserted into the columnar section of the outer shell member and having one end for being fixed to the base member;
a hot-water supply channel and a cold-water supply channel provided inside the casing member and extending downstream from the base member to form primary channels that supply the hot water and the cold water;
a single lever cartridge provided inside another end of the casing member and including an on-off valve and a single lever, the on-off valve adjusting a mixture ratio and flow of the hot-and-cold water mixture supplied from the hot-water supply channel and the cold-water supply channel, the single lever allowing the on-off valve to open and close;
a connecting member provided inside the casing member and connecting downstream ends of the hot-water supply channel and the cold-water supply channel to the single lever cartridge; and a fixing member that fixes the single lever cartridge to the connecting member,
wherein the casing member is formed of a metallic plate or pipe,
wherein the casing member has a mechanical engagement element capable of retaining the connecting member in accordance with the mechanical engagement element,
wherein the connecting member is retained by the casing member via the mechanical engagement element,
wherein the hot-water supply channel and the cold-water supply channel are formed of supply pipes separate from the base member,
wherein the supply pipes include connection sections connected in a watertight manner by being fitted into connection receivers of the base member and the connecting member, and
wherein the connection receivers of the base member and the connecting member have clearances that allow the connection sections of the supply pipes to move while watertightness relative to the connection receivers of the base member and the connecting member is maintained in a state where the connection sections of the supply pipes are connected to the connection receivers of the base member and the connecting member;
a spout-channel forming member provided in a spout section and forming a spout channel extending to an outlet,
wherein a secondary adapter member is provided between the casing member and the outer shell member,
wherein the secondary adapter member is supported by the casing member, and
wherein the spout-channel forming member is fixed by the secondary adapter member;
wherein an outer peripheral surface at a lower side of the spout-channel forming member is provided with a rib near a secondary-adapter-member-side end of the spout-channel forming member, and
wherein the rib extends toward the secondary-adapter-member-side end of the spout-channel forming member and is in contact with the secondary adapter member.

18. A faucet device that allows a hot-and-cold water mixture containing hot water supplied from a hot-water supply source and cold water supplied from a cold-water supply source to be released and shut off, the faucet device comprising:
a base member for being fixed to an installation surface on which the faucet device is installed;
an outer shell member formed to have a shape according to a type of the faucet device and including a substantially-tubular columnar section attached to the base member, a metallic casing member inserted into the columnar section of the outer shell member and having one end for being fixed to the base member;
a hot-water supply channel and a cold-water supply channel provided inside the casing member and extending downstream from the base member to form primary channels that supply the hot water and the cold water;
a single lever cartridge provided inside another end of the casing member and including an on-off valve and a single lever, the on-off valve adjusting a mixture ratio and flow of the hot-and-cold water mixture supplied from the hot-water supply channel and the cold-water supply channel, the single lever allowing the on-off valve to open and close;
a connecting member provided inside the casing member and connecting downstream ends of the hot-water supply channel and the cold-water supply channel to the single lever cartridge; and a fixing member that fixes the single lever cartridge to the connecting member, wherein the casing member is formed of a metallic plate or pipe, wherein the casing member has a mechanical engagement element capable of retaining the connecting member in accordance with the mechanical engagement element, wherein the connecting member is retained by the casing member via the mechanical engagement element, wherein the hot-water supply channel and the cold-water supply channel are formed of supply pipes separate from the base member, wherein the supply pipes include connection sections connected in a watertight manner by being fitted into connection receivers of the base member and the connecting member, wherein the connection receivers of the base member and the connecting member have clearances that allow the connection sections of the supply pipes to move while watertightness relative to the connection receivers of the base member and the connecting member is maintained in a state where the connection sections of the supply pipes are connected to the connection receivers of the base member and the connecting member;

a functional unit that is formed by at least the metallic casing member, the single lever cartridge, the connecting member and the fixing member;

the hot-water supply channel and the cold-water supply channel extend to the functional unit;

a spout-channel forming member is provided in a spout section to form a spout channel extending to an outlet, a substantially-tubular secondary adapter member is provided between the functional unit and the columnar section, the spout-channel forming member communicates with the secondary adapter member;

wherein the outer shell member and the secondary adapter member are rotatable together relative to the functional unit; and wherein the outer shell member and the secondary adapter member are directly engaged with each other in a rotational direction with respect to the functional unit.

19. The faucet device according to claim 18,
wherein a lower end of the secondary adapter member is provided with a flange,
wherein the flange of the secondary adapter member is placed on the base member, and
wherein a lower end of the columnar section is placed on the flange of the secondary adapter member.

20. The faucet device according to claim 18,
wherein the secondary adapter member has an upper secondary adapter member and a lower secondary adapter member.

21. The faucet device according to claim 20,
wherein a secondary channel sealed in a watertight manner is formed between an outer peripheral surface of the functional unit and an inner peripheral surface of the upper secondary adapter member,
wherein the hot-and-cold water mixture is mixed in the secondary channel,
wherein the outer peripheral surface of the functional unit is provided with an outflow hole that allows the hot-and-cold water mixture mixed in the secondary channel to flow out, and
wherein the spout-channel forming member communicates with the secondary channel.

22. A method for manufacturing a faucet device that allows a hot-and-cold water mixture containing hot water supplied from a hot-water supply source and cold water supplied from a cold-water supply source to be released and shut off, the method comprising:

a step for preparing a base member to be fixed to an installation surface of the faucet device;

a step for preparing an outer shell member in accordance with a type of the faucet device, the outer shell member including a substantially-tubular columnar section to be attached to the base member;

a step for preparing a metallic casing member to be inserted into the columnar section of the outer shell member, wherein a thickness of the metallic casing member is less than a thickness of the outer shell member;

a step for preparing a hot-water supply pipe for supplying the hot water from the hot-water supply source and a cold-water supply pipe for supplying the cold water from the cold-water supply source;

a step for preparing a single lever cartridge including an on-off valve for adjusting a mixture ratio and flow of the hot-and-cold water mixture supplied from the hot-water supply pipe and the cold-water supply pipe to a secondary channel downstream of the hot-water supply pipe and the cold-water supply pipe and a single lever that allows the on-off valve to open and close, the single lever cartridge being provided in a first end of the casing member;

a step for preparing a connecting member that connects downstream ends of the hot-water supply pipe and the cold-water supply pipe to the single lever cartridge inside the casing member;

a step for preparing a fixing member that fixes the single lever cartridge to the connecting member; and a step for preparing mechanical engagement element that mechanically engages the casing member and the connecting member with each other, wherein the casing member includes an upper casing member having a bottom surface on which the single lever cartridge is disposed, and also includes a lower casing member provided below the upper casing member and formed in a circular or curved shape as viewed in a vertical direction, wherein the step for preparing the metallic casing member includes performing a bending process using a metallic plate or pipe so that the casing member is formed with a size that allows the casing member to be insertable into the columnar section of the outer shell member, and wherein, after the step for preparing the mechanical engagement element, the connecting member is retained by the casing member in accordance with the mechanical engagement element, and a second end of the casing member is fixed to the base member;

wherein the hot-water supply pipe and the cold-water supply pipe are formed of supply pipes separate from the base member, wherein the supply pipes include connection sections connected in a watertight manner by being fitted into connection receivers of the base member and the connecting member, and wherein the connection receivers of the base member and the connecting member have clearances that allow the connection sections of the supply pipes to move while watertightness relative to the connection receivers of the base member and the connecting member is maintained in a state where the connection sections of the supply pipes are connected to the connection receivers of the base member and the connecting member.

23. The method for manufacturing the faucet device according to claim 22,
wherein the step for preparing the mechanical engagement element includes performing a plastic working process on the casing member so as to form an engagement section mechanically engageable with the connecting member, the engagement section serving as a part of the mechanical engagement element.

24. The method for manufacturing the faucet device according to claim 22,
wherein the step for preparing the mechanical engagement element includes forming an opening by performing a hole-forming process on the casing member, and wherein a cross section of the opening serves as a part of the mechanical engagement element.

25. The method for manufacturing the faucet device according to claim 22,
wherein the upper casing member is formed with the metallic plate to have a closed-bottom shape by performing raising on the metallic plate.

26. The method for manufacturing the faucet device according to claim 25,
wherein the step for preparing the metallic casing member includes forming the lower casing member into a curved shape by performing bending on the metallic plate.

* * * * *